(12) United States Patent
Warner et al.

(10) Patent No.: US 10,482,488 B2
(45) Date of Patent: Nov. 19, 2019

(54) IDENTIFYING AND DISPENSING SPECIAL OFFERS BASED ON CURRENT AND/OR PAST TRANSACTIONS

(71) Applicant: Target Brands, Inc., Minneapolis, MN (US)

(72) Inventors: Shannon L. Warner, Woodbury, MN (US); Marc R. Black, St. Paul, MN (US); Lisa Mellas, Minneapolis, MN (US); James L. Mazour, St. Louis Park, MN (US); Rajkumar Viswanathan, Minnetonka, MN (US); Michael D. Salters, Plymouth, MN (US); Glenda L. Berg, Apple Valley, MN (US); Ann Elizabeth Bailey, Apple Valley, MN (US); Michael T. Greeder, Maple Grove, MN (US)

(73) Assignee: TARGET BRANDS, INC., Minneapolis, MN (US)

( * ) Notice: Subject to any disclaimer, the term of this patent is extended or adjusted under 35 U.S.C. 154(b) by 204 days.

(21) Appl. No.: 14/851,811

(22) Filed: Sep. 11, 2015

(65) Prior Publication Data
US 2015/0379550 A1    Dec. 31, 2015

Related U.S. Application Data

(63) Continuation of application No. 13/942,169, filed on Jul. 15, 2013, now Pat. No. 9,152,973, which is a
(Continued)

(51) Int. Cl.
*G06Q 30/02*    (2012.01)
*G06Q 30/00*    (2012.01)

(52) U.S. Cl.
CPC ......... *G06Q 30/0226* (2013.01); *G06Q 30/00* (2013.01); *G06Q 30/0233* (2013.01); *G06Q 30/0238* (2013.01)

(58) Field of Classification Search
CPC ............. G06Q 20/341; G06Q 30/0226; G06Q 30/0238; G06Q 30/0212; G06Q 30/0239; G06Q 30/0268
See application file for complete search history.

(56) References Cited

U.S. PATENT DOCUMENTS

| | | |
|---|---|---|
| 3,935,933 A | 2/1976 | Tanaka et al. |
| 4,011,433 A | 3/1977 | Tateisi et al. |

(Continued)

FOREIGN PATENT DOCUMENTS

| | | | | |
|---|---|---|---|---|
| WO | WO2001-043034 | * | 12/2000 | ............. G06F 17/60 |
| WO | WO 01/18732 A2 | * | 3/2001 | ............. G06F 17/60 |

(Continued)

OTHER PUBLICATIONS

"Smart Cards and the Retail Payments Infrastructure: Status, Drivers, Directions" Smart Card Alliance, available at https://www.it.iitb.ac.in/~tijo/seminar/Infrastructure_White_Paper.pdf (Year: 2002).*
"Catalina Goes From the Grocery Store to the World Wide Web," Electronic Marketplace Report, Oct. 3, 1995, vol. 9, 19 ISSN: 1071-247X.

(Continued)

*Primary Examiner* — Katherine Kolosowski-Gager
(74) *Attorney, Agent, or Firm* — Nixon & Vanderhye P.C.

(57) ABSTRACT

Systems and methods for providing a loyalty and rewards system that implements a user incentive program using smart card technology are provided. A loyalty system allows a user to systematically search, identify, store, and redeem electronic coupons and rebates associated with products from a large number of providers and manufactures. The loyalty system also integrates the activities associated with the user incentive program (e.g., coupon collection, storage, and redemption, etc.), with existing payment methods (e.g., (Continued)

charging a credit card, etc.) using smart card technology. Thus, the loyalty system allows the user to obtain savings and otherwise participate in the user incentive program without adding time consuming and tedious processing that is normally associated with coupon and rebate programs.

10 Claims, 41 Drawing Sheets

Related U.S. Application Data continuation of application No. 10/675,231, filed on Sep. 29, 2003, now Pat. No. 8,489,452.

(60) Provisional application No. 60/502,132, filed on Sep. 10, 2003.

(56) References Cited

U.S. PATENT DOCUMENTS

| | | | |
|---|---|---|---|
| 4,108,350 A | 8/1978 | Forbes, Jr. |
| 4,124,109 A | 11/1978 | Bissell et al. |
| 4,195,864 A | 4/1980 | Morton et al. |
| 4,412,631 A | 11/1983 | Haker |
| 4,544,590 A | 10/1985 | Egan |
| 4,568,403 A | 2/1986 | Egan |
| 4,674,041 A | 6/1987 | Lemon et al. |
| 4,707,592 A | 11/1987 | Ware |
| 4,723,212 A | 2/1988 | Mindrum et al. |
| 4,742,215 A | 5/1988 | Daughters et al. |
| 4,794,530 A | 12/1988 | Yukiura et al. |
| 4,825,053 A | 4/1989 | Caille |
| 4,837,422 A | 6/1989 | Dethloff et al. |
| 4,841,712 A | 6/1989 | Roou |
| 4,868,376 A | 9/1989 | Lessin et al. |
| 4,910,672 A | 3/1990 | Off et al. |
| 4,926,325 A | 5/1990 | Benton et al. |
| 4,941,090 A | 7/1990 | McCarthy |
| 4,949,256 A | 8/1990 | Humble |
| 4,954,003 A | 9/1990 | Shea |
| 4,957,311 A | 9/1990 | Geisenheimer |
| 4,992,940 A | 2/1991 | Dworkin |
| 5,019,452 A | 5/1991 | Watanabe et al. |
| 5,019,695 A | 5/1991 | Itako |
| 5,025,372 A | 6/1991 | Burton et al. |
| 5,056,019 A | 10/1991 | Schultz et al. |
| 5,060,793 A | 10/1991 | Hyun et al. |
| 5,060,804 A | 10/1991 | Beales et al. |
| 5,115,888 A | 5/1992 | Schneider |
| 5,117,355 A | 5/1992 | McCarthy |
| 5,128,752 A | 7/1992 | Von Kohorn |
| 5,146,499 A | 9/1992 | Geffrotin |
| 5,173,851 A | 12/1992 | Off et al. |
| 5,185,695 A | 2/1993 | Pruchnicki |
| 5,195,130 A | 3/1993 | Weiss et al. |
| 5,200,889 A | 4/1993 | Mori |
| 5,202,826 A | 4/1993 | McCarthy |
| 5,227,874 A | 7/1993 | Von Kohorn |
| 5,256,863 A | 10/1993 | Ferguson et al. |
| 5,272,754 A | 12/1993 | Boerbert |
| 5,285,278 A | 2/1994 | Holman |
| 5,287,181 A | 2/1994 | Holman |
| 5,299,834 A | 4/1994 | Kraige |
| 5,308,120 A | 5/1994 | Thompson |
| 5,353,218 A | 10/1994 | De Lapa et al. |
| 5,380,991 A | 1/1995 | Valencia et al. |
| RE34,915 E | 4/1995 | Nichtberger et al. |
| 5,402,549 A | 4/1995 | Forrest |
| 5,417,458 A | 5/1995 | Best et al. |
| 5,420,606 A | 5/1995 | Begum et al. |
| 5,450,938 A | 9/1995 | Rademacher |
| 5,461,217 A | 10/1995 | Claus |
| 5,466,010 A | 11/1995 | Spooner |
| 5,471,669 A | 11/1995 | Lidman |
| 5,483,444 A | 1/1996 | Heintzeman et al. |
| 5,484,998 A | 1/1996 | Bejnar et al. |
| 5,491,326 A | 2/1996 | Marceau et al. |
| 5,491,838 A | 2/1996 | Takahisa et al. |
| 5,500,681 A | 3/1996 | Jones |
| 5,501,491 A | 3/1996 | Thompson |
| 5,513,102 A | 4/1996 | Auriemma |
| 5,515,270 A | 5/1996 | Weinblatt |
| 5,517,569 A | 5/1996 | Clark |
| 5,530,232 A | 6/1996 | Taylor |
| 5,531,482 A | 7/1996 | Blank |
| 5,535,118 A | 7/1996 | Chumbley |
| 5,537,314 A | 7/1996 | Kanter |
| 5,550,561 A | 8/1996 | Ziarno |
| 5,559,313 A | 9/1996 | Claus et al. |
| 5,564,073 A | 10/1996 | Takahisa |
| 5,577,266 A | 11/1996 | Takahisa et al. |
| 5,577,915 A | 11/1996 | Feldman |
| 5,578,808 A | 11/1996 | Taylor |
| 5,579,537 A | 11/1996 | Takahisa |
| 5,590,197 A | 12/1996 | Chen et al. |
| 5,590,199 A | 12/1996 | Krajewski, Jr. et al. |
| 5,594,493 A | 1/1997 | Nemirofsky |
| 5,602,918 A | 2/1997 | Chen et al. |
| 5,606,615 A | 2/1997 | Lapointe et al. |
| 5,612,868 A | 3/1997 | Off et al. |
| 5,613,012 A | 3/1997 | Hoffman et al. |
| 5,615,277 A | 3/1997 | Hoffman |
| 5,649,114 A * | 7/1997 | Deaton ............. G06Q 20/387 |
| | | 705/14.35 |
| 5,649,118 A | 7/1997 | Carlisle et al. |
| 5,650,209 A | 7/1997 | Ramsburg et al. |
| 5,687,322 A | 11/1997 | Deaton et al. |
| 5,689,100 A | 11/1997 | Carrithers et al. |
| 5,710,884 A | 1/1998 | Dedrick |
| 5,710,886 A | 1/1998 | Christensen et al. |
| 5,727,153 A | 3/1998 | Powell |
| 5,732,219 A | 3/1998 | Blumer et al. |
| 5,734,838 A | 3/1998 | Robinson et al. |
| 5,742,845 A | 4/1998 | Wagner |
| 5,761,648 A | 6/1998 | Golden et al. |
| 5,765,141 A | 6/1998 | Spector |
| 5,767,896 A | 6/1998 | Nemirofsky |
| 5,774,870 A | 6/1998 | Storey |
| 5,776,287 A | 7/1998 | Best et al. |
| 5,791,991 A | 8/1998 | Small |
| 5,794,210 A | 8/1998 | Goldhaber et al. |
| 5,797,126 A | 8/1998 | Helbling et al. |
| 5,804,806 A | 9/1998 | Haddad et al. |
| 5,805,719 A | 9/1998 | Pare, Jr. et al. |
| 5,806,044 A | 9/1998 | Powell |
| 5,806,045 A | 9/1998 | Biorge et al. |
| 5,809,415 A | 9/1998 | Rossmann |
| 5,815,657 A | 9/1998 | Williams et al. |
| 5,822,735 A | 10/1998 | De Lapa et al. |
| 5,822,737 A | 10/1998 | Ogram |
| 5,832,457 A | 11/1998 | O'Brien et al. |
| 5,838,812 A | 11/1998 | Pare, Jr. et al. |
| 5,838,906 A | 11/1998 | Doyle et al. |
| 5,845,259 A | 12/1998 | West et al. |
| 5,855,007 A | 12/1998 | Jovicic et al. |
| 5,857,175 A | 1/1999 | Day et al. |
| 5,859,419 A | 1/1999 | Wynn |
| RE36,116 E | 2/1999 | McCarthy |
| 5,865,340 A | 2/1999 | Alvern |
| 5,865,470 A | 2/1999 | Thompson |
| 5,868,498 A | 2/1999 | Martin |
| 5,880,769 A | 3/1999 | Nemirofsky et al. |
| 5,884,271 A | 3/1999 | Pitroda |
| 5,884,277 A | 3/1999 | Khosla |
| 5,884,278 A | 3/1999 | Powell |
| 5,887,063 A | 3/1999 | Varadharajan et al. |
| 5,887,271 A | 3/1999 | Powell |
| 5,889,863 A | 3/1999 | Weber |
| 5,890,135 A | 3/1999 | Powell |
| 5,892,827 A | 4/1999 | Beach et al. |
| 5,892,902 A | 4/1999 | Clark |
| 5,897,616 A | 4/1999 | Kanevsky et al. |
| 5,898,838 A | 4/1999 | Wagner |

(56) References Cited

U.S. PATENT DOCUMENTS

| | | |
|---|---|---|
| 5,901,284 A | 5/1999 | Hamdy-Swink |
| 5,905,246 A | 5/1999 | Fajkowski |
| 5,905,908 A | 5/1999 | Wagner |
| 5,907,350 A | 5/1999 | Nemirofsky |
| 5,907,830 A | 5/1999 | Engel et al. |
| 5,909,486 A | 6/1999 | Walker et al. |
| 5,915,007 A | 6/1999 | Klapka |
| 5,915,244 A | 6/1999 | Jack et al. |
| 5,917,168 A | 6/1999 | Nakamura et al. |
| 5,924,072 A | 7/1999 | Havens |
| 5,926,795 A | 7/1999 | Williams |
| 5,928,082 A | 7/1999 | Clapper, Jr. |
| 5,931,917 A | 8/1999 | Nguyen et al. |
| 5,933,816 A | 8/1999 | Zeanah et al. |
| 5,943,651 A | 8/1999 | Oosawa |
| 5,944,794 A | 8/1999 | Okamoto et al. |
| 5,948,061 A | 9/1999 | Merriman et al. |
| 5,950,173 A | 9/1999 | Perkowski |
| 5,953,047 A | 9/1999 | Nemirofsky |
| 5,953,705 A | 9/1999 | Oneda |
| 5,956,694 A | 9/1999 | Powell |
| 5,956,695 A | 9/1999 | Carrithers et al. |
| 5,958,174 A | 9/1999 | Ramsberg et al. |
| 5,963,917 A | 10/1999 | Ogram |
| 5,969,318 A | 10/1999 | Mackenthun |
| 5,970,469 A | 10/1999 | Scroggie et al. |
| 5,973,731 A | 10/1999 | Schwab |
| 5,974,399 A | 10/1999 | Giuliani et al. |
| 5,978,013 A | 11/1999 | Jones et al. |
| 5,978,773 A | 11/1999 | Hudetz et al. |
| 5,982,891 A | 11/1999 | Ginter et al. |
| 5,987,132 A | 11/1999 | Rowney |
| 5,987,795 A | 11/1999 | Wilson |
| 5,991,411 A | 11/1999 | Kaufman et al. |
| 5,996,076 A | 11/1999 | Rowney et al. |
| 5,997,042 A | 12/1999 | Blank |
| 6,000,608 A | 12/1999 | Dorf |
| 6,002,771 A | 12/1999 | Nielsen |
| 6,009,411 A | 12/1999 | Kepecs |
| 6,012,038 A | 1/2000 | Powell |
| 6,012,635 A | 1/2000 | Shimada et al. |
| 6,014,634 A | 1/2000 | Scroggie et al. |
| 6,016,476 A | 1/2000 | Maes et al. |
| 6,023,762 A | 2/2000 | Dean et al. |
| 6,026,370 A | 2/2000 | Jermyn |
| 6,035,280 A | 3/2000 | Christensen |
| 6,041,309 A | 3/2000 | Laor |
| 6,049,778 A | 4/2000 | Walker et al. |
| 6,055,314 A | 4/2000 | Spies et al. |
| 6,055,509 A | 4/2000 | Powell |
| 6,055,573 A | 4/2000 | Gardenswartz et al. |
| 6,061,660 A | 5/2000 | Eggleston et al. |
| 6,061,796 A | 5/2000 | Chen et al. |
| 6,067,524 A | 5/2000 | Byerly et al. |
| 6,067,526 A | 5/2000 | Powell |
| 6,070,147 A | 5/2000 | Harms et al. |
| 6,073,242 A | 6/2000 | Hardy et al. |
| 6,075,860 A | 6/2000 | Ketcham |
| 6,076,068 A | 6/2000 | DeLapa et al. |
| 6,076,069 A | 6/2000 | Laor |
| 6,089,611 A | 7/2000 | Blank |
| 6,105,002 A | 8/2000 | Powell |
| 6,105,865 A | 8/2000 | Hardesty |
| 6,112,987 A | 9/2000 | Lambert et al. |
| 6,112,988 A | 9/2000 | Powell |
| 6,119,228 A | 9/2000 | Angelo et al. |
| 6,119,933 A | 9/2000 | Wong et al. |
| 6,119,945 A | 9/2000 | Muller et al. |
| 6,123,259 A | 9/2000 | Ogasawara |
| 6,128,602 A | 10/2000 | Northington et al. |
| 6,129,274 A | 10/2000 | Suzuki |
| 6,144,948 A | 11/2000 | Walker et al. |
| 6,147,744 A | 11/2000 | Smart et al. |
| 6,151,586 A | 11/2000 | Brown |
| 6,151,587 A | 11/2000 | Matthias |
| 6,158,011 A | 12/2000 | Chen et al. |
| 6,161,870 A | 12/2000 | Blank |
| 6,173,269 B1 | 1/2001 | Soloki et al. |
| 6,173,400 B1 | 1/2001 | Perlman et al. |
| 6,173,891 B1 | 1/2001 | Powell |
| 6,175,922 B1 | 1/2001 | Wang |
| 6,179,710 B1 | 1/2001 | Sawyer et al. |
| 6,183,017 B1 | 2/2001 | Najor et al. |
| 6,185,541 B1 | 2/2001 | Scroggie et al. |
| 6,185,681 B1 | 2/2001 | Zizzi |
| 6,189,096 B1 | 2/2001 | Haverty |
| 6,189,787 B1 | 2/2001 | Dorf |
| 6,205,437 B1 | 3/2001 | Gifford |
| 6,210,276 B1 | 4/2001 | Mullins |
| 6,219,439 B1 | 4/2001 | Burger |
| 6,219,669 B1 | 4/2001 | Haff et al. |
| 6,222,914 B1 | 4/2001 | McMullin |
| 6,222,933 B1 | 4/2001 | Mittermayer et al. |
| 6,226,744 B1 | 5/2001 | Murphy et al. |
| 6,226,752 B1 | 5/2001 | Gupta et al. |
| 6,230,143 B1 | 5/2001 | Simons et al. |
| 6,237,145 B1 | 5/2001 | Narasimhan et al. |
| 6,240,394 B1 | 5/2001 | Uecker et al. |
| 6,241,287 B1 | 6/2001 | Best et al. |
| 6,243,687 B1 | 6/2001 | Powell |
| 6,243,688 B1 | 6/2001 | Kalina |
| 6,244,958 B1 | 6/2001 | Acres |
| 6,253,027 B1 | 6/2001 | Weber et al. |
| 6,266,647 B1 | 7/2001 | Fernandez |
| 6,267,263 B1 | 7/2001 | Emoff et al. |
| 6,269,158 B1 | 7/2001 | Kim |
| 6,278,979 B1 | 8/2001 | Williams |
| 6,279,112 B1 | 8/2001 | O'Toole, Jr. et al. |
| 6,282,516 B1 | 8/2001 | Giuliani |
| 6,282,656 B1 | 8/2001 | Wang |
| 6,292,785 B1 | 9/2001 | McEvoy et al. |
| 6,292,786 B1 | 9/2001 | Deaton et al. |
| 6,299,530 B1 | 10/2001 | Hansted et al. |
| 6,304,658 B1 | 10/2001 | Kocher et al. |
| 6,304,849 B1 | 10/2001 | Uecker et al. |
| 6,321,208 B1 | 11/2001 | Barnett et al. |
| 6,336,099 B1 | 1/2002 | Barnett et al. |
| 6,366,967 B1 | 4/2002 | Wagner |
| 6,450,407 B1 * | 9/2002 | Freeman ............ G06K 19/0723 235/376 |
| 6,587,835 B1 | 7/2003 | Treyz et al. |
| 6,691,915 B1 | 2/2004 | Thaxton et al. |
| 6,837,436 B2 | 1/2005 | Swartz et al. |
| 6,965,869 B1 | 11/2005 | Tomita et al. |
| 7,013,286 B1 | 3/2006 | Aggarwal et al. |
| 7,020,623 B1 | 3/2006 | Tiley et al. |
| 7,054,830 B1 | 5/2006 | Eggleston et al. |
| 7,155,411 B1 | 12/2006 | Blinn et al. |
| 7,219,071 B2 | 5/2007 | Gallagher |
| 7,231,357 B1 | 6/2007 | Shanman et al. |
| 7,240,023 B1 | 7/2007 | Powell |
| 7,246,082 B1 | 7/2007 | Meek et al. |
| 7,249,052 B2 | 7/2007 | Himes |
| 7,308,254 B1 | 12/2007 | Rissanen |
| 7,308,426 B1 | 12/2007 | Pitroda |
| 7,324,957 B2 | 1/2008 | Boys |
| 7,487,112 B2 | 2/2009 | Barnes, Jr. |
| 7,571,139 B1 * | 8/2009 | Giordano ............... G06Q 20/04 705/37 |
| 7,725,350 B2 | 5/2010 | Schlee |
| 8,489,452 B1 | 7/2013 | Warner et al. |
| 2001/0023407 A1 | 9/2001 | Liyanearachchi et al. |
| 2001/0042007 A1 | 11/2001 | Klingle |
| 2001/0042008 A1 | 11/2001 | Hull et al. |
| 2002/0007306 A1 | 1/2002 | Granger et al. |
| 2002/0026386 A1 | 2/2002 | Walden |
| 2002/0046082 A1 | 4/2002 | White |
| 2002/0046085 A1 | 4/2002 | Rochon et al. |
| 2002/0049631 A1 | 4/2002 | Williams |
| 2002/0069115 A1 | 6/2002 | Fitzpatrick |
| 2002/0073019 A1 | 6/2002 | Deaton |
| 2002/0077901 A1 | 6/2002 | Katz |
| 2002/0082887 A1 | 6/2002 | Boyert et al. |
| 2002/0087384 A1 | 7/2002 | Neifeld |

(56) References Cited

U.S. PATENT DOCUMENTS

| | | |
|---|---|---|
| 2002/0091566 A1 | 7/2002 | Siegel |
| 2002/0091569 A1 | 7/2002 | Kitaura et al. |
| 2002/0107728 A1 | 8/2002 | Bailey et al. |
| 2002/0107729 A1 | 8/2002 | Katz |
| 2002/0116266 A1 | 8/2002 | Marshall |
| 2002/0133401 A1 | 9/2002 | Mount et al. |
| 2002/0138338 A1 | 9/2002 | Trauth et al. |
| 2002/0147639 A1 | 10/2002 | Williams et al. |
| 2003/0028424 A1 | 2/2003 | Kampff et al. |
| 2003/0088466 A1 | 5/2003 | Fitzpatrick |
| 2003/0139969 A1 | 7/2003 | Scroggie et al. |
| 2003/0154163 A1 | 8/2003 | Phillips et al. |
| 2003/0216967 A1 | 11/2003 | Williams |
| 2003/0220835 A1 | 11/2003 | Barnes, Jr. |
| 2004/0034570 A1 | 2/2004 | Davis |
| 2004/0088221 A1 | 5/2004 | Katz et al. |
| 2004/0140361 A1 | 7/2004 | Paul et al. |
| 2005/0021400 A1 | 1/2005 | Postrel |
| 2005/0222906 A1 | 10/2005 | Chen |
| 2011/0131089 A1 | 6/2011 | Walker et al. |

FOREIGN PATENT DOCUMENTS

| | | | | |
|---|---|---|---|---|
| WO | 2001-464997 | * | 6/2001 | ............. G06F 17/60 |
| WO | WO 03/009197 A1 | * | 1/2003 | ............. G06F 17/60 |

OTHER PUBLICATIONS

"Clipping Coupons in Cyberspace," Business Week, Aug. 14, 1995, No. 3437.
"Corner-shop Services Returns as a Friendly Smartcard," The Age, Nov. 21, 1994.
Dean, Lee S., "Card Gives Cents Off Without Coupons," Star-Tribune of the Twin Cities Mpls, Feb. 6, 1991.
Green, Harriet, "The Marketplace—Welcome to your Over-Friendly Supermarket," Independent on Sunday, Aug. 20, 1995.
Jaben, Jan, "Smart Card Pilot Project Offers Bonuses for Frequent Shoppers," American Banker, Aug. 30, 1989, vol. 154, No. 169.
Leasure, Jan, "Computer Coupons Arrive on the Internet," Portland Oregonian Sunrise, Dec. 12, 1995.
"Marketing Week Reports on Hi Technology, Goodbye Trolley," Marketing Week, Nov. 27, 1992.
Reed, Paul, "MEI's Computer Coupons Cut Out the Clipping," Journal of Business, Jul. 27, 1995. V10, N14, Section A.
"Sled Internet Directory Distributes Electronic Coupons; Paperless Discount Coupons Created Using PGP Encryption Technology," PR Newswire, May 9, 1994.
Wood, Lamont, "The Ticket to a Cashless Society Is Made of Plastic," Chicago Tribune, Nov. 8, 1990, Final Edition; C.
U.S. Office Action dated Apr. 5, 2018 issued in U.S. Appl. No. 14/851,050, 16 pp.

* cited by examiner

1500

| Financial Services |
| Reward Programs |
| Electronic Coupons |
| Apply Online |
| Account Management |
| Order A Reader |

Electronic Coupons

Find Coupons ▪ Load Coupons ▪ Shop

Term of Interest  [Home decor] 1502
1504 ☐ Brand   1508 ☐ Product description
1506 ☐ Product name  ☑ Related product genre
                1510        1512
                      [Search]

Event Recommendation
1514 ☐ Birthdays  1518 ☐ Parties  1522 ☐ Babies
1516 ☐ Weddings  1520 ☑ Holidays ☑ Apply term of interest to event recommendation
 1524
        [Search] 1524

FIG. 15

Electronic Coupons

Please select one or more retail locations near you that you would like to receive special offers from ~2602

☐ Location 1    0.2 Mile
☐ Location 2    0.3 Mile
☐ Location 3    0.4 Mile

2604

Search New Zipcode  [ ~2606 ]  [ Search ]

Search By State  [ State ▼ ~2608 ]  [ City ▼ ~2608 ]  [ Search ]

- Financial Services
- Reward Programs
- Electronic Coupons
- Apply Online
- Account Management
- Order A Reader

Retail Location Information — 3002

Shopping list sorted by the order you will encounter the items in the store

3004:
1. Product Image | Product Description | Coupon Description, Terms, and Conditions | Aisle Location
2. Product Image | Product Description | Coupon Description, Terms, and Conditions | Aisle Location
3. Product Image | Product Description | Coupon Description, Terms, and Conditions | Aisle Location
4. Product Image | Product Description | Coupon Description, Terms, and Conditions | Aisle Location Print List — 3006

IDENTIFYING AND DISPENSING SPECIAL OFFERS BASED ON CURRENT AND/OR PAST TRANSACTIONS

CROSS-REFERENCES TO RELATED APPLICATIONS

This application is a continuation of U.S. patent application Ser. No. 13/942,169, filed Jul. 15, 2013, which is a continuation of U.S. patent application Ser. No. 10/675,231, filed Sep. 29, 2003, now U.S. Pat. No. 8,489,452, which claims the benefit of U.S. Provisional Patent Application Ser. No. 60/502,132, filed Sep. 10, 2003, the entire contents of each of which are hereby incorporated by reference in this application.

STATEMENT REGARDING FEDERALLY SPONSORED RESEARCH OR DEVELOPMENT (NOT APPLICABLE)

BACKGROUND OF THE INVENTION

This invention relates to loyalty and rewards systems, and more specifically, this invention relates to a loyalty and rewards system for supporting a user incentive program that is implemented using smart card technology.

A variety of user incentive programs are currently implemented in retail and other user-based industries to motivate users to make purchases or engage in promotional activities. While some of these incentive programs, such as coupon and rebate programs, have been effective in enticing users to make one time purchases, they, however, fail to establish long term user loyalty (e.g., repeat purchases from the same merchant).

Generally, manufacturers and merchants (or "providers") issue a variety of coupons and rebates that are associated with an array of redemption methods (e.g., percentage or dollar amount savings on an item purchased, savings on subsequent purchases, etc.). In order to obtain what is often a small savings on a single product, a user may be required to perform a series of actions including gathering the proper coupon (e.g., clip it from a coupon book or news circular), matching the coupon to the appropriate product or products at a retail location (e.g., a supermarket), and redeeming the coupon according to the appropriate redemption instructions (e.g., at the point-of-sale ("POS")). Such a process is time consuming and tedious, which significantly undermines the provider's efforts to generate user interest in long term participation in such coupon and rebate based incentive programs.

Also, users generally desire a large number of choices with regard to the products and services that they are able to purchase. However, as the number of products and services offered increases, it also becomes increasingly difficult for the user to identify specific products and services that the user may be interested in. Because most coupon and rebate based incentive programs do not provide an effective method of allowing the user to search or otherwise identify savings on products that the user may be interested in, it has been difficult to generate user loyalty through such incentive programs.

Additionally, coupon and rebate based incentive programs typically require redemption at a POS or via mail (e.g., mail-in rebates, etc.). In a typical POS transaction, redemption of coupons and rebates are handled separately from actual purchasing activities (e.g., coupons are scanned in addition to product bar codes in order to calculate savings before the user tenders payment of the balance). Consequently, coupon redemption adds an additional step to the purchasing process, which may sometimes significantly increase processing time and introduce errors into the transaction.

It is therefore an object of the present invention to provide a loyalty and rewards system for supporting a user incentive program that allows a user to systematically search, identify, store, and redeem coupons and rebates associated with products from a large number of providers and manufactures. Additionally, because a significant number of purchases are made with debit or credit cards today, it is therefore also an object of the present invention to implement the user incentive program using smart card technology, which integrates the activities associated with the user incentive program (e.g., coupon collection, storage, redemption, etc.), with existing payment methods (e.g., charging a credit card, etc.). Thus, the present invention allows the user to obtain savings and otherwise participate in one or more user incentive programs without adding time consuming and tedious processing that is normally associated with coupon and rebate programs.

BRIEF SUMMARY OF THE INVENTION

In accordance with the present invention, a loyalty and rewards system is provided that implements a user incentive program using smart card technology.

A user incentive program that is implemented using smart card technology may be introduced and marketed to the user, for example, through circular advertisements, through in-store promotions, through statement inserts, or using any other suitable marketing channel, or using any combination thereof. The user may be issued a smart card for use, for example, at a personal computer ("PC") in the home, at an in-store kiosk, at a POS system located at the check-out lane, or at any other suitable access point to initiate activities with the loyalty system, which supports the user incentive program. As technologies emerge and develop, smart cards may be substituted with contactless smart chips (e.g., a key fob RF transmitter, etc.) and access points may include cellular telephones, personal digital assistants ("PDA"s), smart shopping carts, etc.

In order to use the smart card at a personal computer in the user's home, a smart card reader may be coupled to the personal computer. The user may receive the smart card reader, for example, from the provider of the user incentive program. The provider may also supply the user with software for operating the smart card reader, for example, on a CD-ROM, via the Internet, etc., which the user may install and run on his personal computer.

The loyalty system may allow the user to participate in the user incentive program, for example, through a web site that is dedicated to handling activities associated with the user incentive program. The web site may, for example, present the user with the ability to search offerings such as electronic coupons and other suitable loyalty programs. The loyalty system may allow the user to access the web site and view offerings with or without using a smart card. However, when a smart card is not present, the loyalty system may prevent the user from performing certain smart card-related activities. For example, the loyalty system may prevent the user from saving electronic coupons or other loyalty programs to the smart chip on the user's smart card. Similarly, the loyalty system may also prevent the user from viewing or deleting any electronic coupons or other loyalty programs that are currently stored on the smart chip of the user's smart card.

In some embodiments of the present invention, the loyalty system may provide various types of savings to the user. For example, the loyalty system may offer item-level electronic coupons that apply savings to individual items that the user may purchase. In some of these embodiments, the loyalty system may print the amount of savings that is associated with an item-level electronic coupon immediately below the corresponding purchased item on the receipt. Similarly, the loyalty system may also offer transaction-level electronic coupons that apply savings to an entire transaction. In such embodiments, the loyalty system may, for example, print the amount of savings that is associated with a transaction-level electronic coupon immediately below the total of the purchase on the receipt. In some embodiments of the present invention, the loyalty system may also print the amount of total savings that have resulted from the application of all the electronic coupons, for example, below the entire transaction on the receipt.

In some embodiments of the present invention, the loyalty system may personalize offerings of electronic coupons and other loyalty programs to the user based on an associated user profile. The loyalty system may locate and identify the associated user profile, for example, by the user's smart card. A user may be identified by an account number stored in a magnetic stripe, by the serial number of a smart chip, by the serial number of a contactless integrated circuit chip, or by any suitable unique identification means.

In some embodiments of the present invention, the loyalty system may segment the users into unique clusters in which users exhibit similar characteristics. The loyalty system may subsequently assign, for example, special group serial numbers or other identifiers to the smart cards of users within a particular cluster. Alternatively, the loyalty system may save the unique serial numbers or other identifiers of the various users to a cluster profile. In response to creating a cluster, the loyalty system may present special or featured electronic coupons or other loyalty programs that are predetermined to be of interest to users within the particular cluster to those users. Alternatively, the loyalty system may offer featured electronic coupons to all users.

In some embodiments of the present invention, the loyalty system may identify individual users to whom the loyalty system may present a particular featured or special offer to, for example, by conducting a search of user profiles for a particular set of user attributes or characteristics (e.g., car owner).

In some embodiments of the present invention, the loyalty system may allow the user to share his smart card account with other users. In such embodiments, the loyalty system may recognize the user who initially obtained the smart card account as the primary account holder. Additional smart cards may be issued to additional users, who may be recognized by the loyalty system as secondary account holders. The loyalty system may allow the secondary account holders to use the smart card account independently of the primary card holder.

In some embodiments of the present invention, the loyalty system may allow the primary account holder to place restrictions on the smart card account so as to regulate the transactions that the secondary account holders may perform on the account using their respective smart cards.

In some embodiments of the present invention, the loyalty system may provide search functionalities to enable the user to identify offerings of electronic coupons and other loyalty programs that are of specific interest to the user.

In some embodiments of the present invention, the loyalty system may provide the user with more advanced search functionalities that may recommend electronic coupons or other loyalty programs to the user based on the user's needs, interests, or other suitable criteria.

In some embodiments of the present invention, the loyalty system may promote offerings of electronic coupons and other loyalty programs to the user through pop-up windows that may be activated, for example, upon the user accessing the provider's web site. In one suitable approach, the loyalty system may display the latest electronic coupons in one or more pop-up windows when the user accesses the web site. The loyalty system may remove the pop-up windows, for example, after a predefined period if the user does not interact with the pop-up windows. In another suitable approach, the loyalty system may vary the electronic coupons displayed within a pop-up window, for example, by circulating through a predefined list of electronic coupons and other loyalty programs. The display could take other forms other than pop-ups. For example, dynamic displays, multimedia content, and other mechanisms to direct the user's attention to a particular part of the display.

In another suitable approach, the loyalty system may replace the electronic coupons displayed within a pop-up window, for example, as new electronic coupons are added to the database for storing electronic coupons and other loyalty programs. In yet another suitable approach, the loyalty system may vary the electronic coupons displayed within a pop-up window based on the type of electronic coupons and other loyalty programs that the user has shown interest towards (e.g., by selecting a coupon, by searching for a product, by searching for a brand, etc.). The loyalty system may also personalize the group of coupons that are shown to the user in pop-up windows based on, for example, a unique group smart chip identification number, criteria in the user profiles, any other suitable criteria, or any combination thereof.

In some embodiments of the present invention, a portal or other suitable software package may be installed on the user's home computer so that the loyalty system may display pop-up windows or instant messages containing the latest electronic coupons and other loyalty programs on the user's desktop, PDA, cellular telephone, or other suitable channel, for example, when the user initiates an Internet session. In some embodiments of the present invention, the loyalty system may allow the user to disable the pop-up window feature.

In some embodiments of the present invention, the loyalty system may allow the user to save electronic coupons and other loyalty programs to a wishlist, which may be maintained for the user within the loyalty system. The loyalty system may then allow the user to download some or all of the saved electronic coupons and other loyalty programs (from the wishlist) onto the smart chip of the user's smart card at a later time.

In some embodiments of the present invention, the loyalty system may create and store profiles of participating retail stores. Based on the store profile information, the loyalty system may, for example, help the user to locate a participating retail location that has a pharmacy. The loyalty system may also present the user with offerings of, for example, health and beauty products, from a retail store that the user frequents to purchase such products.

In some embodiments of the present invention, the loyalty system may allow the user to specify one or more participating retail locations that the user may be most interested in receiving promotional information from. Based on the user's specification, the loyalty system may, for example, present electronic coupons and other loyalty programs associated with these retail locations as featured offerings to the user.

In some embodiments of the present invention, the loyalty system may allow the user to sort a shopping list of his saved electronic coupons and other loyalty programs based on the layout of a particular retail location. For example, the loyalty system may generate a printable shopping list that is sorted in a logical manner for proceeding through the store (e.g., in an order that the user would encounter each product were he/she to proceed aisle-by-aisle through the retail location, etc.) based on, for example, the store layout description or layout maps that have been stored by the loyalty system (e.g., in a store profile).

In some embodiments of the present invention, the loyalty system may dynamically link new promotional offers to electronic coupons and other loyalty programs that are saved on the user's smart card to encourage the user to take advantage of the new promotional offers. For example, the loyalty system may generate new promotional offers that may or may not necessarily be electronic coupons, for example, on a daily basis based on inventory or any other suitable criteria. The loyalty system may then link these promotional offers to appropriate electronic coupons or other loyalty programs that have been issued, for example, based on brand, function, or any other suitable criteria. Notification of the user as to related promotional offers may be made by any suitable method.

When the user views his saved electronic coupons, purchases items using the smart card, or otherwise interacts with the loyalty system using his smart card, the loyalty system may compare the user's saved electronic coupons and loyalty programs to the list of electronic coupons and loyalty programs that are associated with new promotional offers. If the loyalty system identifies an electronic coupon or loyalty offer associated with promotional offers, the loyalty system may present the new promotional offer to the user, for example, by displaying a pop-up window containing the new promotional offer on an appropriate screen.

In some embodiments of the present invention, the loyalty system may automatically dispense savings to the user, for example, when the user uses a smart card at a POS system, when the user checks out of the online store, or when the user checks out at any other suitable purchasing point associated with the loyalty system.

In some embodiments of the present invention, the loyalty system may allow the user to accumulate rewards and redeem electronic coupons using a smart card while at the same time paying for all or part of the purchase using, for example, a gift card, a gift certificate, or any other suitable alternative payment option. Some embodiments of the present invention may allow the combination of any suitable form of payment with the smart card to complete the transaction.

In some embodiments of the present invention, the loyalty system may allow authorized personnel, such as user service representatives, to deliver specific offers to a particular user. For example, in the event that a mistake has been detected on the user's previous purchase or an error occurred in the downloading to/redeeming from of offers on the smart card, the user service representative may offer an electronic. coupon or other loyalty reward to make up for the error. The user service representative may deliver the offer to the user, for example, via email. The loyalty system may further allow the user to save the offer from the email to the smart chip of the user's smart card for use during the next purchase. Alternatively, the offer may be delivered in a featured coupon region or other prominent region of the dynamically generated web page that is generated next time the user signs into the loyalty system with his smart card.

In another suitable approach, the loyalty system may allow the user representative to save the offer to a dedicated special offers list or database that may be centrally maintained by the loyalty system. The loyalty system may uniquely identify each special offer in the list or database, for example, by associating the smart chip ID of the user's smart chip with the stored offer. The loyalty system may then automatically dispense the special offer to the user's smart chip, for example, the next time the user's smart card is in communication with the loyalty system.

In yet another suitable approach, the loyalty system may allow the user service representative to save the special offer to the user's wishlist, which the user may download to his smart chip at a later time.

In some embodiments of the present invention, the loyalty system may allow various sponsors to reserve open "buckets" (memory fields) on the smart chips. In one suitable approach, the loyalty system may carve out memory slots for a sponsor and assign a unique sponsor code to those memory slots. Alternatively, the loyalty system may search across all buckets on the smart chip for associated sponsor codes. When the user uses the smart card to initiate communication with the loyalty system, the loyalty system may, for example, place electronic coupons, other loyalty programs, and any other suitable special offers that are associated with the sponsor into the memory slots associated with the unique sponsor code.

By implementing such open buckets in the memory of the smart chips, the loyalty system may restrict aggressive sponsors from taking up too much memory space on the user's smart chip. Additionally, such an implementation may prevent the user from using all of the memory space, and therefore allow certain sponsors to always have space available on a user's smart card for their offers.

In some embodiments of the present invention, the loyalty system may allow the user to perform all the above-described and any other suitable smart card-related activities, for example, using suitable equipment having a touch screen. One of such suitable touch screen equipment is an in-store kiosk. Other suitable touch screen equipment may include, for example, an automatic teller machine having a touch screen, an in-home computer having a touch screen, or any other suitable equipment that may include a touch screen and has similar capabilities as the in-store kiosk, which will be described in more detail below.

Further features of the invention, its nature and various advantages will be more apparent from the accompanying drawings and the following detailed description of the preferred embodiments.

BRIEF DESCRIPTION OF THE DRAWINGS

FIG. 15 shows an illustrative display screen for allowing the user to conduct searches for electronic coupons and other loyalty programs in accordance with one embodiment of the present invention;

FIG. 26 shows an illustrative display screen that allows the user to select retail locations to receive offerings from in accordance with one embodiment of the present invention;

FIG. 30 show an illustrative display screen that display electronic coupons that have been sorted into a shopping list based on a the layout of a retail location specified by the user in accordance with one embodiment of the present invention;

DETAILED DESCRIPTION OF THE INVENTION

Figure 1:
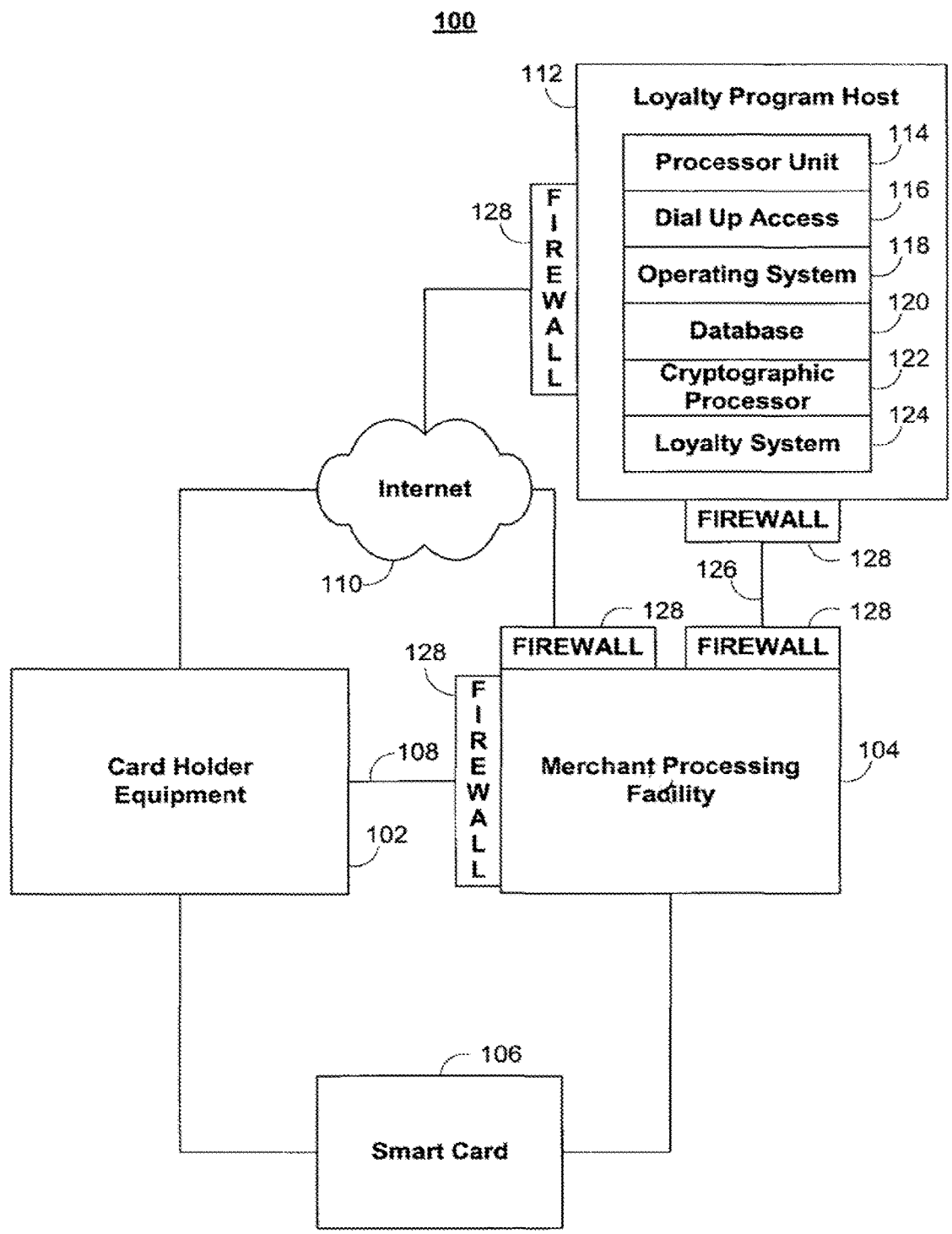
FIG. 1 shows an illustrative loyalty and rewards system in accordance with one embodiment of the present invention.

FIG. 1 shows an illustrative loyalty and rewards system 100 in accordance with one embodiment of the present invention. Loyalty and rewards system 100 may be any suitable data transaction system for allowing transferring of information such as purchasing-related information and information associated with the user incentive program among one or more card holder equipment 102 and merchant processing facility 104. Merchant processing facility 104 could also be operated by a card issuer, such as a bank.

Smart card 106 may be used by a user (e.g., card holder) to initiate activities associated with the user incentive program. Activities associated with the user incentive program may include, for example, selecting various loyalty programs such as electronic coupons, sweepstakes, loyalty accumulation, and other redemption programs, for storage on smart card 106. Activities associated with the user incentive program may also include, for example, viewing, updating, removing, otherwise managing various loyalty programs using the smart card, any other suitable activities, and any combination of activities thereof.

The user may use smart card 106 to initiate such activities either directly at merchant processing facility 104 or at one or more card holder equipment 102. Card holder equipment 102 may be located remotely from merchant processing facility 104 (e.g., at the user's home). Card holder equipment 102 may communicate with merchant processing facility 104 via communications link 108. Communications link 108 may be any suitable communications link for transmitting loyalty program-related data, purchasing data, any other suitable data, and any combination of data thereof between merchant processing facility 104 and card holder equipment 102. In one suitable application, dedicated telephone lines or other suitable data communications lines may be used. Such dedicated communications lines may prevent access by the public and may be desirable if a higher degree of security is required.

In another suitable approach, a publicly-switched telephone network may be used. Card holder equipment 102 may utilize, for example, a modem, to convert digital messages into frequency modulated analog signals for transmission over telephone lines to, for example, another modem at merchant processing facility 104. Card holder equipment 102 may also 5 communicate digital data directly over integrated services digital network ("ISDN") lines of the publicly-switched telephone network to merchant processing facility 104 by, for example, placing a call to merchant processing facility 104.

Proprietary protocols and data formats may be used to ensure security of information during communication between card holder equipment 102 and merchant processing facility 104. When proprietary protocols and data formats are used, appropriate software, which may also be proprietary, for supporting the various protocols and message formats may be distributed and installed on card holder equipment 102.

Alternatively, card holder equipment 102 may communicate with merchant processing facility 104 via 20 Internet 110. When Internet 110 is used to provide standardized communication, a standard format of Transport Control Protocol/Internet Protocol ("TCP/IP"), which employees multiple layers of encapsulating headers containing communication information to provide byte stream or datagram communications to computers on the networks coupled to Internet 110, may be used in place of or in addition to proprietary protocols and data formats. In such an embodiment of the present invention, card holder equipment 102 may additionally include Internet applications, such as an Internet browser, for supporting TCP/IP based communication with merchant processing facility 104.

Merchant processing facility 104 may be any suitable combination of hardware and software for supporting various smart card-related functional requirements. The various smart card-related functional requirements may include, for example, receiving and responding to requests from card holder equipment 102, ensuring secure and fault tolerance access to loyalty program host 112, for example, in order to exchange parameters and transaction files, and any other suitable smart card functionalities. Merchant processing facility 104 may be, for example, IBM mainframe hardware running a multiple virtual storage ("MVS") operating system or any other suitable combination of hardware and software.

Loyalty program host 112 may be any suitable combination of hardware and software for handling loyalty program-related processing. Loyalty program host 112 may also manage credit-related processing. Loyalty program host 112 may include, for example, processor unit 114, dial up access 116, operating system 118, database 120, cryptographic processor 122, and loyalty system 124.

Processor unit 114 may be any suitable processing equipment for carrying out the various credit-related and loyalty program-related operations. The various credit-related and loyalty program-related operations may include, for example, credit settlement and clearance. Dial up access 116 may be any suitable modem bank for supporting physical POS ("PPOS," as distinguished from Internet POS) communications. Operating system 118 may be any standard operating system such as a Microsoft Windows 2000 server or any other suitable platform for running the various loyalty program host operations and applications. Loyalty System 124 may be any suitable combination of hardware and software for managing loyalty program-related processing. The loyalty program-related processing may include, for example, crediting savings to the user's credit card, storing transactional information, any other suitable processing, or any combination thereof.

Loyalty program host 112 may communicate with merchant processing facility 104 via communications link 126. Communications link 126 may be, for example, a T1 connection with associated router or any other suitable communications link, for providing restricted access from merchant processing facility 104. Loyalty program host 112 may also communicate with merchant processing facility 104 via Internet 110.

Access to merchant processing facility 104 as well as access to loyalty program host 112 from nonsecure sources may be restricted by firewalls 128. Non-secure sources may be any data source that transfers 20 data to merchant processing facility 104 or loyalty program host 112 over nonsecure network or communications links. Nonsecure sources may be, for example, Internet 110, card holder equipment 102, or any other suitable source. Firewalls 128 may be any suitable combination of securities hardware and software for interrogating requests for information transfer from external sources (e.g., the Internet) to determine whether such requests should be directed to a location within loyalty program host 112 or merchant processing facility 104 for secured processing.

Figure 1A:
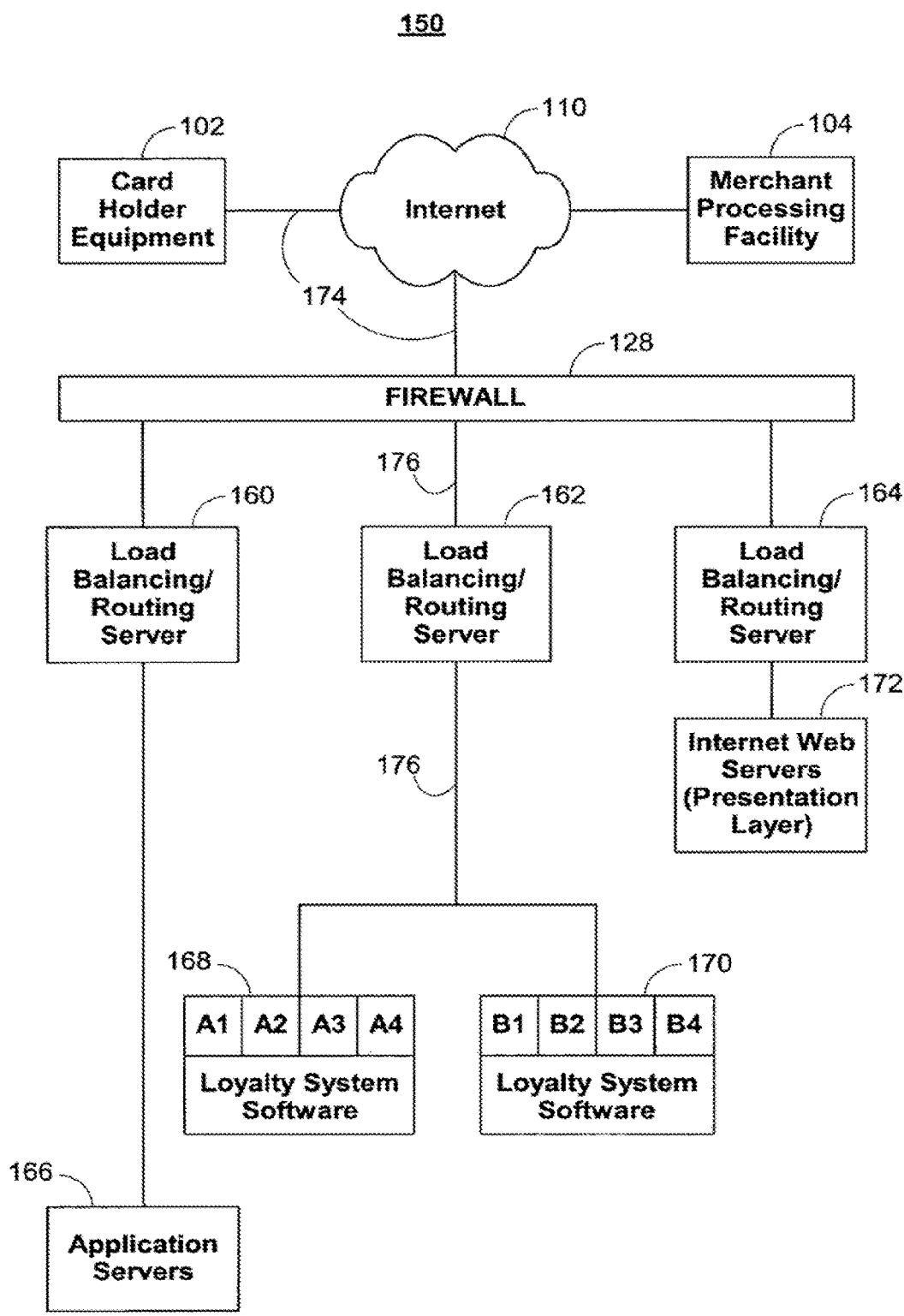
FIG. 1A shows illustrative network communication equipment in accordance with one embodiment of the present invention.

FIG. 1A shows an illustrative hardware scheme 150 for some of the equipment used in connection with loyalty program host 112. When a user interacts with the loyalty and rewards system, they may do so from their home using card holder equipment 102, from an in-store kiosk at merchant processing facility 104, or via any other suitable point of interaction. Card holder equipment 102 and merchant processing facility 104 may communicate over Internet 110 via any suitable communication means 174, such as telephone lines, DSL lines, cable lines, etc. When a request for interaction with the system is made via Internet 110, the request may pass through firewall 128 to load balancing/routing server 164. Load balancing/routing server 164 may distribute requests to view system web pages to one or more Internet Web Servers (Presentation Layer) 172. Communication between components beyond firewall 128 may take place via communication means 176, which may include telephone lines, DSL lines, cable lines, etc.

Once a user is interacting with web pages hosted by one of Internet Web Servers 172, the local software on personal computer 304 (card holder equipment) or personal computer 526 (kiosk) may request a transaction ID from the loyalty and rewards system so that information can be exchanged securely. This request may pass through firewall 128 to load balancing/routing server 162. Load balancing/routing server 162 may distribute requests for transaction IDs to one or more of virtual loyalty system software servers A1, A2, A3, or A4, residing on loyalty system software server 168 or virtual loyalty system software servers B1, B2, B3, or B4, residing on loyalty system software server 170. In other words, the loyalty system software server may be both physically and virtually replicated in whole or in part (i.e., physical loyalty system software servers 168 and 170 and virtual loyalty system software servers A1, A2, A3, A4, B1, B2, B3, and B4 may be replications of one loyalty system software server). Each of the virtual loyalty system software servers is assigned a unique IP (Internet Protocol) address and may or may not have a unique port address. Each virtual loyalty system software server processes requests on its assigned port. Using the unique IP and port addresses, load balancing/routing server 162 is able to balance the load of requests on the loyalty system software server across the various replications of the loyalty system software server.

Various software applications (e.g., for exchanging rewards points with the loyalty and rewards system, etc.) for the loyalty and rewards system may be housed on application servers 166. To reach application servers 166, requests may have to pass through firewall 128 and load balancing/routing server 160. The selected port of the loyalty system software server with which a particular user is interacting with is passed between the loyalty program host 112 and card holder equipment 102 or merchant processing facility 104 in the header of a standard 25 HTTP Internet request. Such data transactions could also implement standard HTTPS and Secure Sockets Layer ("SSL") communication techniques. This ensures that as a user interacts with loyalty system software servers 168 and 170 and with application servers 166, the user's requests continue to go back to the specific loyalty system software server and application server from which the user's session originated.

Figure 2:
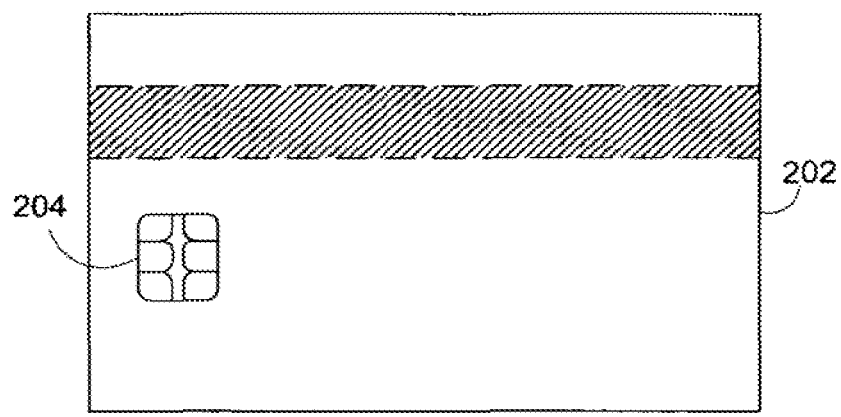
FIG. 2 shows an illustrative smart card in accordance with some embodiments of the present invention.

FIG. 2 shows an illustrative smart card 106 in accordance with some embodiments of the present invention. Smart card 106 may include, for example, magnetic stripe 202, smart chip 204, and any other suitable mechanism, for example, for identifying the user, for identifying the provider of the smart card, for storing or providing any other suitable information, and for performing any combination of activities thereof. Smart card 106 could also implement contactless chip technology.

Magnetic stripe 202 may be any standard magnetic stripe for use on a machine-readable card that is encoded with information, which when read by a magnetic stripe reader provides information, for example, about the user's identity, about the user's credit history, about the user's account information, about any other credit card-related information associated with the user, about loyalty program-related information, about any other suitable information, or 20 25 about any combination of information thereof.

Smart chip 204 may be, for example, an integrated circuit ("IC") or any other suitable electronic device that includes within it electronic memory for allowing storage and retrieval of digital information. Such digital information may include, for example, loyalty program information such as electronic coupons that are applicable to individual items or item-level electronic coupons (e.g., $5 off a particular product}, electronic coupons that are applicable to an entire transaction or transaction-level electronic coupons (e.g., $15 off the entire purchase), or any other suitable digital information.

In some embodiments of the present invention, the electronic memory of smart chip 204 may be divided into two or more memory slots, for example, for automatically storing different types of electronic coupons. For example, item-level electronic coupons may be stored in a separate memory slot than transaction-level electronic coupons. As another example, electronic coupons issued by different manufacturers or providers may be separately stored in different memory slots. As yet another example, electronic coupons that are associated with different expiration requirements (e.g., one time use coupons and reusable coupons) or any other suitable identifiable characteristics may be stored separately in different memory slots to enable, for example, faster access. In some embodiments, each electronic coupon or loyalty program may reside in its own memory slot. For example, the IC may have its memory allocated such that a fixed number of electronic coupons and loyalty programs fit in the IC's memory (e.g., 36 coupon and program slots).

Figure 3:
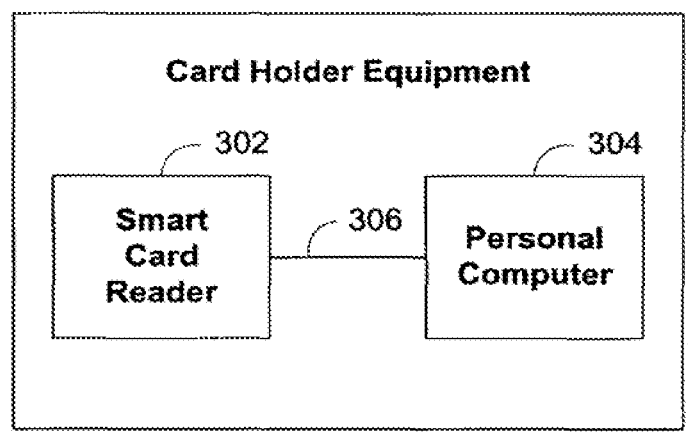
FIG. 3 shows illustrative card holder equipment in accordance with one embodiment of the present invention.

FIG. 3 shows illustrative card holder equipment 300 in accordance with one embodiment of the present invention. Smart card reader 302 may be any suitable device for reading digital information from and writing digital information to smart chip 204 of FIG. 2. Smart card reader 302 may have, for example, a slot in which the user may insert smart card 106 of FIG. 1.

In one embodiment of the present invention, smart card reader 302 may be coupled to personal computer 304 via communications link 306. Communications link 306 may be any suitable communications link for transmitting data between smart chip 204 (FIG. 2) and personal computer 304 through smart card reader 302. Communications link 306 may be, for example, a serial or Universal Serial Bus ("USB") connection.

Suitable software for operating smart card reader 302, for example, to enable smart card reader 302 to retrieve and write data from or to smart chip 204 of FIG. 2, may be installed on personal computer 304. In some embodiments of the present invention, smart card reader 302 may also include a lockdown mechanism, for example, to prevent accidental removal of the smart card when data is being transferred to or from the smart card. The lockdown mechanism may be provided in such a manner that it may be manually overridden, for example, in the event of a power failure or card reader malfunction.

Personal computer 304 may be any suitable computer that is capable of running applications such as Internet browser software, which may, for example, execute various dynamic link libraries ("DLLs") to support transactions with smart card 204 (FIG. 2) through smart card reader 302.

Figure 4:
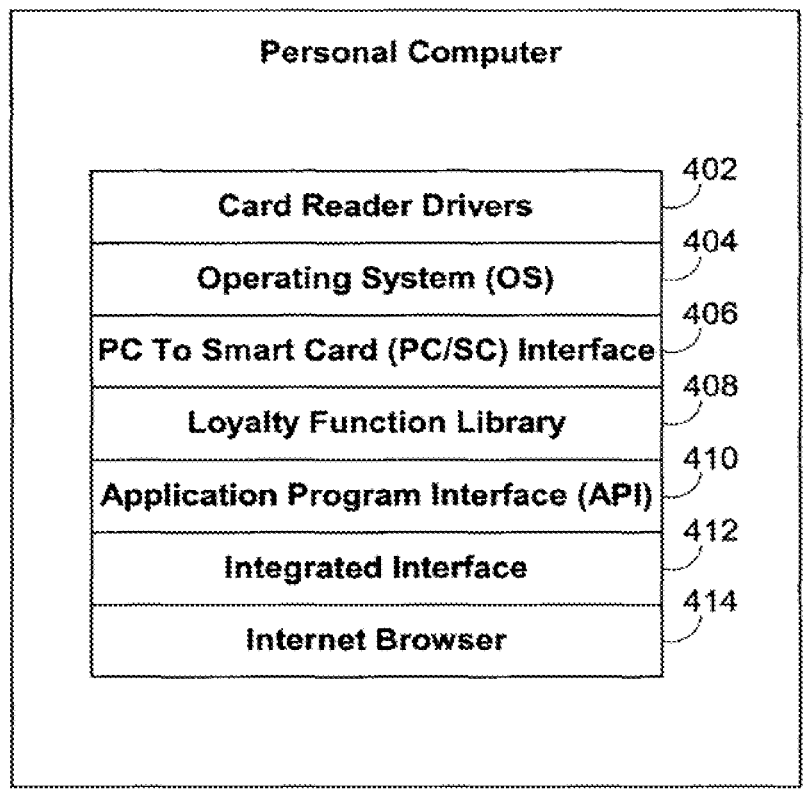
FIG. 4 shows an illustrative personal computer in accordance with one embodiment of the present invention.

FIG. 4 shows an illustrative personal computer 400 in accordance with one embodiment of the present invention. Personal computer 400 may include card reader drivers 402, operating system ("OS") 404, personal computer to smart card ("PC/SC") interface 406, and loyalty function library 408, which may comprise dynamic link library ("DLL") files, and any other suitable devices, which in combination effectuate communication with smart card reader 302 of FIG. 3.

Card reader drivers 402 may be any suitable bundle of programs for communicating with the particular smart card reader 302 (FIG. 3) that is coupled to personal computer 304. Card reader drivers 402 may be, for example, proprietary software that may be distributed for installation with card reader 302. Operating system 404 may be any standard operating system, such as a Microsoft Windows operating system, that is capable of running applications such as an Internet browser and other suitable applications associated with smart card processing.

Loyalty function library 408 may be any suitable collection of small programs, which may be, for example, invoked to allow communication with devices that are coupled to personal computer 304 such as smart card reader 302. PC/SC interface 406 may be an industry standard interface between programming and PC hardware in a smart card that has been defined, for example, by the PC/SC Working Group. PC/SC interface 406 may also be an interface that is developed based on, for example, the OpenCard standard.

In one embodiment of the present invention, a suitable application program interface ("API") 410 may be installed on personal computer 304. The API may provide, for example, a set of routines, protocols, and tools for supporting smart card data transfer and other functionalities associated with smart card processing. API 410 may be, for example, Java applets, which are supported by most conventional Internet browser applications such as Internet Explorer and Netscape Navigator.

Personal computer 304 may also include integrated interface 412 in some embodiments of the present invention. Integrated interface 412 may be put in place to foster and regulate communications between loyalty function library 408, API 410, and Internet browser 414, which may be written in different programming languages. Integrated interface 412 may be, for example, a Java native interface file wrapper.

Card reader drivers 402, loyalty function library 408, and integrated interface 412, the elements that actually effectuate communication with smart card reader 302 of FIG. 3, may be installed locally on personal computer 400, for example, via a CD-ROM, an Internet download, or any other suitable mechanism for software installation. The CD-ROM may be distributed to the user, for example, when the user enrolls in the user incentive program or when the user obtains a smart card from the provider.

In a standard data communication process involving the various elements 402-414 on personal. computer 400, Internet browser 414 may use a suitable command language such as JavaScript, to invoke various functions of API 410. API 410 may in turn invoke various .dll functions from loyalty function library 408 via integrated interface 412. The .dll functions of loyalty function library 408 may then communicate with PC/SC interface 406 to further communicate with OS 404 and card reader drivers 402. Card reader drivers 402 ultimately initiate reading or writing of information from or to smart card 106 of FIG. 1.

Once personal computer 400 receives information that is collected from a smart card by smart card reader 302 of FIG. 3, personal computer 400 may copy the base data, which may be, for example, base 64 ASCII card data, to a secure Internet form (e.g., −31-HTTPS). Internet browser 414 may then establish a secure sockets layer ("SSL") with, for example, merchant processing facility 104 of FIG. 1 to transfer the data. SSL and HTTPS technology are standards for encrypting and sending secure information over the Internet while still utilizing standard HTML request keywords like GET and POST. This data transmission technology can be used to transmit data in any type of Internet environment, regardless of the actual source of the data.

Figure 5:
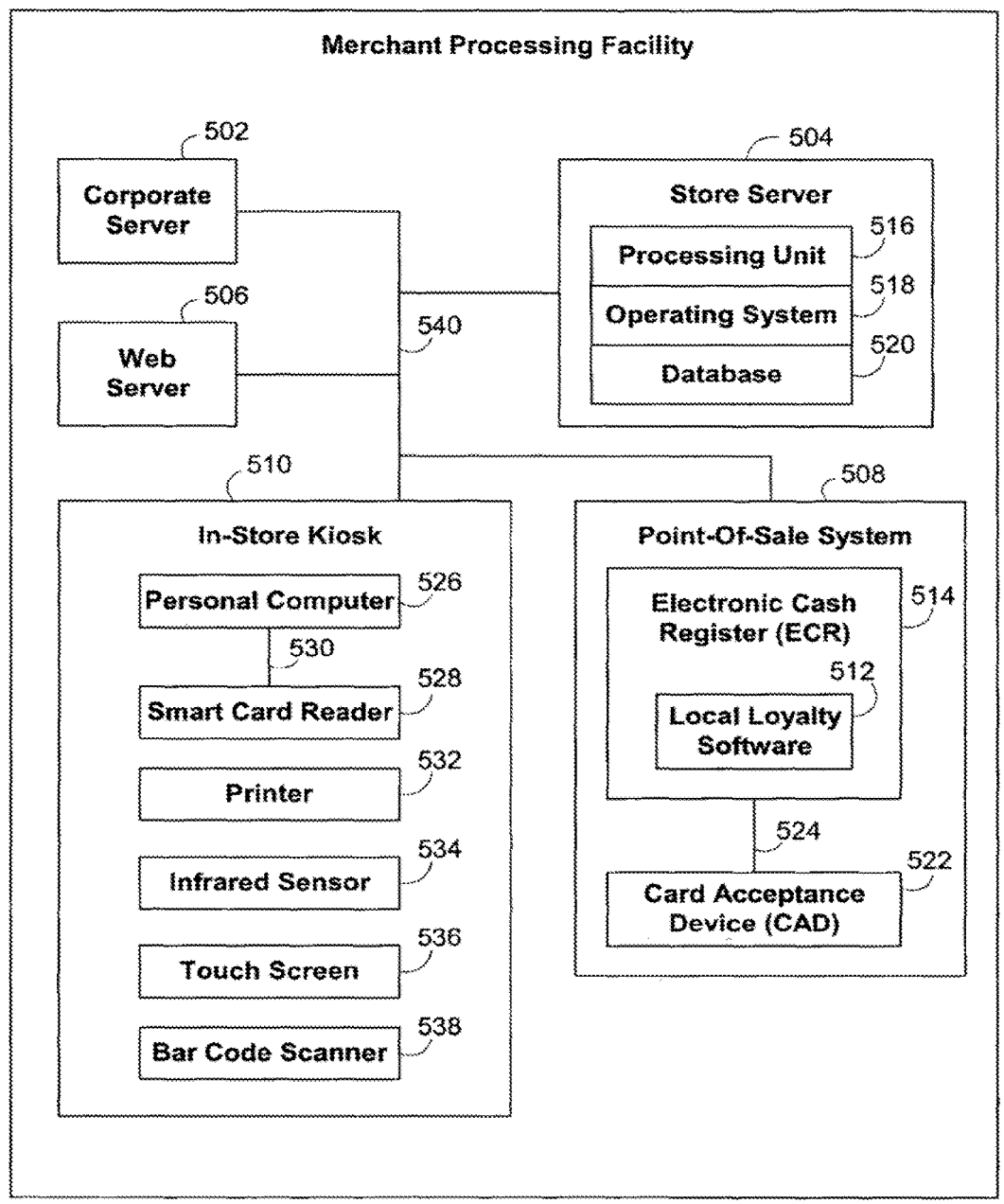
FIG. 5 shows illustrative merchant processing facility in accordance with one embodiment of the present invention.

FIG. 5 shows illustrative merchant processing facility 500 in accordance with one embodiment of the present invention. Merchant processing facility 500 may include corporate server 502, store server 504, web 15 server 506, POS system 508, and in-store kiosk 510. These various components of merchant processing facility 500 may communicate via communication means 540, which may include telephone lines, DSL lines, cable lines, etc. Corporate server 502 may be any suitable combination of hardware and software for providing for general business processing within merchant processing facility 500. General business processing that corporate server 502 may deal with may include, for example, inventory maintenance and insurance of secure and fault tolerance access to loyalty program host 112 of FIG. 1, for example, to exchange parameter and transaction files related to loyalty programs. In some embodiments of the present invention, corporate server 502 may establish access to loyalty program host 112 of FIG. 1 to exchange parameter and transaction files related to loyalty programs on a daily basis, or on any suitable schedule.

Store server 504 may be any suitable combination of hardware and software for supporting in-store inventory, transaction, and smart card functionalities such as providing price-lookup, acting as the main in-store data repository, storing transaction data, etc. More specifically, store server 504 may maintain store parameter files received from, for example, corporate server 502. Store server 504 may also provide access to the store parameter files, for example, by one or more local loyalty software 512 residing on one or more electronic cash register ("ECR") 514, which may be located within POS system 508. Alternatively, store server 504 may distribute copies of parameter files to the various ECRs 514 15 located in a given retail location. Store server 504 may also provide, for example, a fail-safe mechanism for receiving loyalty transaction records from ECR 514 and transmitting them to corporate server 502, for example, for subsequent batch transmission to loyalty program host 112 of FIG. 1.

Store server 504 may include processor unit 516, operating system 518, and database 520. Processor unit 516 may be any suitable processing equipment for carrying out the various business operation-related processing such as product price look-up. Operating system 518 may be any standard operating system such as a Microsoft Windows 2000 Server or any other suitable platform for running the various store operations. Database 520 may be any suitable database for storing data such as smart card transaction records, customer information, or any other suitable data. Database 520 may be, for example, a Microsoft SQL 2000 database. Store server 504 may include server software that is responsible for downloading files from, e.g., corporate server 502. The server software may also maintain backup files and monitor the delivery of corporate files to the individual ECRs 514.

Web server 506 may be operated by merchant processing facility 500 and may include any suitable combination of hardware and software, for example, for hosting web applications that support various smart card-related Internet activities. The various smart 10 card-related Internet activities may include, for example, user web access activities, smart card maintenance activities, and any other suitable activities. A more detailed description of web server 506 will be given below in conjunction with FIG. 6.

POS system 508 may be any suitable combination of hardware and software for processing sales transactions at the store checkout lane. POS system 508 may include card acceptance device ("CAD") 522. CAD 522 may be any suitable POS card reader device that is capable of exchanging application protocol data units ("APDUs"), for example, with smart card 106 of FIG. 1. In some embodiments of the present invention, CAD 522 may also provide cryptographic services to local loyalty software 512. CAD 522 may be capable of accepting various tender types (e.g., gift cards, store credit, traveler's checks, etc.). Additionally, CAD 522 may be capable of receiving user input (e.g., cardholder's signature, user selection from a list of available rewards, etc.). CAD 522 may receive input via a touchscreen, stylus, keypad, or any other suitable input device. The touchscreen may be capable of displaying a list of available rewards to choose from or of displaying various promotional messages (e.g., "you saved $X by using your smart card today," etc.).

CAD 522 may be coupled to electronic cash register ("ECR") 514, for example, via interface 524. Interface 524 may be any suitable interface for allowing transmission of smart card data (e.g., transaction data, loyalty data, security data, etc.). Interface 524 may be, for example, an RS-485 data interface, an RS-232 data interface, a powered Universal Serial Bus ("USB"), or any other suitable data interface.

ECR 514 may host local loyalty software 512 for in-store loyalty processing. In some embodiments of the present invention, ECR 514 may also run common POS software, which may, for example, allow ECR 514 to communicate with any local loyalty software 512 that contains proprietary software. In some embodiments, the common POS software may also support standard check-out processing at POS system 508.

In contrast to card holder equipment 102 of FIG. 1, which may communicate with merchant processing facility 104 (FIG. 1) through Internet 110 (FIG. 1), ECR 514 may communicate with, for example, corporate server 502, store server 504, or any other suitable 25 merchant processing server. ECR 514 may communicate with a merchant processing server via a virtual private network ("VPN") or via any suitable communication arrangement.

In embodiments where POS system 508, in which ECR 514 resides, is situated at the same location as store server 504 (e.g., in the same retail store), ECR 514 may additionally or alternatively communicate with store server 504 on a private store network. Store server 504 may then in turn communicate with corporate server 502. There may be more than one POS system 508 in a given merchant processing facility 500, although only one is shown to avoid overcomplicating the drawing.

In-store kiosk 510 may be any suitable combination of hardware and software that allows the user to perform activities very similar to those that the user may perform on card holder equipment 300 of FIG. 3. In-store kiosk 510 may include personal computer 526 and smart card reader 528 that are very similar in features, functions, and setup to personal computer 304 and smart card reader 302 of card holder equipment 300 (FIG. 3).

Smart card reader 528 may be any suitable device for reading digital information from and writing digital information to smart chip 204 of FIG. 2. Smart card reader 528 may have, for example, a slot, into which the user may insert smart card 106 of FIG. 1. Smart card reader 528 may also be capable of reading any information encoded in, for example, magnetic stripe 202 (FIG. 2), or printed on a barcode, of smart card 106 (FIG. 1). In some embodiments of the present invention, smart card reader 528 may also include a lockdown mechanism, for example, to prevent-accidental removal of the smart card when data is being transferred to or from the smart card. The lockdown mechanism may be provided in such a manner that it may include, for example, an option for the user or an authorized person to manually override the lockdown in the event of power failures or kiosk malfunctioning.

In one embodiment of the present invention, smart card reader 528 is coupled to personal computer 526 via communications link 530. Communications link 530 may be any suitable connection for communicating data between smart card reader 528 and personal computer 526. Communications link 530 may be, for example, a serial or Universal Serial Bus ("USB") connection. Suitable software for operating smart card reader 528 to retrieve data from and write data to smart chip 204 (FIG. 2) may be installed on personal computer 526.

Personal computer 526 may be any suitable personal computer that is capable of running applications such as Internet browser software, which may, for example, execute DLLs to support transactions with smart chip 204 (FIG. 2) through smart card reader 528. Loyalty programs may be added to or removed from smart card 106 (FIG. 1) by the user over the Internet or via a Virtual Private Network ("VPN") using in-store kiosks 510.

In some embodiments of the present invention, in-store kiosk 510 may include printer 532, for example, for dispensing shopping lists and copies of saved electronic coupons, wishlists, store maps, or any other printable information. In-store kiosk 510 may also include infrared sensor 534, for example, to determine and alert events such as when a user leaves the proximity of in-store kiosk 510 without removing his/her smart card 106. To alert such events, in-store kiosk 510 may, for example, beep to get the user's attention, play a pre-recorded message, or perform any other suitable actions. In addition, any suitable types of computing devices may be used such as personal computers (that may be equipped with one or more input devices—e.g., a keyboard, mouse, trackball, pen, a speech recognition interface, etc.), tablet computers, cell phones, personal digital assistants, etc.

In some embodiments of the present invention, instead of using a monitor that is often associated with personal computer 526 to display information to the user, in-store kiosk 510 may include touch screen interface 536 as an alternative or additional display. Touch screen interface 536 may be integrated with the Internet kiosk-specific applications to enable the user to access web-based applications. In some embodiments of the present invention, special graphic interfaces may be implemented and installed to display information in a more suitable matter on touch screen interface 536. Kiosk 510 may also include a keyboard, trackball other suitable buttons, or any combination thereof as additional or alternative methods of navigation in embodiments including touch screen interface 536.

In some embodiments of the present invention, bar code scanner 538 may be coupled to in-store kiosk 510. Bar code scanner 538 may be provided, for example, to allow the user to search for specific smart card or electronic coupon-related information that is associated with a specific product. The user may, for example, scan a product that he is interested in at in-store kiosk 510 using bar code scanner 538 and then use touch screen interface 536 to initiate a search for electronic coupon-related information that is specific to the scanned product. Bar code scanner 538 may also enable the user to search, for example, for other product-specific information such as product price and description without aid from in-store personnel.

In some embodiments, smart card/magnetic stripe reader 528, bar code scanner 538, or any other suitable input/output ("I/O") device may be capable of retrieving information from a user's driver's license or other device which has personal identification information. Information may be stored on the driver's license on a magnetic stripe, barcode, or other suitable data encoding means. Once the information is scanned or read by kiosk 510, the information may be used to complete an instant credit application (e.g., a user may be able to apply for a credit card having a smart chip for use with the loyalty and rewards system). For example, software on kiosk 510 may fill-in a secure application form on a web site, a .pdf (portable document format}, a printable form to be mailed or faxed, or any other suitable way of transmitting user information to a credit agency. Information retrieved from a user's driver's license may also be used to validate the identity of the kiosk user.

In some embodiments of the present invention, walking away from kiosk 510 (e.g., a user steps out of the range of infrared sensor 534) may trigger a clearing of any cache or cookies created and/or saved to kiosk 510. For example, infrared sensor 534 may inform personal computer 526 that the user has left the vicinity of kiosk 510, and personal computer 526 may then execute a program that clears the cache and cookies from the local memory of kiosk 510.

In some embodiments, the virtual private network, in-store network, or other communications means used by kiosk 510 may be used to distribute software updates to the kiosks. Merchant processing facility 500 may be comprised of multiple retail locations having multiple kiosks. Therefore, it may be desirable to use the communications network to distribute software to all of the kiosks in merchant processing facility 500 at one time.

There may be multiple in-store kiosks, although only one is shown to avoid overcomplicating the drawing.

Figure 6:
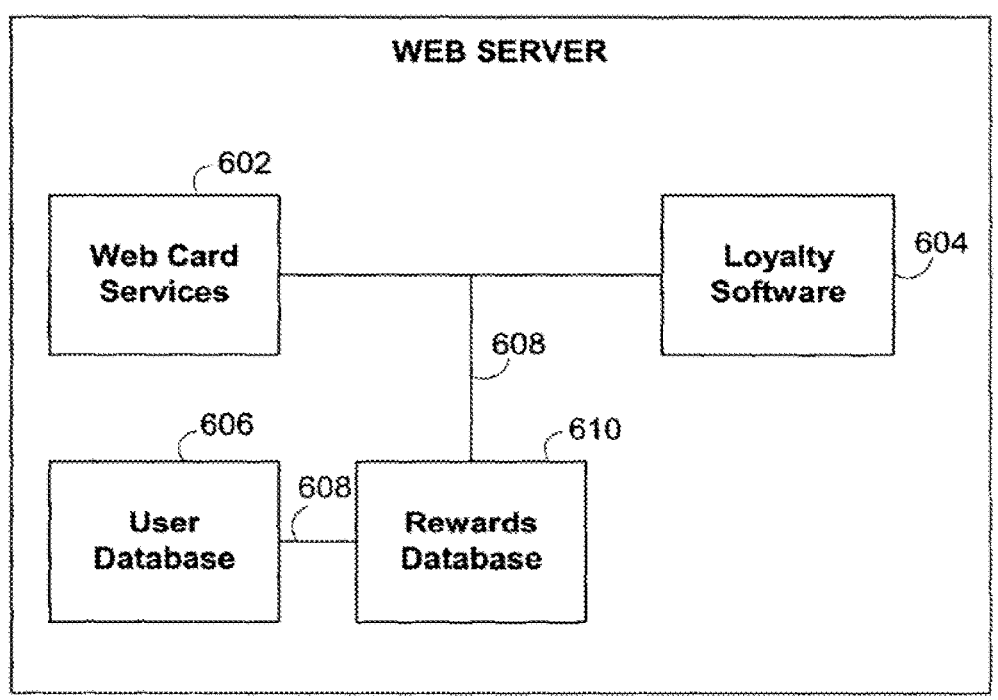
FIG. 6 shows an illustrative web server in accordance with one embodiment of the present invention.

FIG. 6 shows illustrative web server 600 in accordance with one embodiment of the present invention. Web server 600 may serve as web server 506 in FIG. 5 and may include Web Card Services ("WCS") 602, web loyalty software 604, rewards database 610, and user database 606. These components may reside on one piece of hardware, or they may each reside on individual pieces of hardware. The various components may communicate via communication means 608, which may include telephone lines, DSL lines, cable lines, etc. WCS 602 may be any suitable software package, for example, for controlling the user's or a service representative's ability to maintain and enquire information stored on smart card 106 (FIG. 1). WCS 602 may allow such maintaining and enquiring of information stored on smart card 106, for example, through a web site dedicated to such services (e.g., a web site sponsored by the provider of the smart card).

WCS 602 may incorporate various browser plug-in, server applet, and graphic user interface functionalities. When a request to access information stored on the user's smart card is received from the user using the smart card, WCS 602 may decide which web loyalty software 604 to direct the request to and subsequently direct the request to one or more web loyalty software 604 for further processing. More than one copy of web loyalty software 604 can execute on a single hardware device. Thus, multiple copies of web loyalty software 604 may be installed on multiple hardware devices. In this manner, processing can be distributed (e.g., balanced) over multiple processors (both real and virtual). This enables balancing of the processing demand on each web loyalty software 604 depending on the volume of transactions. In embodiments in which multiple web loyalty software 604 are running on multiple hardware platforms (e.g., multiple web servers 600), WCS 602 may determine both the particular web server 600 (506 of FIG. 5) and particular web loyalty software 604 to which the user's request should be directed. WCS 602's decision regarding which web loyalty software 604 to direct the user request to may depend on, for example, the type of information requested, the load that is currently being processed by each web loyalty software 604, the status of each web loyalty software 604 (e.g., under repair), any other suitable information, or any combination thereof.

Web loyalty software 604 may listen on a non-secure port used by web server 600 to register the details of transactions about to take place. A Secure Sockets Layer ("SSL") connection may subsequently be established between web loyalty software 604 and the requesting card holder equipment 102 (FIG. 1) for the purpose of securely transmitting data between one another, in response to web loyalty software 604 receiving information about a transaction.

Once the SSL connection has been established, requests by web server 600 for information stored on smart card 106 of FIG. 1 that has been, for example, retrieved by card holder equipment 102 (FIG. 1) may be transmitted from card holder equipment 102 (FIG. 1) to web loyalty software 604 over the SSL connection. Web loyalty software 604 may then send the received data, for example, as JavaScript embedded in HTML for further processing. Web loyalty software 604 may also send, for example, web pages, to card holder equipment 102, which may, for example, effectuate a chain of one or more events leading to the ultimate communication with a smart card reader to retrieve information from or write information to smart card 106.

User database 606 may be any suitable commercial database for housing a large amount of information associated with smart cards that have been issued by the provider and their respective card holders. User database 606 may alternatively reside on corporate server 502, on its own stand alone hardware (e.g., a user database server), or on any suitable hardware in the loyalty and rewards system. For example, user database 606 may store the latest transactions that have taken place on an active smart card. The latest transactions may include, for example, purchasing activities-related to the loyalty system, electronic coupons that are currently stored on the smart card, reward points, any other suitable information, or any combination thereof.

User database 606 may interact with rewards database 610. Rewards database 610 may house a higher-level set of information that needs to be more readily available to the loyalty system. In other words, rewards database 610 may store the latest transactions of a particular user as well as a copy of the data currently stored on a user's smart card (e.g., current account information and current electronic coupons and loyalty programs stored on the smart card, etc.). For purposes such as targeted marketing, statistical reports, historical studies, etc., user database 606 may store a more complete record of the individual users. In other words, user database 606 may maintain detailed information on all of the products purchased by a user over time, all transactions made with the user's smart card, and any other suitable data.

A user incentive program that is implemented by a loyalty and rewards system using smart card technology may be introduced and marketed to the user, for example, through circular advertisements, through in-store promotions, through statement inserts, and through any other suitable marketing channels. The user may be issued a smart card such as smart card 106 (FIG. 1), which the user may use to initiate activities with the loyalty system that supports the user incentive program, for example, at a personal computer in the home, at an in-store kiosk, at a POS system located at the check-out lane of a retail store, or at any other suitable access point.

One illustrative example of an activity in which a user may participate is a sweepstakes. Manufacturers and/or merchants could set-up promotional sweepstakes that allow a user to be automatically entered into the sweepstakes upon the purchase of a particular product, the use of their smart card, mailing in an entry form, etc. For example, users may download a program to their smart card that automatically enters the user into a sweepstakes when a particular product is purchased.

In order to enable the user to use the smart card at a personal computer in the user's home, a smart card reader such as smart card reader 302 of FIG. 3 may be coupled to a personal computer such as personal computer 304 of FIG. 3 in the user's home. The user may receive the smart card reader, for example, from the provider of the user incentive program, from the provider of the smart card, or from any other suitable source. Because the smart card reader may run proprietary software, the provider may provide the user with software for operating the smart card reader in addition to providing the smart card reader. The software for operating the smart card reader may be distributed, for example, on a CD-ROM or on any other suitable storage medium, which the user may use to install the software on his personal computer.

The loyalty system may allow the user to participate in the user incentive program, for example, through the provider's web site, through client server applications running on the user's personal computer or in-store kiosks, or through any other suitable means. The provider's web site may, for example, present the user with the ability to search through offerings such as electronic coupons and other suitable loyalty programs.

The loyalty system may allow the user to access the provider's web site and view offerings with or without using a smart card. When the user accesses the loyalty system with a smart card present, the loyalty system may enable the user to perform an array of smart-card related activities. This array of activities may include, for example, saving electronic coupons to the user's smart card. On the other hand, the number of smart card-related activities available to a user may be restricted when a user accesses the provider's website without a smart card present. For example, the loyalty system may prevent the user from saving any electronic coupons or other loyalty programs to the user's smart card. Similarly, the loyalty system may also prevent the user from viewing, loading, or deleting any electronic coupons or other loyalty programs that are currently saved on the user's smart card.

Figure 7:
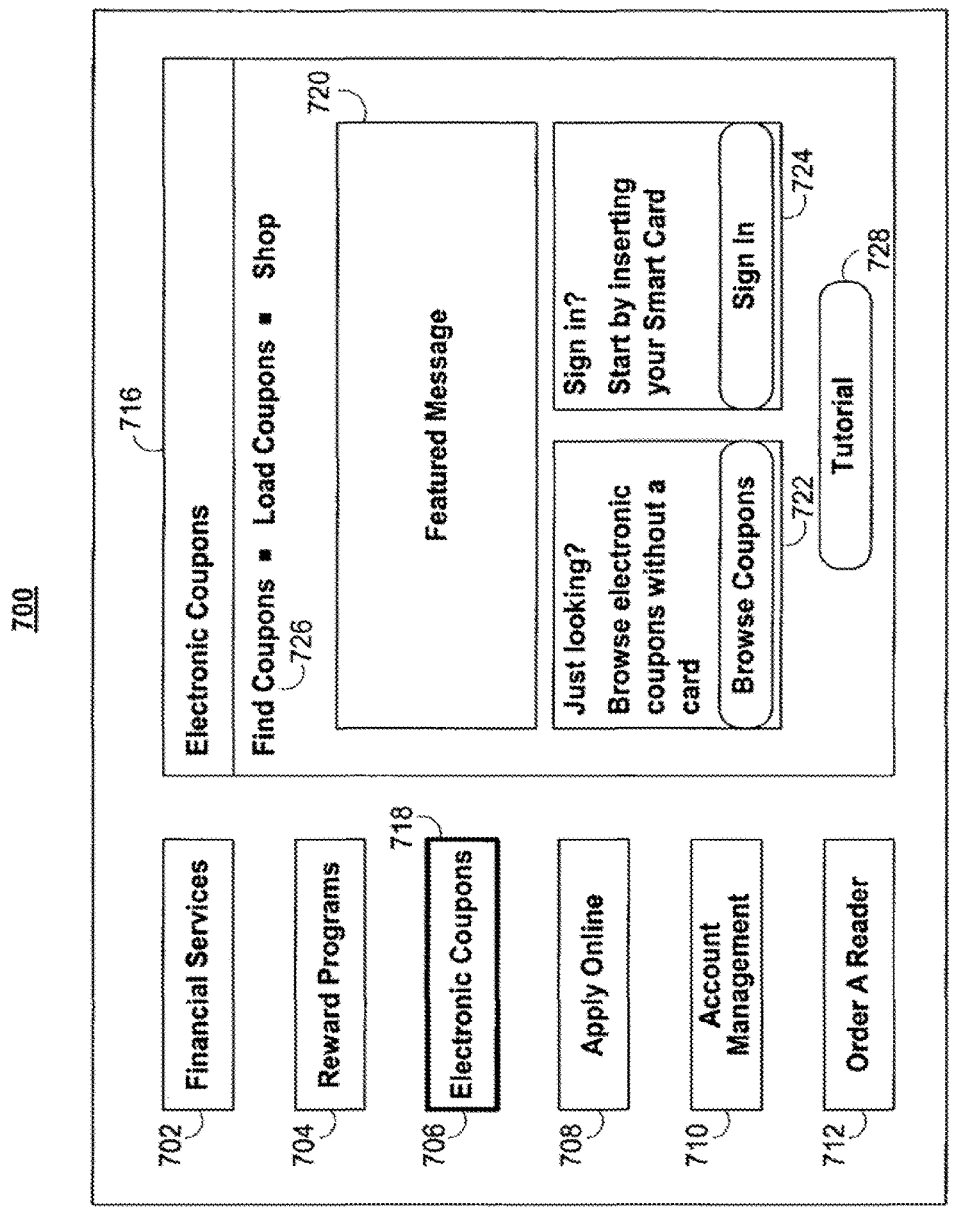
FIG. 7 shows an illustrative provider web page for supporting the electronic coupon feature of the user incentive program in accordance with one embodiment of the invention.

FIG. 7 shows an illustrative provider web page 700 for supporting the electronic coupon feature of the user incentive program in accordance with one embodiment of the invention. Web page 700 may include, for example, various selectable options 702-712, which may allow the user to access different features of the user incentive program. In-store kiosks 510 (FIG. 5) may display screens or interactive touch-screen displays that are similar in appearance to web page 700. However, in some embodiments, the user interface (touch screen, monitor with keyboard and trackball, or any suitable combination) of kiosk 510 may operate on a proprietary system or network rather than over the Internet using web pages.

For example, the loyalty system may provide the user with "Financial Services" option 702 that may link to any number of customer service options relating to the loyalty and rewards program or other features and benefits of the credit card account. The loyalty system may also provide the user an opportunity to apply for a credit card account, when the user selects "Apply Online" option 708. As another example, the loyalty system may provide various options that may enable the user to view transactions made on the user smart card account, make payment towards the smart card account, and otherwise manage the user's smart card account, when the user selects "Account Management" option 710. As yet another example, the loyalty system may allow the user to place an order to receive a smart card reader, which the user may install at home to access the loyalty system, when the user selects "Order a Reader" option 712.

In the current example, the user has selected "Electronic Coupons" option 706. In response to the user selecting "Electronic Coupons" option 706, the loyalty system has provided additional information associated with the electronic coupon feature of the user incentive program in information region 716 on web page 700. The loyalty system has also applied highlight 718 to the graphic associated with "Electronic Coupons" option 706 to indicate that the option has been selected by the user. The additional information presented in information region 716 may include, for example, featured message region 720. The loyalty system may, for example, feature the latest electronic coupons, display promotional messages, allow various sponsors to post advertisements, or display any other suitable electronic coupon-related information in featured message region 720.

Information region 716 may also include, for example, browse coupons option 722 to allow the user-to browse electronic coupons without having to sign-in using a smart card. In response to the user selecting browse coupons option 722, the loyalty system may, for example, provide a web page displaying a list of electronic coupons that are currently available for downloading to a smart card. Because the smart card associated with the user is not present in the smart card reader when using browse coupons option 722, the loyalty system may prevent the user from making selections of electronic coupons to download. However, the loyalty system may provide options to encourage the user to either insert the smart card associated with the user into a smart card reader or to obtain a smart card.

Information region 716 may also include, for example, sign in option 724 to allow the user having inserted the smart card into the smart card reader, to sign into the loyalty system using his smart card. Web page 700 may also provide, for example, information regarding the correct sign in procedure using a smart card (e.g., the appropriate method for inserting the 15 smart card into the smart card reader).

Information region 716 may also include, for example, tutorial 728 which takes the user through an instructional program about features and/or the use of the loyalty and rewards system.

Web page 700 is merely illustrative of such a display screen. Any other suitable screen may be used.

Once the user has saved electronic coupons or other loyalty programs to the smart chip of his smart card, the loyalty system may allow the user to use the smart card to accumulate reward points or redeem electronic coupons, for example, when completing a transaction to purchase items that correspond to the electronic coupons or other loyalty programs saved on the smart chip of the smart card. The loyalty system may allow the user to make such purchase transactions, for example, at a participating retail location, at a participating online store, or at any other suitable smart card location.

As an example, at the checkout lane of a participating retail location, the user may insert the smart card into, for example, a smart card reader (e.g., CAD 516 of FIG. 5), which is coupled to an electronic cash register of a POS system. Once a cashier has completed scanning the barcodes associated with the products that the user intends to purchase, the cashier may press the "Total" key, or any suitable key to signal the POS system that the product scanning has been completed. At this point, local loyalty software such as local loyalty software 512 of FIG. 5 may take over processing of the check-out transaction. In some embodiments, the user may be able to use a self-check-out lane, in which case the user, rather than a cashier, may signal the POS system that product scanning is complete.

The local loyalty software may, for example, order a card acceptance device such as card acceptance device 522 of FIG. 5 to detect the user's smart card. If the smart card is not detected, the local loyalty software may display a message, give a beep, or use any other suitable methods to prompt the cashier or the user to insert the smart card. If the smart card is detected, the local loyalty software may request the card acceptance device to retrieve electronic coupons and other loyalty program information from the user's smart card.

The local loyalty software may in addition obtain product information (e.g., the department, class, item ("DPCI") or other form of unique stock keeping unit ("SKU")) of the items that the user intends to purchase (e.g., the scanned items) from the electronic cash register, such as ECR 514 of FIG. 5, where scanning has taken place. The local loyalty software may then compare the items to be purchased to the items associated with the electronic coupons and loyalty programs retrieved by the card acceptance device from the user's smart card.

In some embodiments of the present invention, DPCis and SKUs are based on standard 11-digit Uniform Product Codes ("UPC") or may cross-reference the UPCs of the related products. The UPC standard will be changed to a 12-digit code in the future, and the loyalty and rewards system of the present invention will support this as well as future changes to the UPC standard.

If, for example, an item-level electronic coupon (e.g., $5 off the item) or other loyalty program is found among the data transmitted from the user's smart card that matches an item that the user intends to purchase, the loyalty system may credit the savings associated with the item-level electronic coupon towards the price of the scanned item. The loyalty system may show the savings illustratively as a separate line item on the user's receipt immediately following the entry for that particular product on the receipt.

If, for example, a transaction-level coupon (e.g., $15 off the entire purchase) or other loyalty program is found among the data transmitted from the user's smart card that matches the entire transaction that the user intends to make, the loyalty system may credit the savings corresponding to the transaction-level electronic coupon when the total of the entire purchase is calculated, for example, by the electronic cash register. The loyalty system may show the savings illustratively as a separate line item at the end of the receipt. Furthermore, the loyalty system may show a summary of the total amount saved, which may include both the savings associated with the item-level electronic coupons and the savings associated with the transaction-level electronic coupons, as a final message on the receipt. Where an electronic coupon or loyalty program is triggered for redemption on the user's next visit to the store, the receipt may present a list of such "ready-to-redeem" offers to the user.

Some electronic coupons saved on the user's smart card may be "one-time" electronic coupons that may only be applied once, while other electronic coupons saved on the user's smart card may be applicable multiple times. If the loyalty system determines that an electronic coupon retrieved from the user's smart card is for one time use, the loyalty system may automatically remove the electronic coupon from the smart chip of the user's smart card upon redemption. Alternatively, the loyalty system may leave the redeemed reward on the smart chip of the user's smart card until expiry of the particular reward program associated with the electronic coupon. the loyalty system may prevent the user from Thus, downloading the one time use electronic coupon multiple times.

Figure 8:
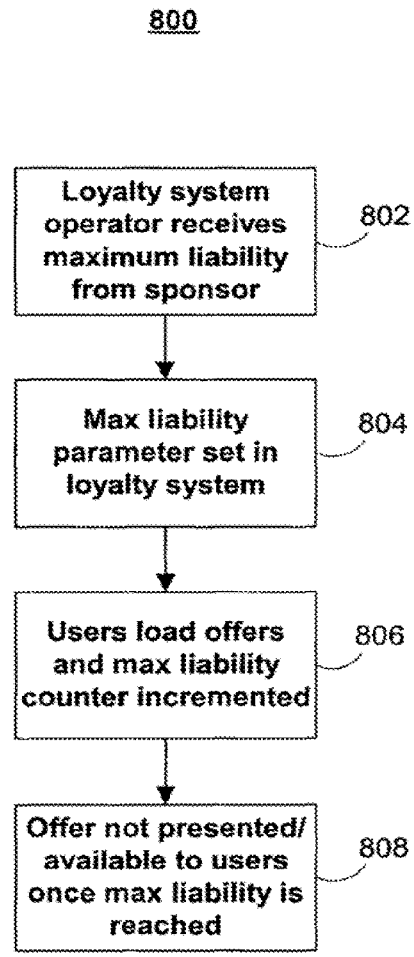
FIG. 8 shows a flowchart of illustrative steps involved in managing maximum sponsor liability in accordance with one embodiment of the present invention.

In some embodiments of the present invention, it may be desirable to limit the liability of an electronic coupon sponsor (e.g., manufacturer). FIG. 8 shows a flowchart of illustrative steps involved in monitoring and controlling the liability of an electronic coupon sponsor. At step 802, the loyalty system operator receives information about the maximum number of coupons (e.g., offers) a sponsor is willing to be liable for.

At step 804, a maximum liability parameter is set in the loyalty system (e.g., on loyalty system 124, rewards database 610, or any suitable location in the loyalty program operation). At step 806, users are free to download and redeem electronic coupons and loyalty programs. Each time a particular coupon is downloaded, a maximum liability counter is incremented. The maximum liability counter would illustratively reside at the same location as the maximum liability parameter. At step 808, once the maximum liability is reached for a particular coupon, the offer is no longer presented to or available for download by a user.

When a user completes a transaction, for example at a merchant POS, the loyalty system may also award appropriate award points that may be associated with an award program that is applicable to the item or the transaction. As an example, the loyalty system may add award points in the amount that may have been assigned to the item or the transaction to the user's rewards account. The balance of the rewards account may be stored on the smart chip or on a remote server.

If the loyalty system determines that the electronic coupon or other loyalty program is for one time use, the loyalty system may remove or disable the electronic coupon or other loyalty program to prevent future use. The loyalty system may disable, instead of remove, the electronic coupon or loyalty program to prevent the user from saving the same one-time use electronic coupon for redemption repeatedly. This disablement may be accomplished by setting a status of the electronic coupon as "fully redeemed" on the smart chip, such that the offer cannot be downloaded or redeemed again.

As described above, in some embodiments of the present invention, the loyalty system may provide various types of savings to the user including, for example, item-level electronic coupons that are applicable towards individual items that the user may purchase as well as transactional-level electronic coupons that are applicable to an entire transaction. In some embodiments of the present invention, the loyalty system may print the amount of savings that is associated with an item-level electronic coupon immediately below the corresponding purchased item on the receipt. Similarly, the loyalty system may also print the amount of savings that is associated with a transaction-level electronic coupon, which is applied to the entire purchase, immediately below the total of the purchase on the receipt. In some embodiments of the present invention, the loyalty system may additionally provide a message showing the total amount of savings applied to the transaction (including savings resulting from the applications of both item-level electronic coupons and transaction level electronic coupons).

Figure 9:
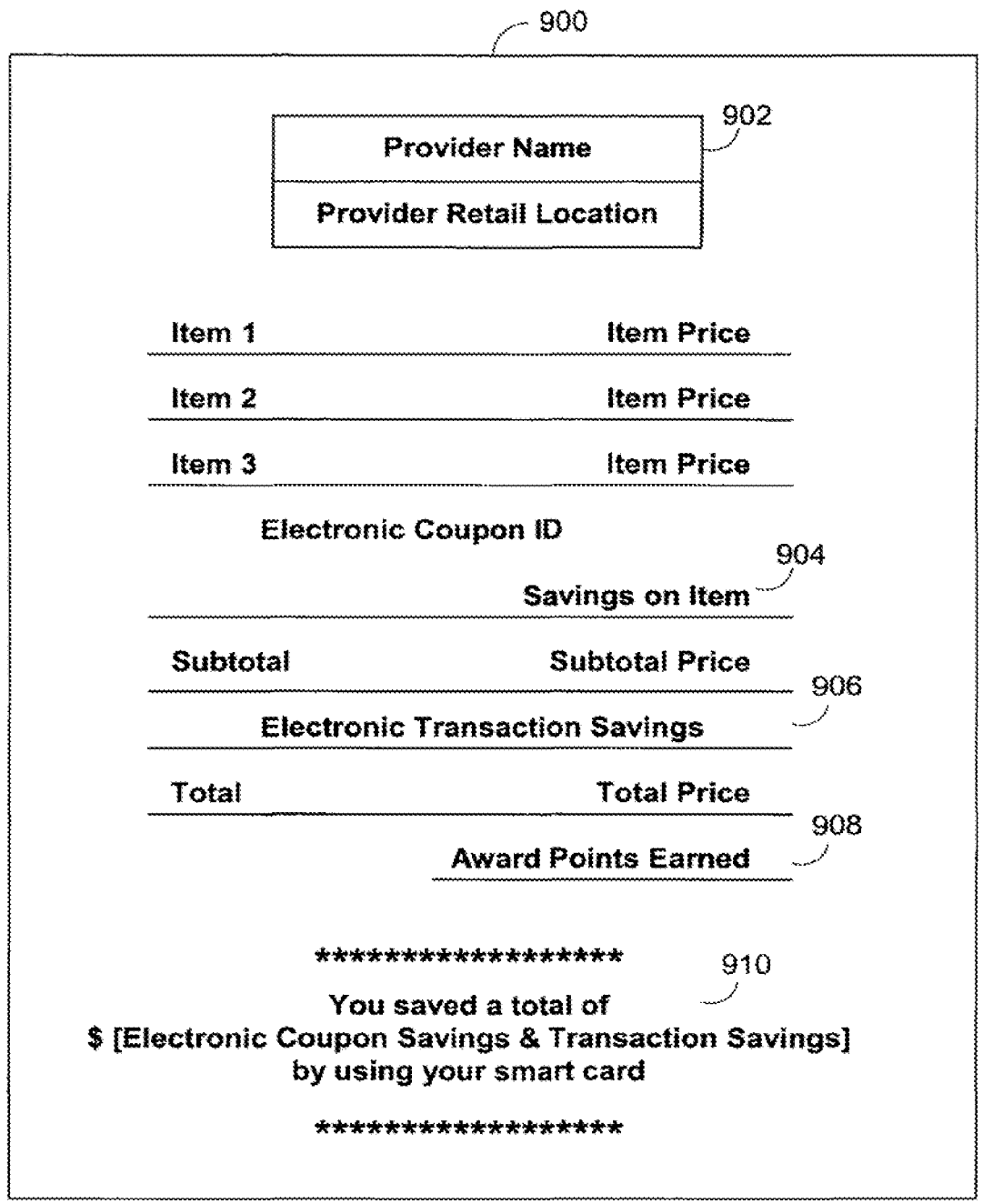
FIG. 9 shows an illustrative purchase receipt in accordance with one embodiment of the present invention.

FIG. 9 shows an illustrative purchase receipt 900 in accordance with one embodiment of the present invention. Purchase receipt 900, for example, may be a physical receipt that the user may receive from a participating retail location. Purchase receipt 900 may also be, for example, an electronic receipt that is presented to the user at the end of the purchasing process at an online store.

Purchase receipt 900 may include, for example, information region 902 for displaying information such as the provider's name, store location, and any other suitable information. Purchase receipt 900 may present savings associated with, for example, an item-level coupon 904 immediately below the information corresponding to the item that the savings has been applied to as shown in region 904. Purchase receipt 900 may show savings associated with, for example, a transaction-level electronic coupon immediately below the calculated subtotal of the transaction as shown in region 906.

Purchase receipt 900 may additionally include information associated with any award points that may have accumulated during the transaction according to, for example, an award program that the user has enrolled in, in an information region 908. Purchase receipt 900 may further include total savings message area 910 to inform the user of their total savings on a particular transaction by participating in the user incentive program.

Purchase receipt 900 is merely illustrative of such a receipt. Any other suitable arrangement may be used.

In some embodiments of the present invention, the loyalty system may automatically save electronic coupons or other loyalty programs to the user's smart card. In one suitable approach, the loyalty system may automatically save one or more electronic coupons or other loyalty programs to the user's smart card based on a key (or "triggering") item purchased by the user, to which the one or more electronic coupons or other loyalty program are linked. For example, at the checkout lane, the POS system of the loyalty system may determine that the user has purchased baby formula. The loyalty system may then compare baby formula to, for example, a list of key items that are each associated with various electronic coupons.

The list of key items may be generated by the loyalty system, for example, according to marketing methods such as clustering, to represent certain characteristics about the user. The loyalty system may predefine based on these characteristics, for example, various other items that the user having these characteristics may also be interested in. The loyalty system may subsequently associate electronic coupons for these various items that are also of interest to the user to the appropriate key item in the list of key items.

When the loyalty system determines that an item that the user has purchased (e.g., baby formula) matches a key item in the list of key items, the loyalty system may automatically save one or more of the electronic coupons that are associated with that key item (e.g., a coupon for diapers) to the user's smart card. If such an offer is automatically downloaded to a user's smart card, a message expressing the download and incenting the user to return to the store may appear on the receipt.

In another suitable approach, the loyalty system may link special promotional items to basket-level reward offers (e.g., $10 off the user's next purchase from this retail location). In such an embodiment, the loyalty system, upon determining that the user has purchased a special promotional item, for example, from a participating smart card location or the provider's online store, may automatically save one or more associated basket-level reward offers to the user's smart card. Additionally, the loyalty system may inform the user that a basket-level reward offer has been saved to the user's smart card, for example, by sending an e-mail, displaying a pop-up window including a message informing the user of the addition to the user's smart card on the user's home computer screen, on the screen of an electronic cash register at the checkout lane, or on any other suitable screen, by printing a message regarding the saved offer on the user's purchase receipt, or by using any other suitable approach.

In some embodiments of the present invention, electronic coupons may automatically be delivered to a user at the POS based on past shopping history. User database 606 or rewards database 610 may store information about a user's past shopping visits at a store (e.g., products purchased, dollars spent, etc.). This information may be accessed by the loyalty and rewards system to determine electronic coupons and loyalty programs that should be featured to users or automatically downloaded to a user's smart card. For example, if a user frequently purchases diapers, the loyalty and rewards system may automatically download a diaper coupon (or related product coupon) to the user's smart card the next time he makes a transaction at the POS. Alternatively, savings may be automatically applied to a user's purchase without download to the user's smart card. For example, the smart card may simply identify the user to the loyalty and rewards system, and thereafter, certain savings are automatically applied to the user's current transaction. These savings could illustratively be based on the user's past shopping history.

In addition to promoting related items, the loyalty and rewards system may promote coupons that a particular user has redeemed before. For example, the system may send the user an e-mail when a particular coupon that the user has used before becomes available for download again. The system may also highlight offers related to products for which the user has previously redeemed other electronic coupons. As yet another example, the system may e-mail the user when a coupon becomes available for a product that the user has previously purchased. Also, the loyalty and rewards system may link to a database (e.g., database 120 (FIG. 1), a credit/debit card transaction database removed from loyalty program host 112, etc.) that records consumer purchase histories. Via this database link, the loyalty and rewards system could suggest targeted offers to users (e.g., a user who purchased soda in cans last week may be offered a coupon for 2 liter bottles of soda). Furthermore, to avoid a proliferation of targeted offers (e.g., emails, pop-ups, or other notifications of offers), the system may group all of the targeted offers for a particular user together in one e-mail (or other acceptable form of notification) per week.

Figure 10:
FIG. 10 is an illustrative display screen 1000 including a pop-up window having a message informing the user that an offer has been saved to the user's smart card in accordance with one embodiment of the present invention.

FIG. 10 is an illustrative display screen 1000 including a pop-up window 1002 having a message informing the user that a basket-level reward offer has been saved to the user's smart card in accordance with one embodiment of the present invention. Screen 1000 may be, for example, an electronic cash register screen at the checkout lane of a participating retail store, at which a special promotional item associated with a basket-level reward offer has been purchased (e.g., scanned). Screen 1000 may also be, for example, a web page that is displayed to the user during the checkout process at an online store, at which the user has just purchased the special promotional item that is associated with a basket-level reward offer. Additionally, screen 1000 could be a display screen on CAD 522 of POS system 508 (FIG. 5). Screen 1000 could also be used to communicate to a user when certain offer triggers have been reached. For example, a merchant may offer 10% off your next purchase after spending $1,000 on your smart card. Thus, if the current transaction reaches the $1,000 threshold, screen 1000 may communicate to the user that they will save 10% on their next transaction.

The loyalty system may display pop-up window 1002, for example, for a pre-determined amount of time that is sufficient to allow the user to read the message (e.g., 10 seconds). The loyalty system may also display pop-up window 1002 upon first attracting the user's attention, for example, by giving a beep, by playing a short promotional animation, or by using any other suitable approach. In some embodiments of the present invention, the loyalty system may require the user to close the pop-up window, for example, by providing option 1004, thus ensuring that the user is made aware of the offer.

Figure 11:
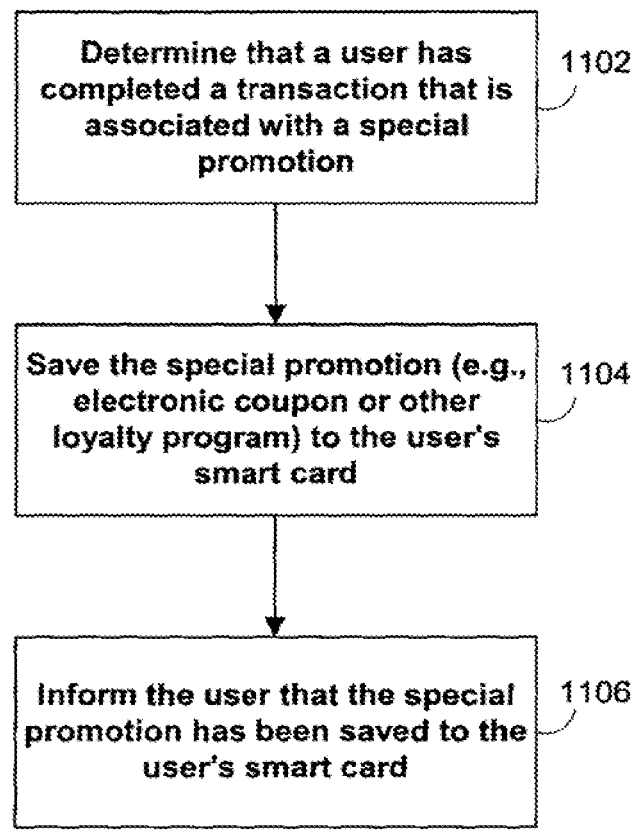
FIG. 11 is a flowchart of illustrative steps involved in automatically saving special promotional offers to the user's smart chip in accordance with one embodiment of the present invention.

FIG. 11 is a flowchart of illustrative steps involved in automatically saving special promotional offers to the user's smart chip in accordance with one embodiment of the present invention. At step 1102, the loyalty system may determine that the user has just completed a transaction that is associated with one or more special promotional offers. For example, the loyalty system may receive information from a POS system that the user has just purchased baby formula, which the loyalty system may have predefined as a special item that is associated with a special offer (e.g., five dollars off diapers of the same brand on the user's next visit).

As another example, the loyalty system may determine that the user has just completed a transaction that entitles the user to a special basket-level promotional offer (e.g., $15 off the user's next purchase over $100). For example, the loyalty system may have determined that the transaction is over a preset dollar amount that is to be rewarded by a special offer.

At step 1104, the loyalty system may save the special offer determined at step 1102 to the user's smart card. The loyalty system may save the special offer, for example, to a portion of the smart chip memory that is dedicated to storage of such special offers on the user's smart card. Following the completion of step 1104, the loyalty system may, at step 1106, inform the user that the special offer, which may be an electronic coupon or any other suitable loyalty program, has been saved to the user's smart card. The loyalty system may inform the user, for example, by displaying a pop-up window containing an appropriate message on the electronic cash register screen, on the user's home computer, or on any other suitable screen, by printing the special offer information on the user's purchase receipt, or by using any other suitable approach.

In some embodiments of the present invention, the loyalty system may personalize offerings of electronic coupons and other loyalty programs to the user based on an associated user profile. The loyalty system may locate and identify the associated user profile, for example, by the user's smart card. The user profile may be stored on user database 606 (FIG. 6) or any other suitable database. The user profile may also be stored outside the loyalty system. The user profile may include, for example, demographic information (e.g., age, sex, address, marital status, etc.), psychographic information (e.g., personality, habits, etc.), behavioral information (e.g., purchase history, Internet activities, etc.), systems information (e.g., operating system, browser, Internet connection, etc.), billing information (e.g., transaction information, periods of the year when the user carries a balance, finance charge group, whether or not the user pays their balance in full each month, 20 reward program status, special program participation, past due balance, etc.), or any other suitable information that is specific to the user.

User information may be provided by the user (e.g., on a registration form), extracted from other databases (e.g., databases storing user information at the loyalty program host or merchant processing facility, and particularly user database 606), collected as clickstream data (e.g., from cookies installed on the user's browser, from log files that record user interactions with the provider's web site, or from any other suitable storage of such data), collected at an in-store kiosk, collected from any other suitable information sources, or collected by any combination of approaches thereof.

In some embodiments of the present invention, the loyalty system may segment the users into unique clusters in which users exhibit similar characteristics. The loyalty system may subsequently assign, for example, special group serial numbers to the smart cards of users within a particular cluster. Alternatively, the loyalty system may save the unique serial numbers of the various users belonging to a particular cluster to a cluster profile. In response to creating a cluster, the loyalty system may present special or featured electronic coupons or other loyalty programs that are predetermined to be of interest to users within a particular cluster to those users.

For example, the loyalty system may display the featured electronic coupons at a prominent position on the display screen (e.g., at the top of the screen) when the user belonging to the cluster browses electronic coupons. In some embodiments of the present invention, the loyalty system may identify individual users to whom the loyalty system may present a particular featured or special offer to, for example, by conducting a search of user profiles for a particular set of user attributes or characteristics (e.g., car owner).

Figure 12:
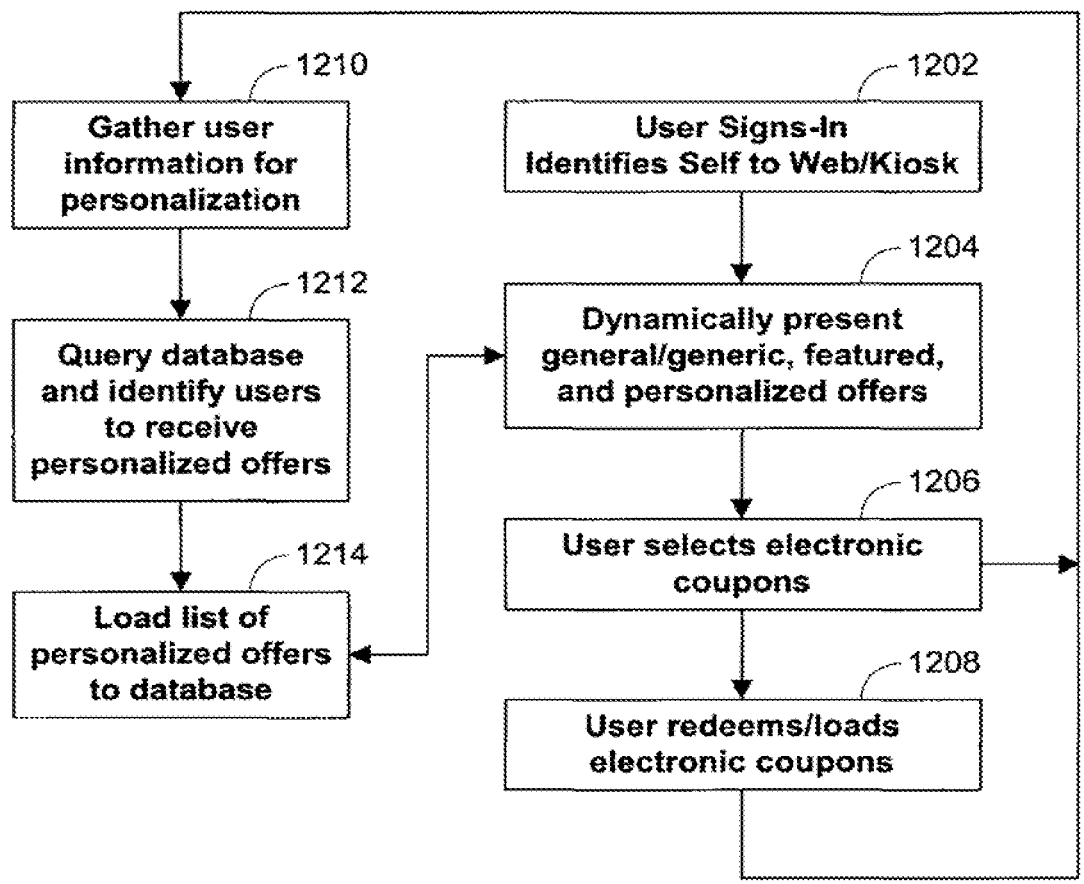
FIG. 12 is a flowchart of illustrative steps involved in presenting personalized electronic coupons or other loyalty programs to the user based on information stored in the user profile in accordance with one embodiment of the present invention.

FIG. 12 is a flowchart of illustrative steps involved in presenting personalized electronic coupons or other loyalty programs to the user based on information stored in the user profile in accordance with one embodiment of the present invention. At step 1202, the user signs-in and the loyalty system receives a request to view electronic coupon-related information from the user. The loyalty system may receive the request, for example, when the user selects an option to browse electronic coupons from the provider's web site using a home computer, an in-store kiosk, or any other suitable hardware for accessing the loyalty system. Upon receiving the request, the loyalty system dynamically presents a listing of electronic coupons and loyalty programs available to the user, as shown in step 1204. The listing may contain, for example, generic offers, featured offers, and personalized offers.

Information associated with the user that is used to dynamically create the listing of available offers may include, for example, identity information, system information, purchase history, and any other suitable user-specific information. The loyalty system may access such information, for example, by communicating with the user's smart card to obtain information such as the user's smart card identification number. The smart card identification number may be itself unique to the user in that it may identify the user as a member of a particular group of users having one or more common characteristics.

The loyalty system may also, for example, use the smart card identification number to access a user profile associated with the user. Information that may be stored within the user profile has been described above. While the listing is dynamically generated, individual user data may be queried on a nightly basis in batch, to prepare a list of personalized offers that are "ready-and-waiting" to be dynamically presented the next time the user logs in.

In steps 1206 and 1208, the user downloads and redeems electronic coupons and loyalty programs. The user's download and redemption activity is used to generate further information for use in offer personalization. The collection of this information is illustrated at step 1210. Once information about the user is gathered, the database of user information (e.g., rewards database 610, user database 606, etc.), is queried to identify users that should receive particular offers. Once the users for a particular personalized offer are identified, a "ready-and-waiting" list is generated and stored at step 1214. This list is queried by step 1204 in generating the personalized offers for the dynamic listing of available offers. Essentially, the presentation of offers involves a cyclic process of gathering information on a user's habits and presenting offers that the loyalty and rewards system determines would be of interest to a particular user.

Upon obtaining information associated with the user, the loyalty system is able to personalize the presentation of electronic coupons to the user based on the information associated with the use. For example, the loyalty system may present a featured electronic coupon at the top of the electronic coupon list to the user because that electronic coupon is predetermined to be of special interest to the group of users that is identified by the user's smart card identification number. Alternatively, certain offers may only be presentable to select users.

As another example, the loyalty system may present one or more featured electronic coupons to the user, for example, in a dedicated features region on the screen, based on analysis of various information stored in the user's user profile. For example, the loyalty system may present electronic coupons associated with home decorating accessories to the user based on the information in the user profile indicating that the user has recently purchased a new home.

To facilitate personalization of offers and other features of the loyalty and rewards program, some embodiments of the present invention may include the ability to search external databases. For example, some user information may be stored on user database 606 (FIG. 6) and other (or overlapping) user information may be stored on, for example, loyalty program host 112 (FIG. 1). The loyalty and rewards program may have the ability to query both databases when determining various loyalty functions such as electronic coupon and loyalty program customization. Alternatively, data about various users could be stored on multiple databases both within and outside of the loyalty and rewards system. If this were the case, all data could eventually be deposited on one database (e.g., user database 606) such that personalization could be effectuated from a central location.

Additionally, in some embodiments, the loyalty and rewards system may link to databases outside of the system (e.g., other merchant databases, vendor databases, etc.). By linking to various databases, additional system features may be provided. For example, vendors may have the ability to monitor outflow of their inventory from a retail/merchant location, vendors may receive information reporting the usage of electronic coupons and loyalty programs that they provided, vendors may be able to perform usage pattern studies and other demographic studies, or various other system enhancements may be provided. Usage information may, for example, include marketing information on the actual consumers who load or redeem the vendor sponsored electronic coupons and loyalty programs.

In some embodiments of the present invention, user personalization may include the ability to e-mail a user, or display a message on their home computer, when an electronic coupon or loyalty program that they've redeemed in the past becomes available again for download to their smart card. Electronic coupons and loyalty programs may also be personalized in strategic marketing manners. For instance, a user may ignore personalized offers that are valued less than 10% off. However, a particular user may have downloaded and redeemed one or more 10% off offers in the past. Therefore, the loyalty and rewards system may present more 10% offers to the user, knowing that the 5% offers are not likely to be downloaded or redeemed by the user and knowing that the system need not present a 15% off offer to the user in order to entice downloading or redemption of the coupon. This is just one example of a way in which the loyalty and rewards system may customize or personalize electronic coupons and loyalty programs to maximize interest, interaction, and use of the system by users at minimum cost to merchants and vendors. Additionally, once a user becomes a loyal customer of particular products, the system may present coupons less frequently for those products, because the user is likely to buy the products at full price.

As another example, the system may use tiered offers related to a particular product. For instance, the system may first offer a specific user 10¢ off the product. If after a specified time (e.g., a month), the user has not redeemed the 10¢ off offer, the system may present the specific user with a coupon for 15¢ off. The increasing iterations can occur until the user redeems a coupon. Additionally, once a user redeems a coupon, the system may try to wean the user off of the coupon by reducing the amount of the coupon for that specific product in future offers to that user.

In some embodiments of the present invention, the loyalty system may allow the user to share his smart card account with other users of his choice. In such embodiments, the loyalty system may recognize the user who initially obtained the smart card account as the primary account holder. Additional smart cards may be issued to additional users, who may be recognized by the loyalty system as secondary account holders. The loyalty system may allow the secondary account holders to use the smart card account independently of the primary card holder. In some embodiments of the present invention, the loyalty and rewards system may personalize offers to a particular account number. In other embodiments, the system may personalize offers for a particular user (e.g., the primary cardholder, the secondary cardholder, etc.).

In some embodiments of the present invention, the loyalty system may allow the primary account holder to place restrictions on the smart card account so as to regulate the transactions that the secondary account holders may perform on the account using their respective smart cards. For example, the loyalty system may allow the primary account holder to specify the numbers or types of electronic coupons and other loyalty programs that a secondary account holder may save to the smart card. As another example, the loyalty system may allow the primary account holder to specify whether and how the secondary account holders may actually use any electronic coupons or whether or how the secondary account holders may spend any accumulated reward points. For example, for offers that require a number of items to be bought over time, purchase by the secondary card holder may count towards the total. However, the secondary card holder may be prevented from redeeming the accumulated rewards points. It may only be possible to download a reward purchased with rewards points to one smart card. Therefore, a primary card holder may desire the ability to earn rewards points from both cardholders' spending activity, but limit the spending of rewards points and deposit of rewards to the primary card.

The loyalty system may also allow the primary card holder to specify, for example, the maximum amount of reward points that a secondary card holder may spend. As yet another example, the loyalty system may allow the primary account holder to prevent the secondary account holders from removing any electronic coupons or other loyalty programs from the smart card. These examples are only illustrative of the types of restrictions that the loyalty system may allow the primary card holder to place on the smart card account. Any other suitable restrictions may be implemented by the loyalty system.

Figure 13:
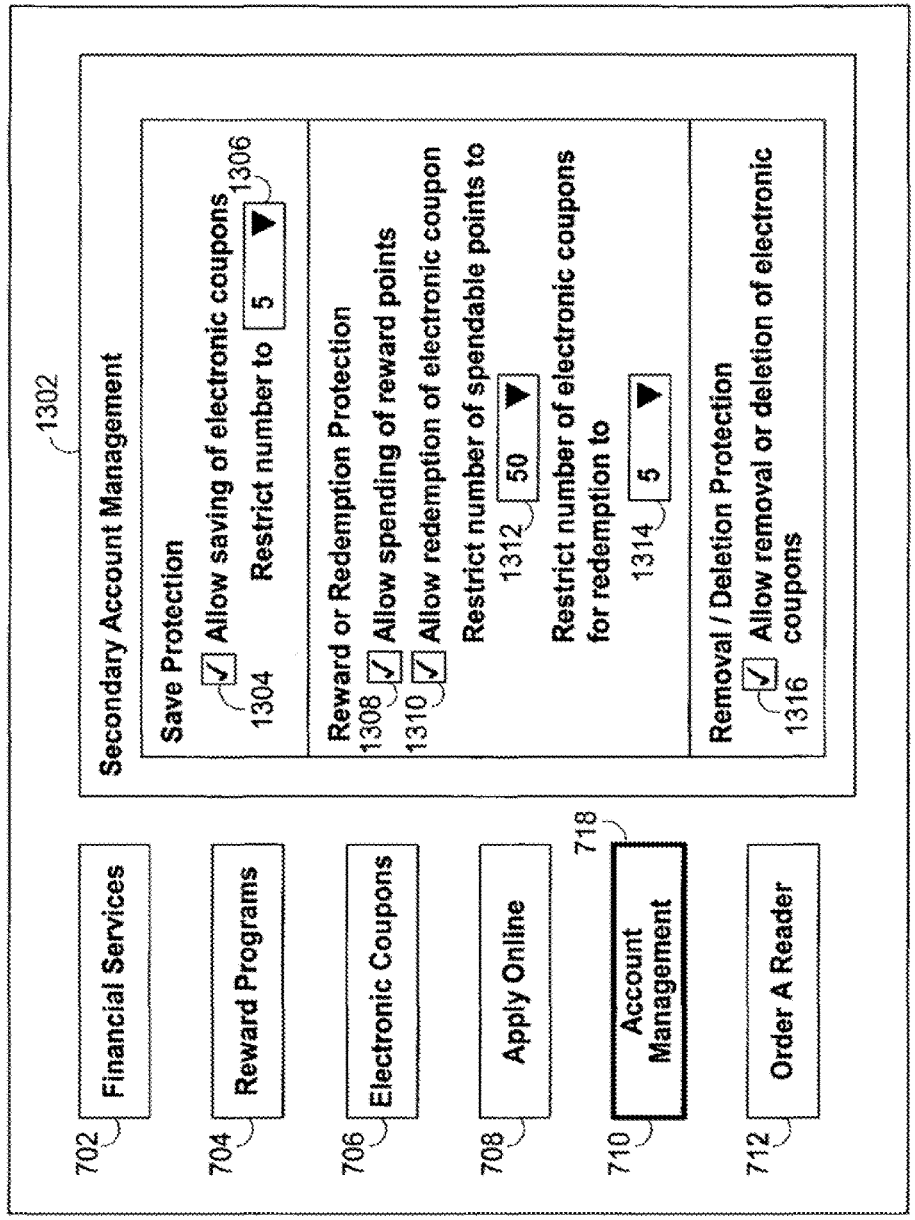
FIG. 13 shows an illustrative display screen for allowing a primary card holder to place restrictions on how secondary card holders may use an existing smart card account in accordance with one embodiment of the present invention.

FIG. 13 shows an illustrative display screen 1300 for allowing a primary card holder to place restrictions on how secondary card holders may use an existing smart card account in accordance with one embodiment of the present invention. Screen 1300 may include various selectable options 702-712 for allowing the user to access the various services associated with the smart card. In the current example, the loyalty system provides highlight region 718 over account management option 710 to indicate that the account management option 710 has been selected by the user.

The loyalty system may provide various services under account management option 710. These services may include, for example, allowing the user to view, update, and manage secondary accounts associated with the user's smart card account. In the current example, the loyalty system displays a secondary account management information region 1302 in screen 1300 to provide the user with options for managing the secondary accounts associated with the user's smart card account.

Secondary account management information region 1302 may include, for example, options for restricting the usage of the secondary smart cards that are associated with the smart card account by the secondary card holders. These options may include, for example, save protection, reward or redemption protection, removal/deletion protection, and any other suitable restriction option. In some embodiments of the present invention, the loyalty system may apply the most conservative set of restrictions to any secondary smart card upon its initial issuance. The loyalty system may then allow the primary card holder to select, for example, checkbox 1304 to grant a secondary card holder the ability to save electronic coupons to the smart card account. The loyalty system may additionally allow the primary card holder to specify, for example, the maximum number of electronic coupons that a secondary card holder may save to the account using a suitable mechanism such as dropdown menu 1306. The loyalty system may provide no restriction on the number of electronic coupons that a secondary card holder may save to the smart card if such a specification is not given by the primary card holder.

Similarly, the loyalty system may allow the primary card holder to indicate whether the secondary card holder should be permitted to spend reward points that have accumulated on the account or whether the secondary card holder may be allowed to redeem electronic coupons that are saved on the smart card, for example, using checkboxes 1308 and 1310. The primary card holder may also be allowed to specify the maximum amount of reward points or electronic coupons that the secondary card holder may spend or redeem, for example, by using dropdown menus 1312 and 1314. The loyalty system may also provide corresponding restriction options for removal or deletion of electronic coupons or other loyalty programs (option 1316).

Screen 1300 is merely illustrative of such a display screen. Any other suitable arrangement may be used.

Figure 14:
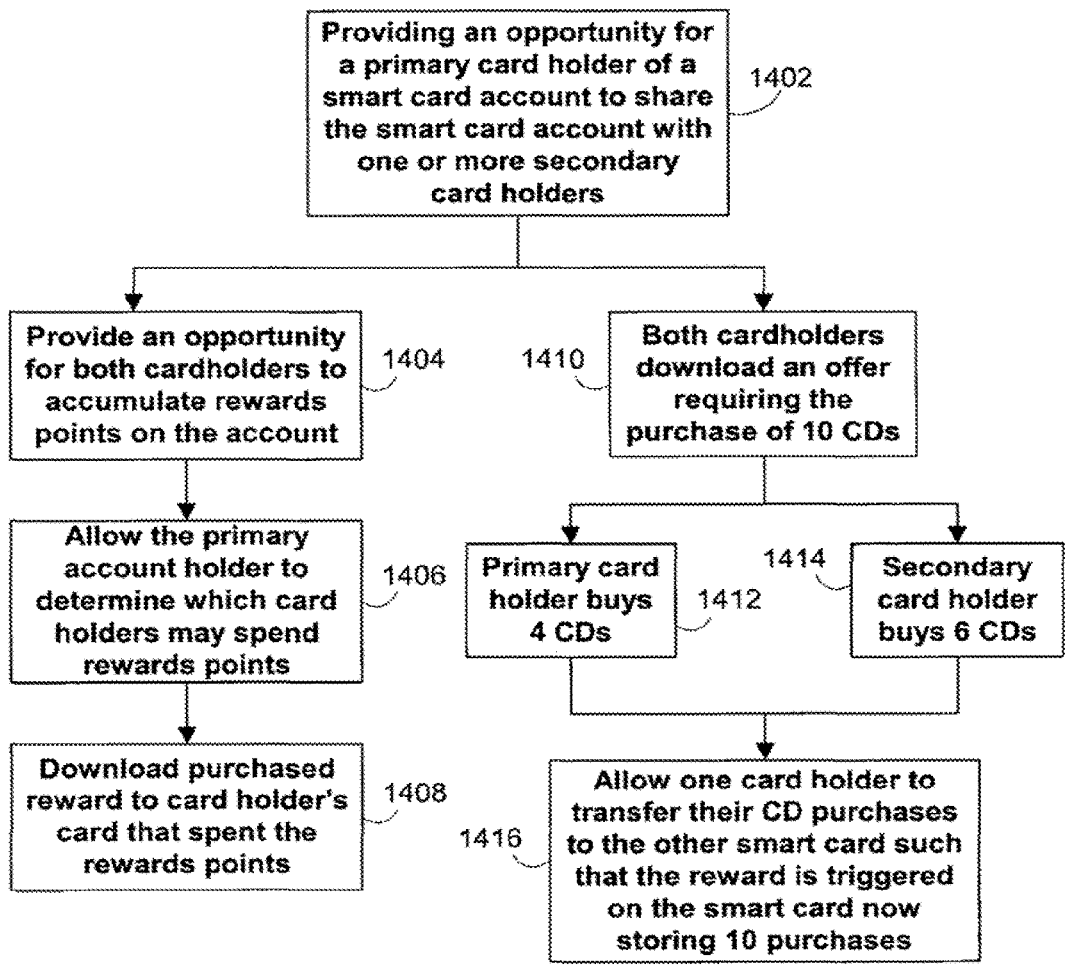
FIG. 14 shows a flowchart of illustrative steps involved in allowing a primary card holder to specify restrictions on the usage of the smart card account by one or more secondary card holders in accordance with one embodiment of the present invention.

FIG. 14 shows a flowchart of illustrative steps involved in allowing a primary card holder to specify restrictions on the usage of the smart card account by one or more secondary card holders in accordance with one embodiment of the present invention. At step 1402, the loyalty system may provide an opportunity for a primary card holder of an existing smart card account to share the smart card account with one or more secondary card holders. The primary card holder may grant such privilege to a secondary card holder, for example, by requesting (e.g., over the phone, on the provider's web site, etc.) for additional smart cards to be issued to the secondary card holder.

In some embodiments of the present invention, the loyalty system may apply the most strict set of restrictions to the usage of the smart card account by the secondary card holders upon the initial issuance of the additional smart cards. In some embodiments of the present invention, step 1402 may additionally include the step in which the loyalty system may provide an opportunity for the primary card holder to place restrictions on the usage of the smart card account by the secondary card holders.

For example, the loyalty system may allow the primary card holder to specify restrictions on the secondary card holders' ability to save, redeem, and delete electronic coupons, spend rewards points, or perform any other suitable activities associated with their smart card. One example of a display screen that allows the primary account holder to place restrictions on the secondary account holder is display screen 1300 of FIG. 13. Alternatively, the loyalty system may allow the primary card holder to specify such restrictions, for example, through telephone services or other suitable approaches. The loyalty system may apply the restrictions as specified by the primary card holder to the usage of the smart card account by the secondary card holder.

At step 1404, the loyalty system may provide an opportunity for both card holders to accumulate rewards points on their shared account. The loyalty system may allow the secondary card holders to use their smart cards in the same manner that a primary card holder is allowed to used his smart card. The primary account holder is able to specify which card holders may spend rewards points accumulated on the joint account at step 1406. Furthermore, a purchased electronic rewards coupon (e.g., a reward obtained by spending rewards points) is downloaded only to the card holder's card that spent the rewards points, as shown in step 1408. In other words, multiple cards are generating rewards points, but only one card stores a purchased reward.

In another example, card holders may be able to share qualifying purchases for rewards that require multiple purchases before the reward is available. For example, the primary and secondary card holders may both download an electronic coupon that requires the purchase of 10 CDs, as illustrated in step 1410. The primary card holder may accumulate four CD purchases over time, and the secondary card holder may accumulate six CD purchases over time, as illustrated, respectively by steps 1412 and 1414. Rather than each card holder waiting to accumulate ten CD purchases, the secondary card holder may transfer his CD purchases to the primary card holder's smart chip such that the reward is triggered for available redemption, as illustrated by step 1416. This is only one of many examples envisioned in providing card holders with the opportunity to share rewards points and providing a primary card holder with the ability to manage secondary card holder activity.

In some embodiments of the present invention, the loyalty system may provide search functionalities to enable the user to identify offerings of electronic coupons and other loyalty programs that are of specific interest to the user. For example, the loyalty system may allow the user to search for electronic coupons related to a particular product, a particular brand, any other suitable criteria, or any combination of criteria thereof. Additionally, the loyalty system may allow the user to search for electronic coupons associated with products that are currently on-sale.

In some embodiments of the present invention, the loyalty system may provide the user with more advanced search functionalities that may recommend electronic coupons or other loyalty programs to the user based on the user's needs. For example, the loyalty system may prompt the user to enter or select a particular event (e.g., a birthday party) for which the user is interested in making purchases. The loyalty system may compare the event, for example, to a list of predefined events for which the loyalty system had identified associated electronic coupons or other loyalty programs. The loyalty system may then recommend those electronic coupons or loyalty programs associated with the selected event to the user.

In some embodiments of the present invention, the loyalty system may further allow the user to narrow the search within such recommendations based on the event provided by the loyalty system, for example, by allowing the user to specify a price range for items recommended. These examples are merely illustrative of the types of searches that the loyalty system may allow the user to perform. Any other suitable search criteria may be implemented.

FIG. 15 shows an illustrative display screen 1500 for allowing the user to conduct searches for electronic coupons and other loyalty programs in accordance with one embodiment of the present invention. The loyalty system may display screen 1500, for example, in response to the user selecting find coupons option 726 on screen 700. The loyalty system may indicate to the user that find coupons option 726 has been selected, for example, by providing underlining or other suitable display alteration to the find coupons option on screen 1500.

To allow the user to conduct simple searches for electronic coupons, the loyalty system may allow the user to enter a term of interest in textbox 1502. The loyalty system may also allow the user to narrow the search to one or more search areas such as brand, product name, product description, product genre, and any other suitable area, for example, by selecting one or more checkboxes 1504-1510. The user may start the search by, for example, selecting search button 1512.

The loyalty system may also provide an opportunity for the user to customize the search to products or services that are related to a particular event such as birthdays, weddings, parties, holidays, baby-related events, and any other suitable events. In this example, the loyalty system provides an opportunity for the user to select one or more events to search using checkboxes 1514-1522. The loyalty system may also allow the user to further narrow the search based on events by combining the term of interest, any specified search area, and one or more selected events.

The user may create such a combination, for example, by selecting checkbox 1524. The loyalty system may initiate a combined search based on the selected criteria when the user, for example, selects search button 1524. In this example, the user has selected an advanced search for products in the genres related to home decor for holiday events.

Screen 1500 is merely illustrative of such a display screen. Any other suitable arrangement may be used.

Figure 16:
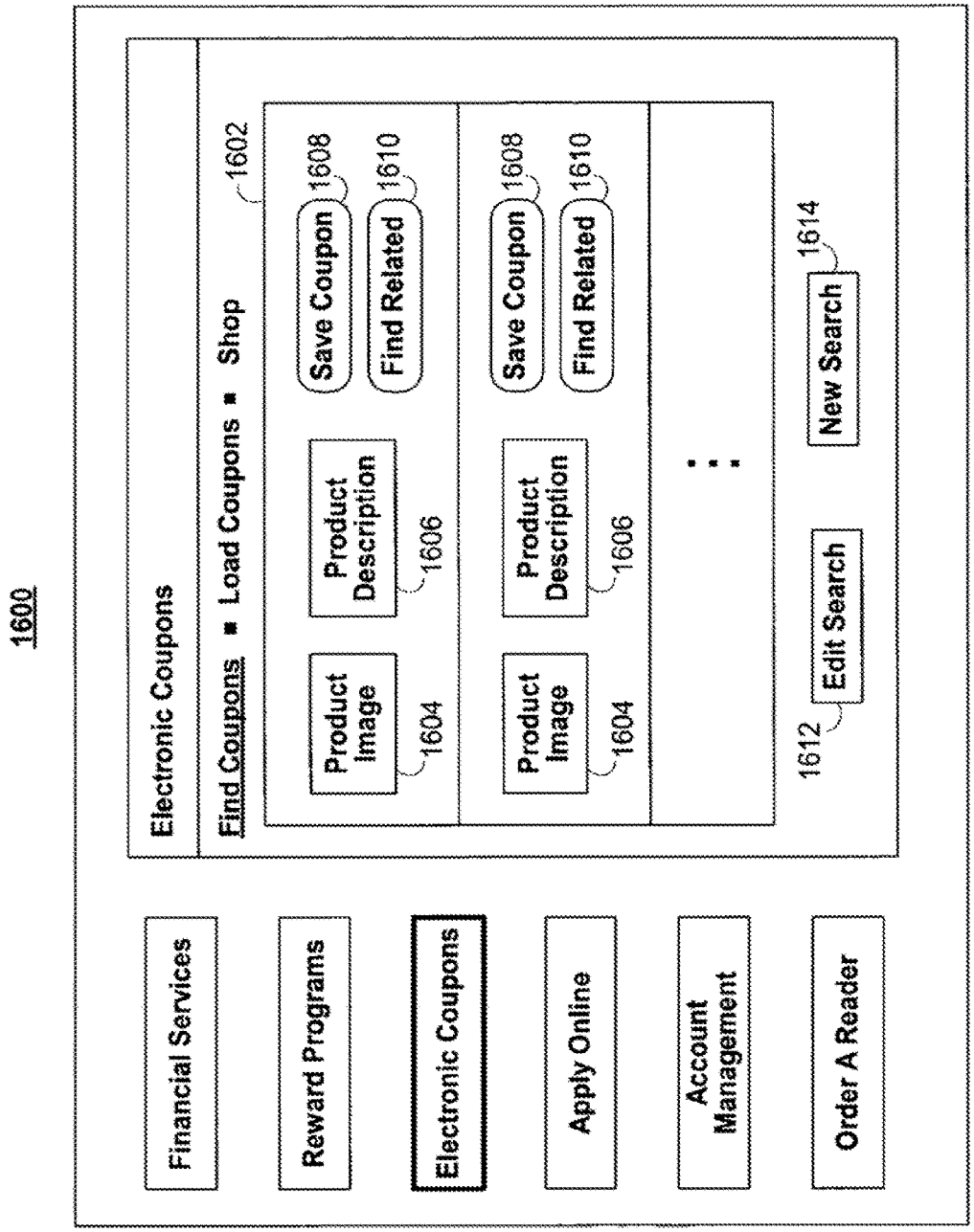
FIG. 16 shows an illustrative screen for recommending electronic coupons and other loyalty programs to the user based on a search performed by the user in accordance with one embodiment of the present invention.

FIG. 16 shows an illustrative screen 1600 for recommending electronic coupons and other loyalty programs to the user based on a search performed by the user in accordance with one embodiment of the present invention. The loyalty system may display screen 1600, for example, in response to the user conducting an advanced search as shown in screen 1500. For example, in response to the user indicating an interest in products in the genres related to home decor for holiday events, the loyalty system may display in screen 1600 a list 1602, which may contain one or more products that satisfy the criteria indicated in the search. In this example, the loyalty system displays in list 1602 all electronic coupons that are associated with products that fall within the home decor genre and correspond to holiday events.

The loyalty system may include, for example, a product image 1604 and a product description 1606, with each product displayed in list 1602 to give the user a brief overview of the electronic coupon or loyalty program. Product description 1606 may include information on the savings that the particular electronic coupon may provide to the user. The loyalty system may allow the user to add the electronic coupon to his smart card, for example, by selecting save coupon button 1608.

In the event that the user is interested in seeing more products in the same genre or products that are otherwise related (e.g., upon seeing a toothbrush, the user may be interested in seeing toothpaste) to a particular product displayed, the loyalty system may provide an opportunity for the user to find additional products related to the product that is currently displayed in list 1602, for example, by selecting find related button 1610.

In the event that the user does not find the type of products that he is looking for or that the user would otherwise like to modify the search, the loyalty system may provide an opportunity for the user to modify the current search, for example, by allowing the user to select edit search button 1612. The loyalty system may also provide an opportunity for the user to conduct a brand new search, for example, by selecting new search button 1614.

Screen 1600 is merely illustrative of such a display screen. Any other suitable arrangement may be used.

Figure 17:
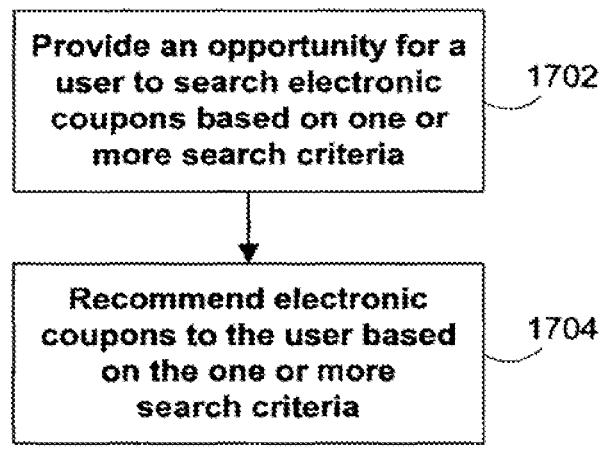
FIG. 17 shows a flowchart of illustrative steps involved in recommending electronic coupons and other loyalty programs to the user based on a search performed by the user in accordance with one embodiment of the present invention.

FIG. 17 shows a flowchart of illustrative steps involved in recommending electronic coupons and other loyalty programs to the user based on a search performed by the user in accordance with one embodiment of the present invention. At step 1702, the loyalty system provides an opportunity for the user to search electronic coupons based on one or more search criteria. The one or more search criteria may be selected by the user from search criteria provided by the loyalty system or the user may specify the search criteria.

The loyalty system may allow the user to conduct a simple search, for example, by specifying a term of interest to search for. The user may narrow the simple search, for example, by additionally specifying one or more search areas such as brand, product description, etc. to restrict the search as shown in screen 1500 of FIG. 15. The loyalty system may also provide an opportunity for the user to conduct more advanced searches, for example, by linking a simple search to a particular event such as a wedding, a birthday, etc.

At step 1704, the loyalty system may recommend electronic coupons that have been gathered as a result of the search to the user. The loyalty system may display the list of electronic coupons that are recommended to the user based on the criteria specified or selected by the user in the search, for example, in a list as shown on screen 1600 of FIG. 16. The loyalty system may allow the user to perform additional activities such as adding one or more of the recommended electronic coupons to his smart card, searching for electronic coupons related to a displayed coupon, or carrying out other suitable activities. The loyalty system may also allow the user to modify the current search or to initiate a new search.

In some embodiments of the present invention, the loyalty system may promote offerings of electronic coupons and other loyalty programs to the user through automatically displayed promotions (e.g., pop-up windows, pop-under windows, tickers, scrolling banners, etc.). The automatically displayed promotions may be activated, for example, upon the user accessing the provider's web site. Alternatively, the automatically displayed promotions may be pushed down to the user's PC at any time (e.g., without a triggering event such as accessing the provider's web site). In one suitable approach, the loyalty system may display the latest electronic coupons in one or more automatically displayed promotions when the user accesses the web site. The loyalty system may remove the automatically displayed promotions, for example, after a predefined period of time if the user does not interact with the automatically displayed promotions. In another suitable approach, the loyalty system may vary the electronic coupons displayed within an automatically displayed promotion, for example, by circulating a predefined list of electronic coupons and other loyalty programs.

In another suitable approach, the loyalty system may replace the electronic coupons displayed within an automatically displayed promotion, for example, as new electronic coupons are added to the database for storing electronic coupons and other loyalty programs. In yet another suitable approach, the loyalty system may vary the electronic coupons displayed within an automatically displayed promotion based on the type of electronic coupons and other loyalty programs that the user has shown interest towards (e.g., by selecting a coupon, by searching for a product, by searching for a brand, etc.). The loyalty system may also personalize the group of coupons that are shown to the user in automatically displayed promotions based on, for example, a unique group smart chip identification number, criteria in the user profile, any other suitable criteria, or any combination thereof. These approaches are merely illustrative of the approaches that may be used to display electronic coupons and other loyalty programs to the user within an automatically displayed promotion. Various other approaches may be employed.

Figure 18:
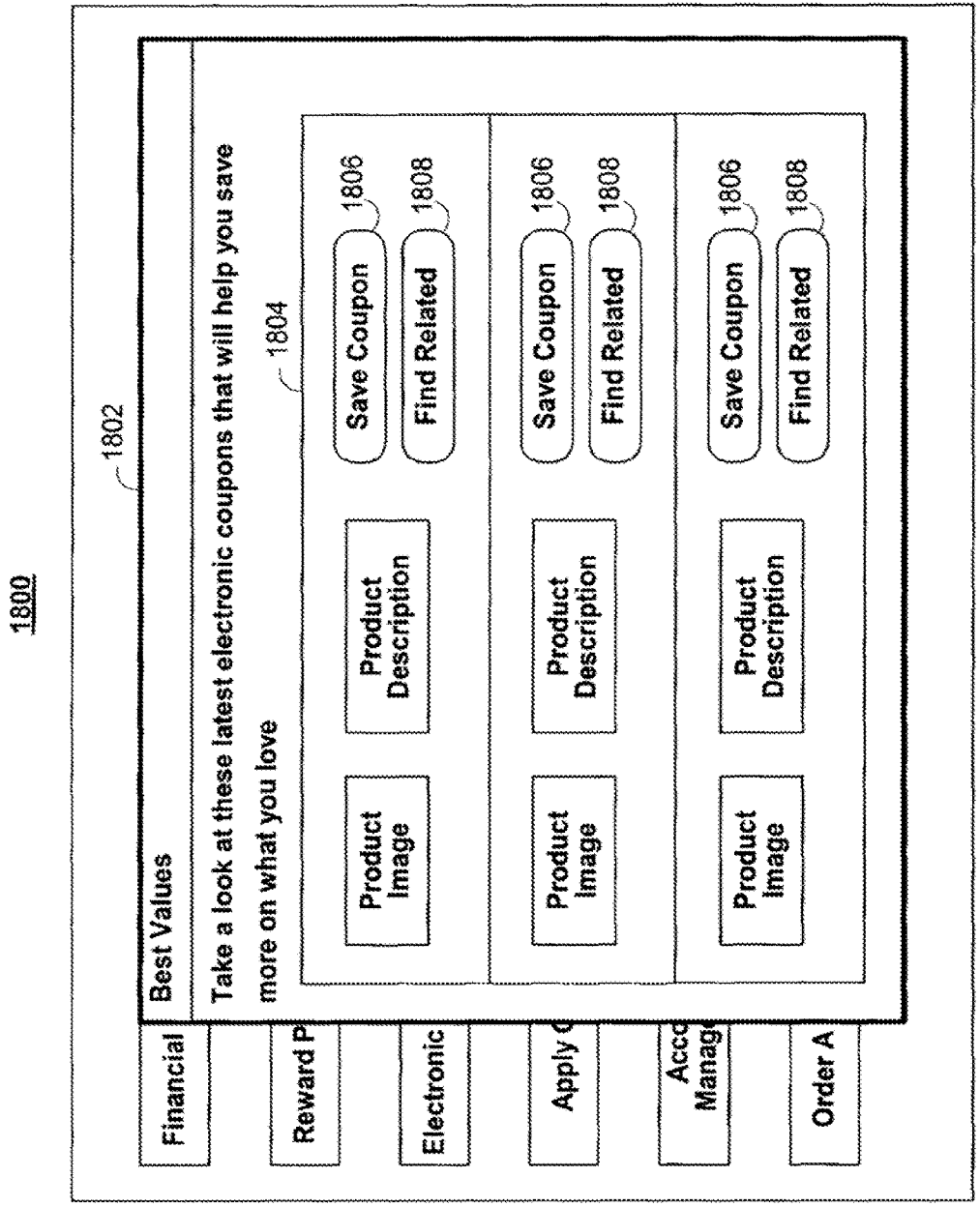
FIG. 18 shows an illustrative display screen that includes a pop-up window 1802 for displaying electronic coupons and other loyalty programs to the user in accordance with one embodiment of the present invention.

FIG. 18 shows an illustrative display screen 1800 that includes a pop-up window 1802 for displaying electronic coupons and other loyalty programs to the user in accordance with one embodiment of the present invention. The loyalty system may display pop-up window 1802, for example, in response to the user requesting information on electronic coupons by selecting electronic coupon option 708 on screen 700 of FIG. 7 or using any other suitable approach.

Pop-up window 1802 may include, for example, a short list of electronic coupons 1804 that the loyalty system has determined to be of interest to the user. The loyalty system may make such a determination, for example, based on the fact that the electronic coupons are the latest additions, based on interests of the user, which the loyalty system has determined through the user's smart card ID, IP address, user profile, or any other suitable criteria, based on the popularity of the electronic coupons, based on any other suitable marketing approach, or based on any combination thereof.

The loyalty system may allow the user to add one or more of the electronic coupons listed in electronic coupon list 1804 to the user's smart card, for example, by selecting save coupon buttons 1806. Save coupon button 1806 may actually link the user to the loyalty and rewards system's website such that the user may sign in with their smart card and download the electronic coupon. The loyalty system may also allow the user to search for other electronic coupons related to one or more of the displayed electronic coupons by, for example, selecting find related button 1808.

Pop-up window 1802 is merely illustrative of such a pop-up window. Any other automatically displayable promotion or suitable arrangement may be used.

Figure 19:
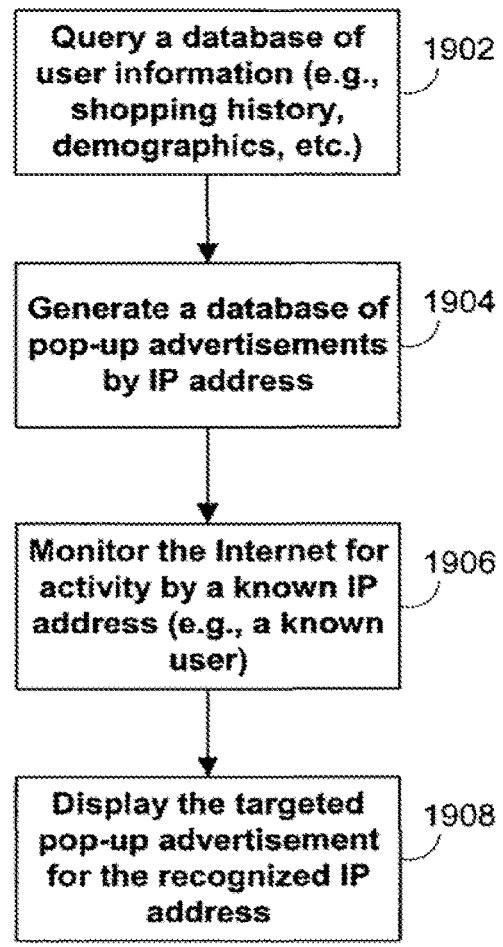
FIG. 19 shows a flowchart of illustrative steps involved in displaying electronic coupons and other loyalty programs to the user in accordance with one embodiment of the present invention.

FIG. 19 shows a flowchart of illustrative steps involved in displaying electronic coupons and other loyalty programs to the user in accordance with one embodiment of the present invention. At step 1902, the loyalty system queries a database of user information (e.g., user database 606) in order to personalize targeted pop-up windows of electronic coupons and loyalty programs. Based on this query, the loyalty and rewards system generates a database of popup advertisements. This is illustrated by step 1904. The advertisements may be for electronic coupons, loyalty programs, sale products, or any other acceptable promotional item. The personalized pop-ups are illustratively stored by user IP addresses.

The loyalty system may determine the query criteria, for example, by assuming that all users are interested in viewing the latest electronic coupons, by identifying the interest of the user group or cluster that the user belongs to (e.g., according to the user's smart card ID), by analyzing the various user-related information stored in the user profile associated with the user, by using any other suitable approach, or by using any combination of approaches thereof.

At step 1906, the loyalty and rewards system monitors the Internet for activity by a known IP address (e.g., a known user). When activity is detected by a known user, the loyalty and rewards system displays the targeted pop-up advertisement on the user's display, as illustrated by step 1908. In addition to known user Internet activity triggering the display of pop-up advertisements, activity on the merchant's website could also trigger the display of pop-up advertisements.

In some embodiments of the present invention, a portal or other suitable software package may be installed on the user's home computer so that the loyalty system may display pop-up windows, instant messages, or other automatically displayed promotions containing the latest electronic coupons and other loyalty programs on the user's desktop. In some embodiments of the present invention, the loyalty system may allow the user to disable the automatically displayed promotions (e.g., portal} feature.

Figure 20:
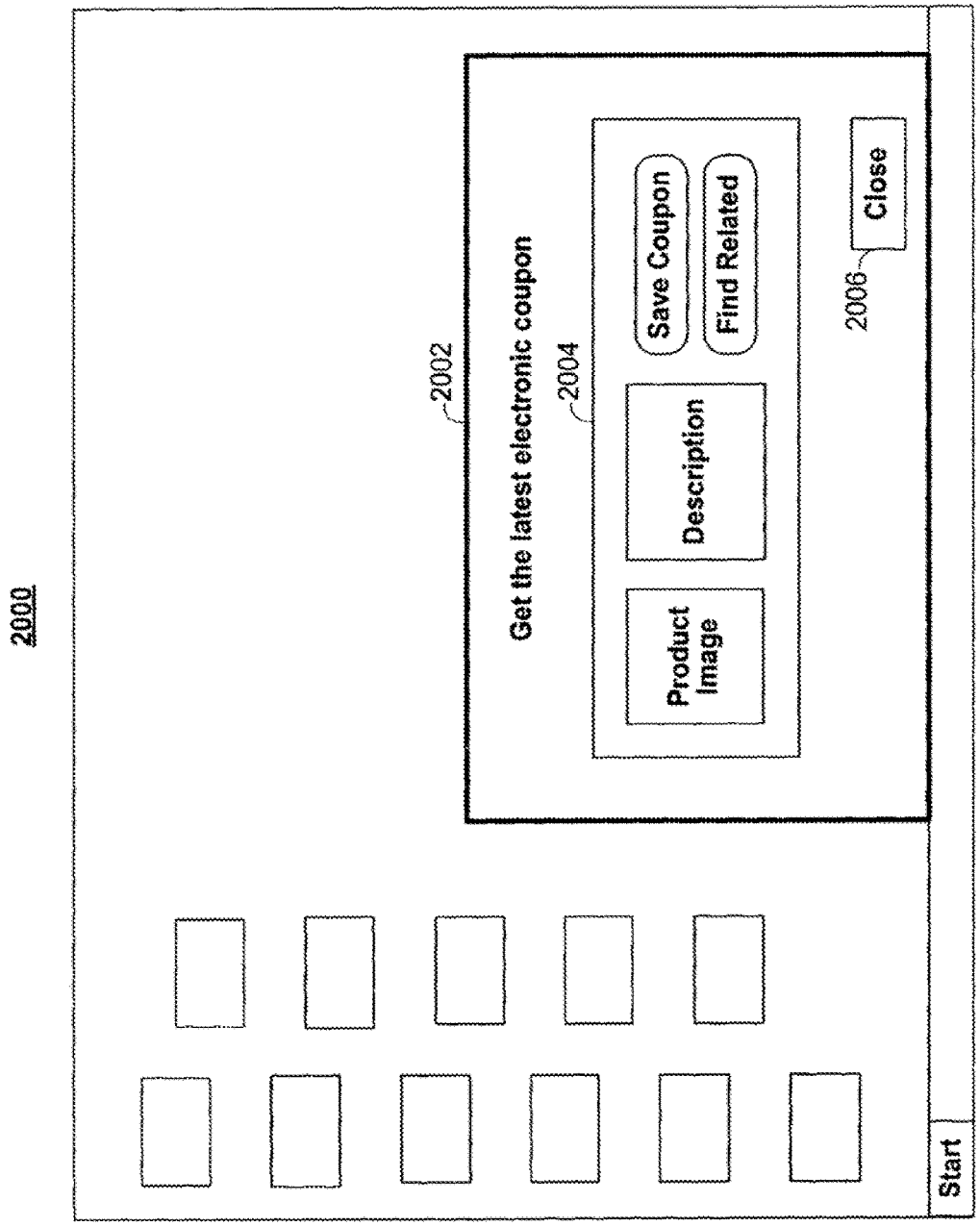
FIG. 20 shows an illustrative desktop on a user's home computer including a message window displaying electronic coupon-related information in accordance with one embodiment of the present invention.

FIG. 20 shows an illustrative desktop on a user's home computer including a message window 2002 displaying electronic coupon-related information in accordance with one embodiment of the present invention. Message window 2002 may be displayed, for example, in response to the user turning on the home computer if the home computer is always connected with the Internet, in response to the user establishing an Internet session, in response to the user establishing a client-server session with the loyalty system, or in response to any other suitable event. The appearance of message window 2002 may also be controlled by the loyalty program host (or other suitable automatically displayed promotion manager) without necessarily requiring a triggering event by the user.

Portals, like message window 2002 can be a valuable way of desktop marketing. The necessary software may be part of the software package a user installs to operate a smart card reader like smart card reader 302 of FIG. 3. A loyalty program host may use the portal to push down various offers such as a "coupon-of-the-day," or a personalized offer based on a user's past shopping history.

Message window 2002 may include, for example, a message informing the user of the content within message window 2002, one or more electronic coupons 2004, close button 2006 for manually closing the message window 2002, and any other suitable information. The one or more electronic coupons 2004 may be, for example, predetermined to be of interest to the user by the loyalty system, the latest electronic coupons added to the database maintained by the loyalty system, or any other suitable electronic coupons.

In some embodiments of the present invention, the loyalty system may automatically close message window 2002, for example, after a pre-defined time period, in response to a pre-defined period of inaction by the user, or according to any other suitable criteria. In some embodiments of the present invention, the user may be required to manually close message window 2002, for example, using close button 2006, as shown in the present example.

Screen 2000 is merely illustrative of such a display screen. Any other suitable arrangement may be used.

Figure 21:
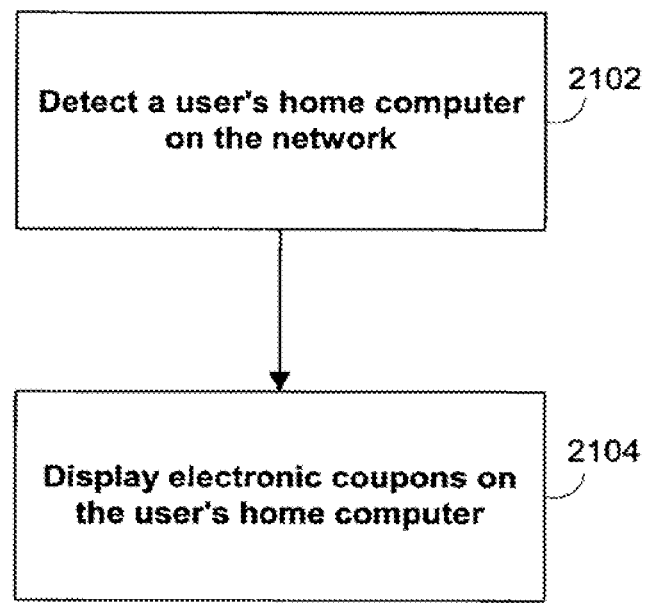
FIG. 21 shows a flowchart of illustrative steps involved in displaying electronic coupons on a user's home computer in accordance with one embodiment of the present invention.

FIG. 21 shows a flowchart of illustrative steps involved in displaying electronic coupons on a user's home computer in accordance with one embodiment of the present invention. At step 2102, the loyalty system detects that the user's home computer is on the network. The loyalty system may detect that the user's home computer is on the network, for example, by receiving a signal from a software package that has been installed on the user's home computer for the purpose of reporting to the loyalty system when the user's computer is on the network. The loyalty system may also detect the user's computer, for example, in response to the user establishing an Internet session, which may be reported to the loyalty system by a cookie deposited on the user's home computer. The loyalty system may also use any other suitable methods to detect the user's computer.

In response to detecting the user's computer on the network at step 2102, the loyalty system may deliver and display one or more electronic coupons on the user's home computer at step 2104. The loyalty 25 system may display the one or more electronic coupons, for example, in a message window such as message window 1502 of FIG. 15. The loyalty system may additionally require the user to manually close the message window. In some embodiments of the present invention, the loyalty system may allow the user to disable the message window feature, for example, using options provided by the installed software.

In some embodiments of the present invention, the loyalty system may allow the user to save electronic coupons and other loyalty programs to a wishlist, which may be maintained for the user within the loyalty system (e.g., on rewards database 610). The loyalty system may then allow the user to download the saved electronic coupons and other loyalty programs onto the smart chip of the user's smart card.

For example, when the user selects an electronic coupon to save from the provider's web site, the loyalty system may first attempt to save the electronic coupon to the user's smart chip. If the loyalty system determines that the user's smart card is not present, that the user's smart card is full, that the user does not have a smart card reader installed, or that the user's smart card is otherwise not available for data transfer, the loyalty system may prompt the user to save the electronic coupon to the user's wishlist.

The loyalty system may allow the user to access the wishlist at a later time, for example, from the user's home computer, from an in-store kiosk, from a POS system, or from any other suitable access point to the loyalty system. The loyalty system may further enable the user to download the wishlist onto the user's smart chip. In such embodiments of the present invention, the loyalty system eliminates the need, for example, for the user to install a smart card reader and any software that may be associated with operation of the smart card at home. The user may instead, save various electronic coupons and other loyalty programs to the wishlist while at home and then download it onto his smart card upon arrival at the participating retail location.

Figure 22:
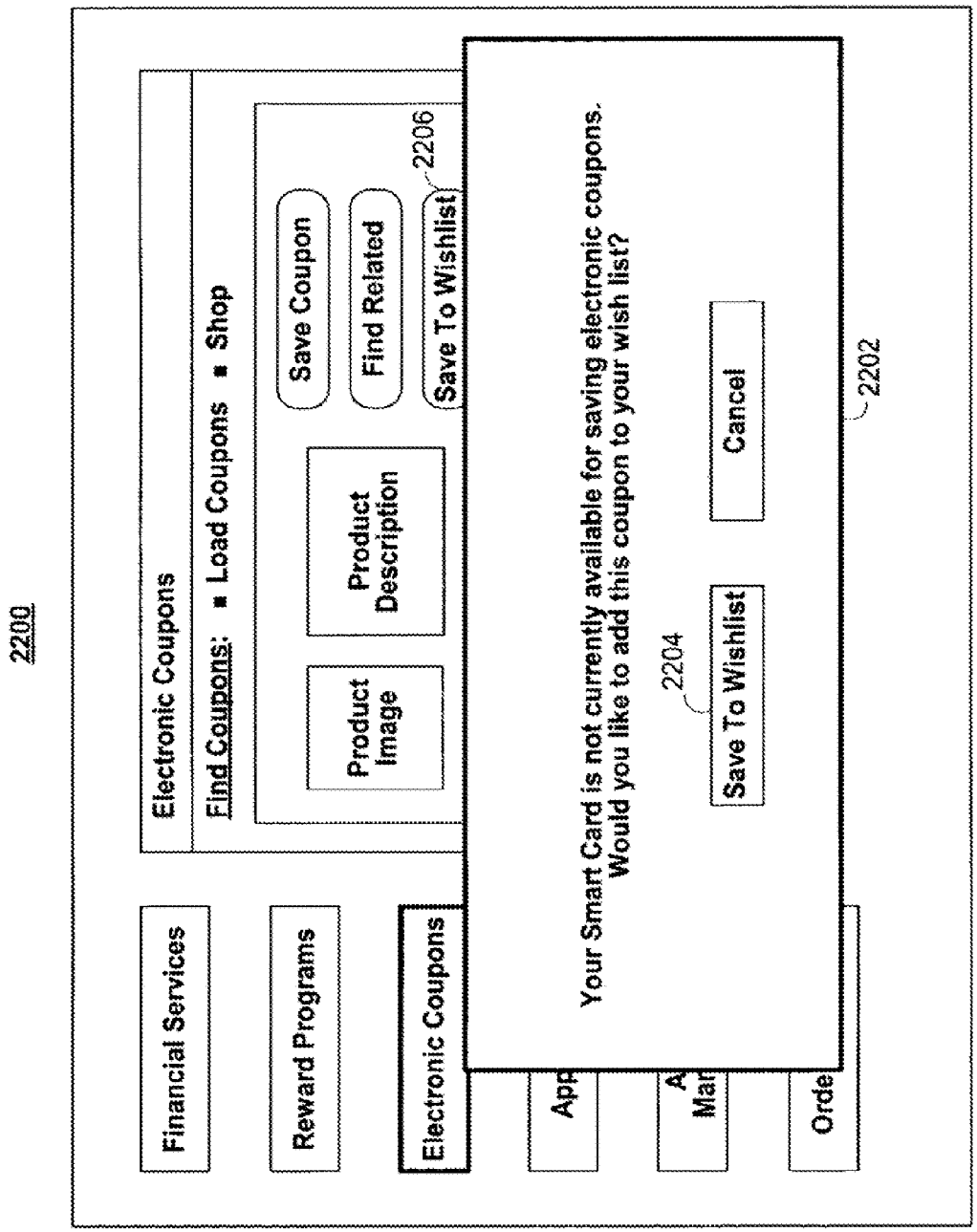
FIG. 22 shows an illustrative display screen having a pop-up window that allows the user to save an electronic coupon to a wishlist in accordance with one embodiment of the present invention.

FIG. 22 shows an illustrative display screen 2200 having a pop-up window 2202 that allows the user to save an electronic coupon to a wishlist in accordance with one embodiment of the present invention. Screen 2200 may be any suitable display screen that allows the user to view and save electronic coupons such as those shown in screen 1600 of FIG. 16 and screen 1800 of FIG. 18.

In response to the user selecting an electronic coupon to save, for example, by selecting save coupon buttons 1608 or 1806 on screens 1600 (FIG. 16) and 1800 (FIG. 18) respectively, the loyalty system may display pop-up window 2202 to inform the user that the selected electronic coupon may not be saved to the user's smart card, for example, because the user's smart card is not available for storing electronic coupons. Such a situation may arise, for example, when the user is browsing electronic coupons without inserting the user's smart card, when the memory on the user's smart chip of the smart card is full, when the user's smart card is otherwise not in communication with the loyalty system, etc. Alternatively, the user may choose to invoke the wishlist functionality at the beginning of his coupon browsing session, for example, by indicating that he will not be inserting his smart card into the card reader for the present transaction. By indicating this, the system may then avoid giving repeated notices to the user to insert a smart card during the session.

In such situations, pop-up window 2202 may be displayed by the loyalty system to offer the user an opportunity to save the selected electronic coupon to the user's wish list, for example, by using save to wishlist button 2204. In another suitable arrangement, the loyalty system may directly offer the user an opportunity to save an electronic coupon to the user's wishlist without attempting to save the electronic coupon to the user's smart card first. For example, the loyalty system may allow the user to save an electronic coupon to the wishlist simply by using save to wishlist button 2206.

Screen 2200 is merely illustrative of such a display screen. Any other suitable arrangement may be used.

Figure 23:
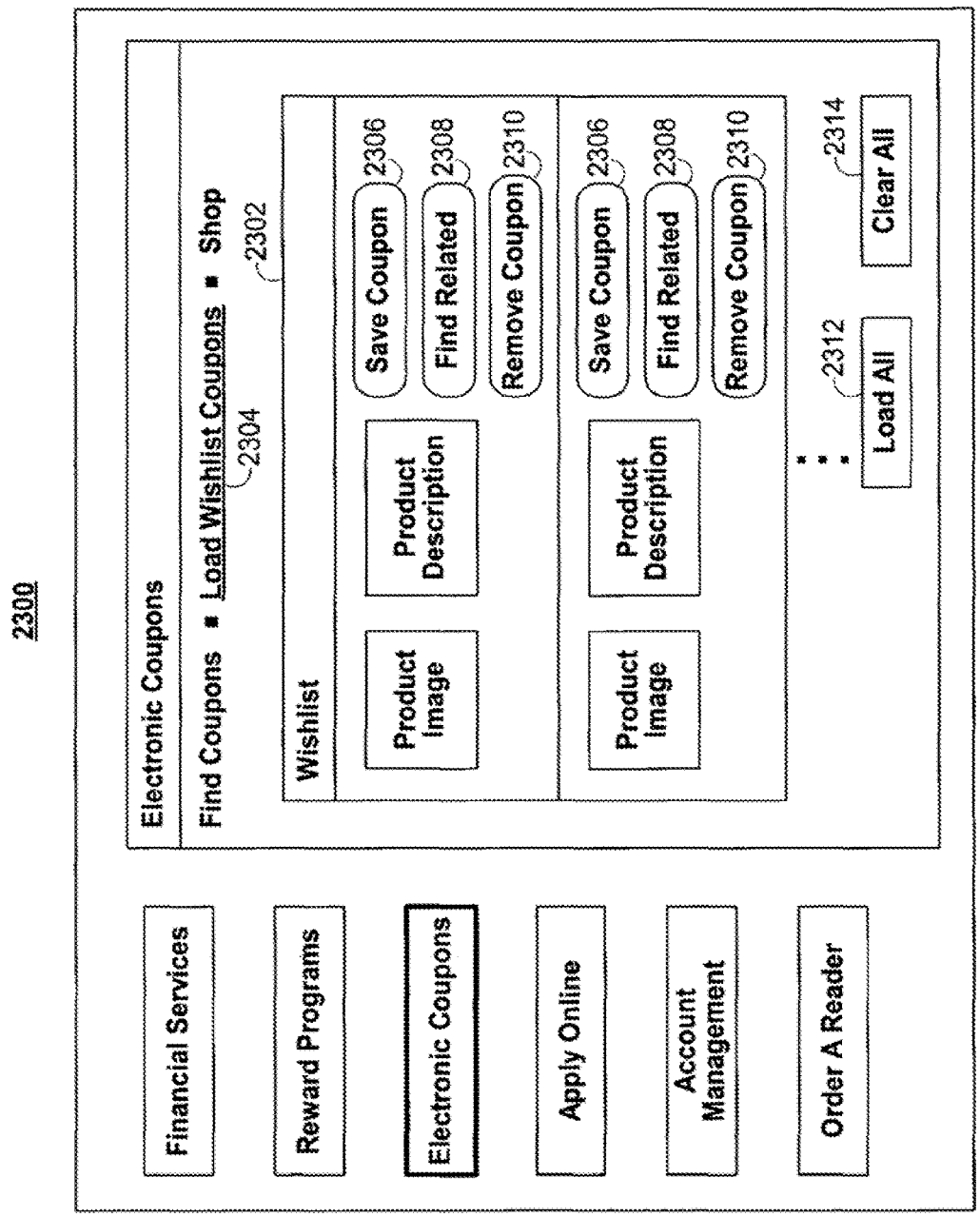
FIG. 23 shows an illustrative display screen having a wishlist that the user may download to the user's smart card in accordance with one embodiment of the present invention.

FIG. 23 shows an illustrative display screen 2300 having a wishlist 2302 that the user may download to the user's smart card in accordance with one embodiment of the present invention. The loyalty system may display screen 2300 in response to, for example, the user selecting load wishlist coupons option 2304 on any suitable screen associated with electronic coupons (e.g., screen 1600 of FIGS. 16 and 1800 of FIG. 18).

The loyalty system may allow the user to save each electronic coupon in wish list 2302 individually, for example, by selecting save coupon button 2306 corresponding to a desired electronic coupon in wishlist 2302. The loyalty system may also allow the user to search for additional electronic coupons that are related to the product featured in one or more of the electronic coupons displayed in wish list 2302, for example, by using the find related button 2308. The user may also remove any electronic coupon from the wishlist, for example, by selecting remove coupon button 2310.

Additionally, the loyalty system may enable the user to load all of the electronic coupons stored in wishlist 2302 with one easy step, for example, by selecting load all button 2312. Similarly, the loyalty system may allow the user to clear all of the electronic coupons stored in wishlist 2302 by selecting clear all button 2314. In some embodiments of the present invention, the loyalty system may automatically purge any electronic coupon saved in wishlist 2302 in response to the user downloading the electronic coupon to the user's smart card. In some embodiments of the present invention, the loyalty system may also automatically purge any electronic coupon saved in wishlist 2302 that is past its expiration date.

Screen 2300 is merely illustrative of such a display screen. Any other suitable arrangement may be used.

Figure 24:
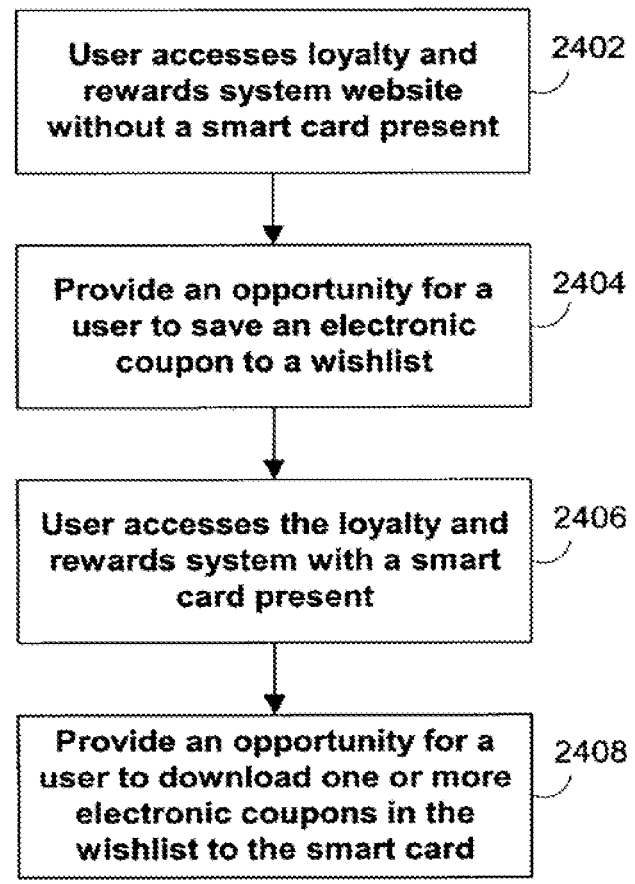
FIG. 24 shows a flowchart of illustrative steps involved in allowing the user to save electronic coupons and other loyalty programs to a wishlist that may be downloaded to the user's smart card at a later time in accordance with one embodiment of the present invention.

FIG. 24 shows a flowchart of illustrative steps involved in allowing the user to save electronic coupons and other loyalty programs to a wishlist that may be downloaded to the user's smart card at a later time in accordance with one embodiment of the present invention. At step 2402, the loyalty system is accessed without a smart card present. The user may be provided with an opportunity to save one or more electronic coupons to a wishlist at step 2404. The loyalty system may allow the user to directly save an electronic coupon to the wishlist, for example, by providing a save to wishlist button such as save to wishlist button 2206 of FIG. 22. The loyalty system may also allow the user to save an electronic coupon to the wishlist upon determining that the electronic coupon may not be saved to the user's smart card, for example, through pop-up window 2202 of FIG. 22.

At step 2406, the user accesses the loyalty system with a smart card present. At this time, the loyalty system may provide an opportunity for the user to download one or more of the electronic coupons saved in the wishlist to the user's smart card, as shown by step 2408. In one suitable approach, the loyalty system may allow the user to individually download electronic coupons from the wishlist, for example, using a save coupon button such as button 2306 of FIG. 23. In another suitable approach, the loyalty system may allow the user to download the entire wishlist to the user's smart card, for example, using a load all button such as button 2312 of FIG. 23.

Wishlists, the ability to browse and download electronic coupons at in-store kiosks, and kiosk-only promotional offers provide users with several ways to interact with the loyalty and rewards system in the store. Furthermore, the kiosks prevent slow-downs at the POS lanes by encouraging users to interact with the loyalty and rewards system at the kiosk. That way, interaction at the POS can be kept to the processing of electronic coupons and loyalty programs. Use of the kiosks may be encouraged in a number of ways. For example, shelf tags may be placed next to items in the store for which electronic coupons are available. Illustratively, the shelf tag may read "Save Big By Downloading a Coupon for [product] at the In-Store Kiosk." The shelf tags may also alert users to electronic coupons that are available for download at their home PCs as well. The kiosks may also be configured such that they only present coupons to users for items that are available in that store. The kiosk may be connected (e.g., via a store network) to the store's inventory system to ensure that out-of-stock items are not promoted at the kiosk with electronic coupons.

In some embodiments of the present invention, the loyalty system may create and store profiles for each of the participating retail stores. The store profile may include information such as store location, store inventory, special store promotions, store layout (e.g., product descriptions for various aisles, a map of the store, etc.), and any other suitable store-related information. Based on the store profile information, the loyalty system may, for example, help the user to locate a participating retail location that has a pharmacy. The loyalty system may also present the user with offerings of, for example, health and beauty products, from the retail store that the user often frequents for such products.

As another example, when a new retail location opens or is added to the loyalty system, the loyalty system may inform the user, who lives or shops within the area of the new participating retail location, of vital information such as the address and key promotions (e.g., grand opening promotions) associated with the new retail location. The loyalty system may also, for example, offer special grand opening or store-specific offers from the new retail location to the user.

Figure 25:
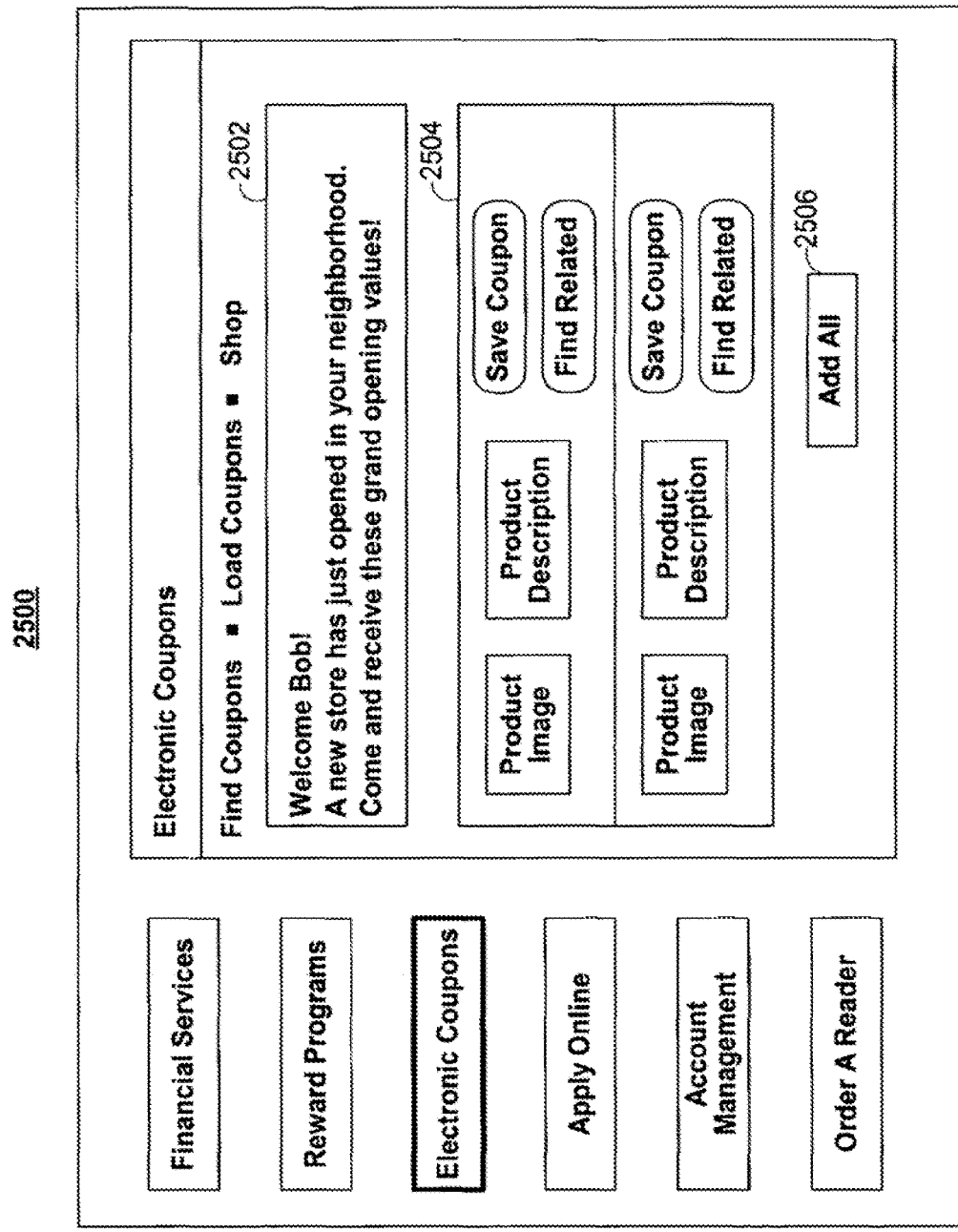
FIG. 25 shows an illustrative display screen that informs the user of a new retail location and presents the user with promotions specific to the new retail location in accordance with one embodiment of the present invention.

FIG. 25 shows an illustrative display screen 2500 that informs the user of a new retail location and presents the user with promotions specific to the new retail location in accordance with one embodiment of the present invention. Display screen 2500 may be shown, for example, in response to the user signing in to the loyalty system using sign in option 724 of FIG. 7. The loyalty system may recognize the user and may subsequently access information associated with the user based on, for example, the user's smart card information communicated to the loyalty system during the sign in process.

Based on such information associated with the user, the loyalty system may display message region 2502 to inform the user, for example, that a new participating retail location has opened in the user's neighborhood. In addition, the loyalty system may offer special values such as electronic coupons that are specific to the new retail location, for example, by presenting the user with a featured offers list 2504 including electronic coupons that the user may add to the user's smart card. The loyalty system may also provide an add all button 2506 to enable the user to quickly save the entire list of special savings to the user's smart card. Additionally, special savings regarding a particular store location could be delivered to a user at the PPOS.

Furthermore, the loyalty and rewards system may limit the electronic coupons displayed to a particular user to offers for products typically carried by the new retail location or other retail locations within the user's area. For example, products like cherry cola may be more popular in a particular region. Thus, retail locations in that region would offer electronic coupons for cherry cola while retail locations in other regions may not.

Screen 2500 is merely illustrative of such a display screen. Any other suitable arrangement may be used.

In some embodiments of the present invention, the loyalty system may allow the user to specify one or more participating retail locations that the user may be most interested in receiving promotional information from. Based on the user's specification, the loyalty system may, for example, present electronic coupons and other loyalty programs associated with these retail locations as featured offerings to the user.

For example, the loyalty system may present electronic coupons and other loyalty programs that are specific to the retail locations specified by the user as featured items, which may be displayed more prominently (e.g., at the top of the page), when the user browses the various promotional offers.

FIG. 26 shows an illustrative display screen 2600 that allows the user to select retail locations to receive offerings from in accordance with one embodiment of the present invention. The loyalty system may display screen 2600, for example, in response to the user accessing the loyalty system for the very first time. The loyalty system may determine the user's address, for example, based on information associated with the user's smart card such as smart card ID, user profile, etc. The loyalty system may then display a list 2602 including one or more retail locations that are nearest to the user for the user's selection. The user may select one or more locations from list 2602 to receive information on promotional offers such as electronic coupons and other loyalty programs, for example, by selecting checkboxes 2604.

The loyalty system may also provide one or more search mechanisms such as zip code search mechanism 2606 and state and city search mechanism 2608 to enable the user to obtain information on other retail locations that may not be displayed in list 2602. Users may be rewarded for providing the loyalty and rewards system with additional information (e.g., the user's e-mail address) or for interacting with the loyalty and rewards system (e.g., loading a specific number of electronic coupons, completing a survey, etc.).

Screen 2600 is merely illustrative of such a display screen. Any other suitable arrangement may be used.

Figure 27:
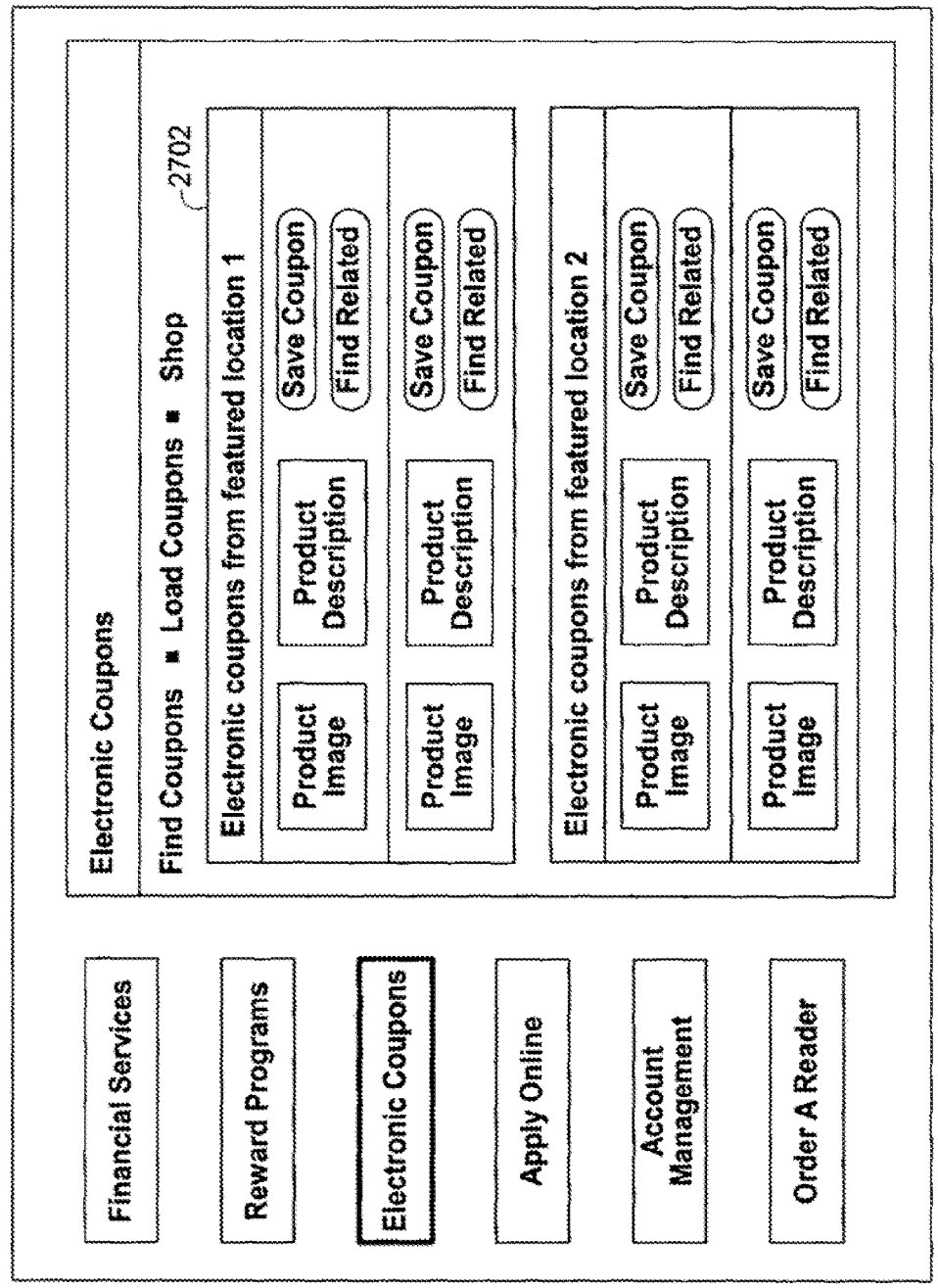
FIG. 27 shows an illustrative display screen that displays electronic coupons specific to a retail location that has been specified by the user as featured items in accordance with one embodiment of the present invention.

FIG. 27 shows an illustrative display screen 2700 that displays electronic coupons specific to a retail location that has been specified by the user as featured items in accordance with one embodiment of the present invention. The loyalty system may display screen 2700, for example, in response to the user selecting browse coupons option 722 of FIG. 7, selecting find coupons option from any suitable display screens associated with electronic coupons, or using any other suitable approach. The loyalty system may display in list 2702 all or some of the electronic coupons that may be of interest to the user from one or more retail locations that have been either selected by the user or determined to be near the user on screen 2700 (e.g., at the top of the page). The loyalty system may also organize these electronic coupons by retail locations if more than one retail location is featured.

Screen 2700 is merely illustrative of such a display screen. Any other suitable arrangement may be used.

Figure 28:
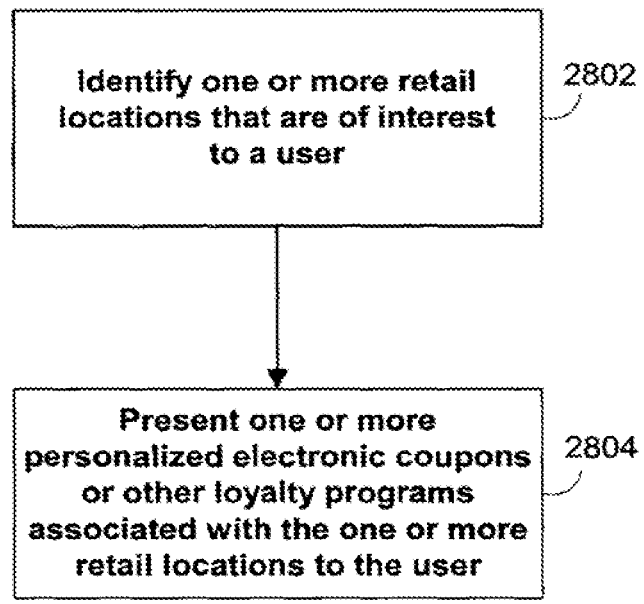
FIG. 28 shows a flowchart of illustrative steps involved in presenting electronic coupons and other loyalty programs that are specific to a retail location to the user based on a store profile in accordance with one embodiment of the present invention.

FIG. 28 shows a flowchart of illustrative steps involved in presenting electronic coupons and other loyalty programs that are specific to a retail location to the user based on a store profile in accordance with one embodiment of the present invention. At step 2602, the loyalty system may identify one or more retail locations that are of interest to the user. For example, the loyalty system may identify a retail location that is near the user based on information specific to the user such as the user's address information associated with the user's smart card, the user's address stored in the user profile, or any other suitable user information. Additionally, the loyalty system may identify retail locations previously visited by the user.

The loyalty system may identify a retail location that is otherwise of interest to the user, for example, by allowing the user to select one or more such retail locations using screen 2600 of FIG. 26.

At step 2804, the loyalty system may present one or more personalized electronic coupons or other loyalty programs that are associated with the retail locations identified in step 2602 to the user. The loyalty system may display the one or more personalized electronic coupons or other loyalty program at a prominent position on the screen, for example, at the top of the screen as shown in screen 2700 of FIG. 27.

In some embodiments of the present invention, the loyalty system may allow the user to sort a shopping list of his stored electronic coupons and other loyalty programs based on the layout of a particular retail location. For example, the loyalty system may provide an opportunity for the user to select an option to sort the user's stored electronic coupons and loyalty programs based on the product locations in a particular retail location. The loyalty system may subsequently allow the user to select a retail location as the sort criteria. The loyalty system may allow the user to select the retail location from, for example, a list of retail locations, or the loyalty system may use a retail location that the user has previously selected for default, for example, in the user's profile.

Based on, for example, the store layout description or layout map that has been stored by the loyalty system in the store profile, the loyalty system may generate a shopping list, which may indicate to the user, for example, the order in which he will encounter the products for which he has electronic coupons if he proceeds through the store on an aisle-by-aisle basis. The loyalty system may also provide an option for the user to print the shopping list. The shopping list may identify the location of each electronic-coupon-related-product on a map, by aisle and shelf numbers/letters, or by any suitable technique for identifying product locations. In some embodiments, a user may be able to sort the shopping list by what is currently on sale. Thus, the user may be able to identify products for which he could obtain double 30 savings. The shopping list may mark coupons that are for sale items with an "on-sale" logo such as a down arrow or an asterisks, for example.

Alternatively, the loyalty system may allow the user to map the user's stored electronic coupons and loyalty programs to the aisles of the particular retail location. In this alternative embodiment, the loyalty system provides the user with a graphical representation of the aisles insides the user-selected retail location. The loyalty system may further graphically indicate to the user the actual location of the products associated with the user's stored electronic coupons and loyalty programs.

Figure 29:
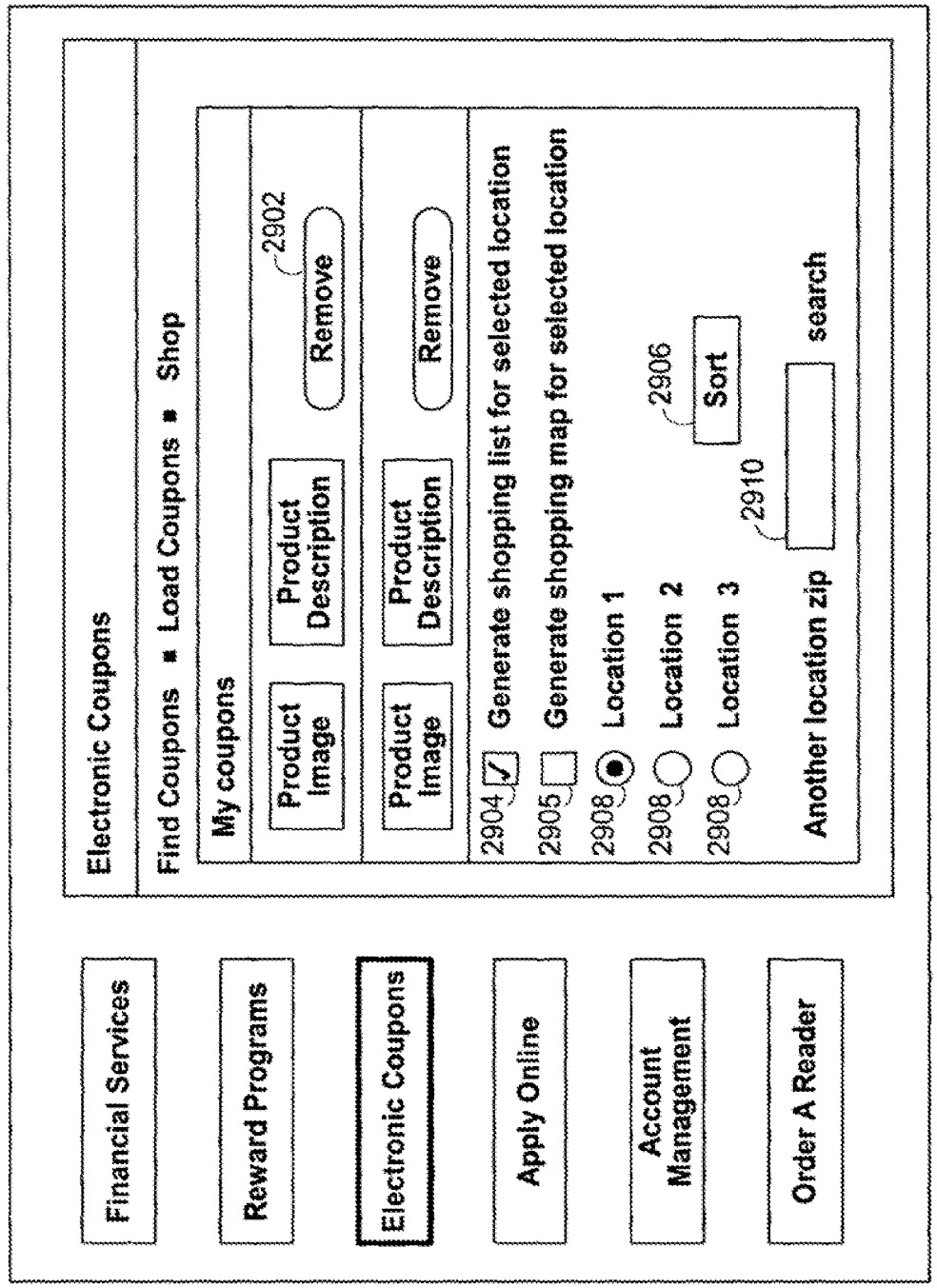
FIG. 29 shows illustrative display screen that allows the user to sort his shopping list based on a particular retail location in accordance with one embodiment of the present invention.

FIG. 29 shows illustrative display screen 2900 that allows the user to sort his shopping list based on a particular retail location in accordance with one embodiment of the present invention. The loyalty system may display screen 2900, for example, in response to the user requesting to review electronic coupons that are currently saved on the user's smart card. In addition to displaying list 2902 containing electronic coupons that are currently saved on the user's smart card, the loyalty system may provide an opportunity for the user to sort the list of electronic coupons based on a specific retail location, for example, by selecting checkbox 2904.

Furthermore, the user may be able to add items to a shopping list for which the user does not have an electronic coupon. Means for doing so may be via a keyboard attached to the user's PC or an in-store kiosk. When the user enters shopping list items such as "soda," "pop," or "cola," the loyalty and rewards system may present the user with available coupons relating to the shopping list items. In addition, the system may also promote a competing product. For example, if the user enters one brand on his or her shopping list, a coupon for the same product type, but of a different brand, may be promoted.

If the user has previously only selected one retail location that is of interest to the user, then the loyalty system may display that location to the user and sort the list of electronic coupons to the previously selected location, for example, when the user selects sort option 2906. If the user has previously selected multiple retail locations, for example, to receive offerings from in screens such as screen 2600 of FIG. 26, the loyalty system may allow the user to select one of those retail locations for sorting the shopping list, for example, using radio buttons 2908. The loyalty system may also provide a search mechanism such as zip code search option 2910 to enable the user to search for a brand new retail location for sorting purposes. Additionally, if the shopping list is accessed and sorted at an in-store kiosk, the list may be, by default, sorted by the retail location in which the kiosk resides.

Screen 2900 is merely illustrative of such a display screen. Any other suitable arrangement may be used.

FIG. 30 shows illustrative display screen 3000 that displays electronic coupons that have been sorted into a shopping list based on the layout of a retail location specified by the user in accordance with one embodiment of the present invention. The loyalty system may display screen 3000, for example, in response to the user selecting sort option 2906 while having selected generate shopping list option 2904.

Screen 3000 may include, for example, a retail location information region 3002 for displaying information such as name, address, phone number, special promotion, or any other suitable information associated with the selected retail location. Screen 3000 may also include shopping list 3004 that includes electronic coupons saved by the user on the user's smart card that are, for example, sorted based on the physical layout of the user-selected retail location (e.g., aisle by aisle). Shopping list 3004 is presented in such a way that if the user is to walk into the store with the list, the user will encounter each of the products listed in shopping list 3004 in the order sorted.

The loyalty system may provide an option, such as print list option 3006, on screen 3000 to enable the user to obtain a paper copy of the shopping list.

Screen 3000 is merely illustrative of such a display screen. Any other suitable arrangement may be used.

Figure 31:
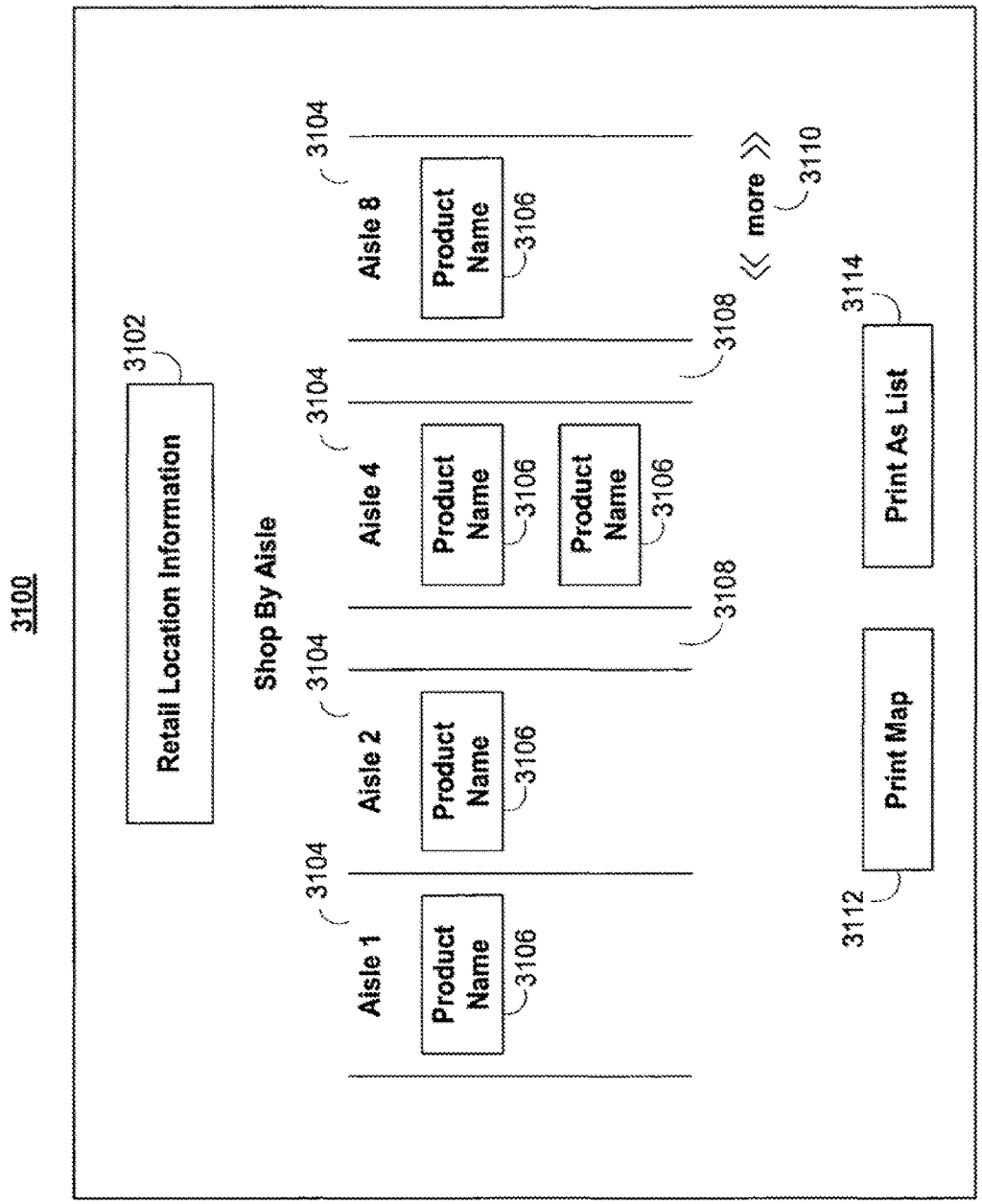
FIG. 31 shows an illustrative display screen that displays electronic coupons mapped to a retail location specified by the user in accordance with one embodiment of the present invention.

FIG. 31 shows an illustrative display screen 3100 that displays electronic coupons mapped to a retail location specified by the user in accordance with one embodiment of the present invention. The loyalty system may display screen 3100, for example, in response to the user selecting sort option 2906 of FIG. 29, in which the user may have also selected maps option 2905 (FIG. 29) to map electronic coupons saved on the user's smart card to a selected retail location. Additionally, electronic coupons that are available in the loyalty system, but not yet saved to a user's smart card, may be mapped to the selected retail location. Screen 3100 may include, for example, a retail location information region 3102 for displaying information such as name, address, phone number, special promotion, or any other suitable information associated with the selected retail location.

In this example, the loyalty system has mapped the user's saved electronic coupons to the aisles of the selected retail location. The loyalty system may display only those aisles 3104 in which one or more of the products corresponding to the user's saved electronic coupons are located. The loyalty system may display product names of each of the products within aisle 3104. Aisles that do not include products that correspond to any of the user's saved electronic coupons may be represented on screen 3100 by space bars 3108.

If the loyalty system is unable to display all the relevant aisles within screen 3100, the loyalty system may provide a mechanism such as more links 3110 to enable the user to slide left or right in order to view additional aisles. Additionally, the loyalty system may provide print functionality through, for example, print map button 3112 to allow the user to print the saved electronic coupons mapped to the aisles of the selected retail location as shown on screen 3100. The loyalty system may also provide an option such as print as list option 3114 to enable the user to obtain, for example, a shopping list of the saved electronic coupons in which the aisles or the layout of the selected retail location is described but not visually shown. Furthermore, the loyalty system may print the product barcodes, or UPCs (universal product codes), that correspond to the various electronic coupons and loyalty programs so that a user can be sure to purchase the correct products to receive their savings.

Screen 3100 is merely illustrative of such a display screen. Any other suitable arrangement may be used.

Figure 32:
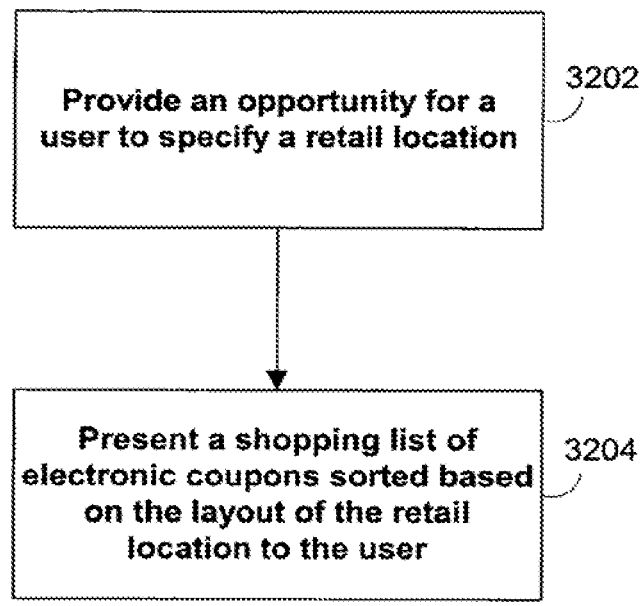
FIG. 32 shows a flowchart of illustrative steps involved in presenting electronic coupons and other loyalty programs that are sorted based on a particular retail location in accordance with one embodiment of the present invention.

FIG. 32 shows a flowchart of illustrative steps involved in presenting electronic coupons and other loyalty programs that are sorted based on a particular retail location in accordance with one embodiment of the present invention. At step 3202, the loyalty system provides an opportunity for the user to specify a retail location for sorting of saved electronic coupons. If the user is interacting with an in-store kiosk, the loyalty system may select the kiosk retail location as the default location for sorting. The loyalty system may allow the user to select his saved favorite retail location, which the user has selected, for example, when the user initially created his smart card account with the loyalty system. An example of the user making such a selection is shown, for example, in screen 2600 of FIG. 26. The loyalty system may also allow the user to select the retail location each time the user indicates a desire to sort electronic coupons for a particular retail location to generate a shopping list. An example of such an arrangement is shown, for example, in screen 2900 of FIG. 29. In some embodiments of the present invention, the loyalty system may automatically select a retail location for the user, for example, based on the user's address, based on the user's shopping needs, based on the electronic coupons that are saved on the user's smart card, or based on any other suitable criteria.

Upon receiving or determining suitable information about the retail location (e.g., address, layout description, layout map, etc.), the loyalty system may sort one or more electronic coupons that are saved on the user's smart card to the selected retail location and present the user with a shopping list of electronic coupons that are sorted based on the layout of the retail location to the user at step 3204. An example of a sorted shopping list is shown, for example, on screen 3000 of FIG. 30.

The loyalty system may sort all of the electronic coupons that are saved on the user's smart card in the shopping list or the loyalty system may enable the user to choose one or more of the saved electronic coupons for sorting. The electronic coupons may be sorted, for example, based on their location in a selected retail location as shown in screen 3000 of FIG. 30. Alternatively, the loyalty system may classify and/or sort the various electronic coupons based on the overhead department signs located in the selected retail location or using any other suitable approach to help the user locate the products corresponding to the electronic coupons saved to his smart card.

In some embodiments of the present invention, the loyalty system may also provide an opportunity for the user to print the electronic coupons sorted for the selected retail location. The loyalty system may allow the user to print the sorted electronic coupons, for example, as a list in the order in which the user will encounter the various products if he moves through the store on an aisle-by-aisle basis, or as any other suitable format having navigational information.

In some embodiments of the present invention, the loyalty system may dynamically link new promotional offers to electronic coupons and other loyalty programs that are saved on the user's smart card to encourage the user to take advantage of the new promotional offers. For example, the loyalty system may generate new promotional offers that may or may not be electronic coupons, for example, on a daily basis based on inventory. The loyalty system may link these promotional offers to appropriate electronic coupons or other loyalty programs that have been issued, for example, based on brand, function, or any other suitable criteria.

When the user views his saved electronic coupons, purchases items using the smart card, or otherwise interacts with the loyalty system using his smart card, the loyalty system may compare the user's saved electronic coupons and loyalty programs to the list of electronic coupons and loyalty programs that are associated with new promotional offers. If the loyalty system identifies such an electronic coupon or loyalty offer, the loyalty system may inform the user of the new promotional offer, for example, by displaying a pop-up window on an appropriate screen containing the new promotional offer.

Figure 33:
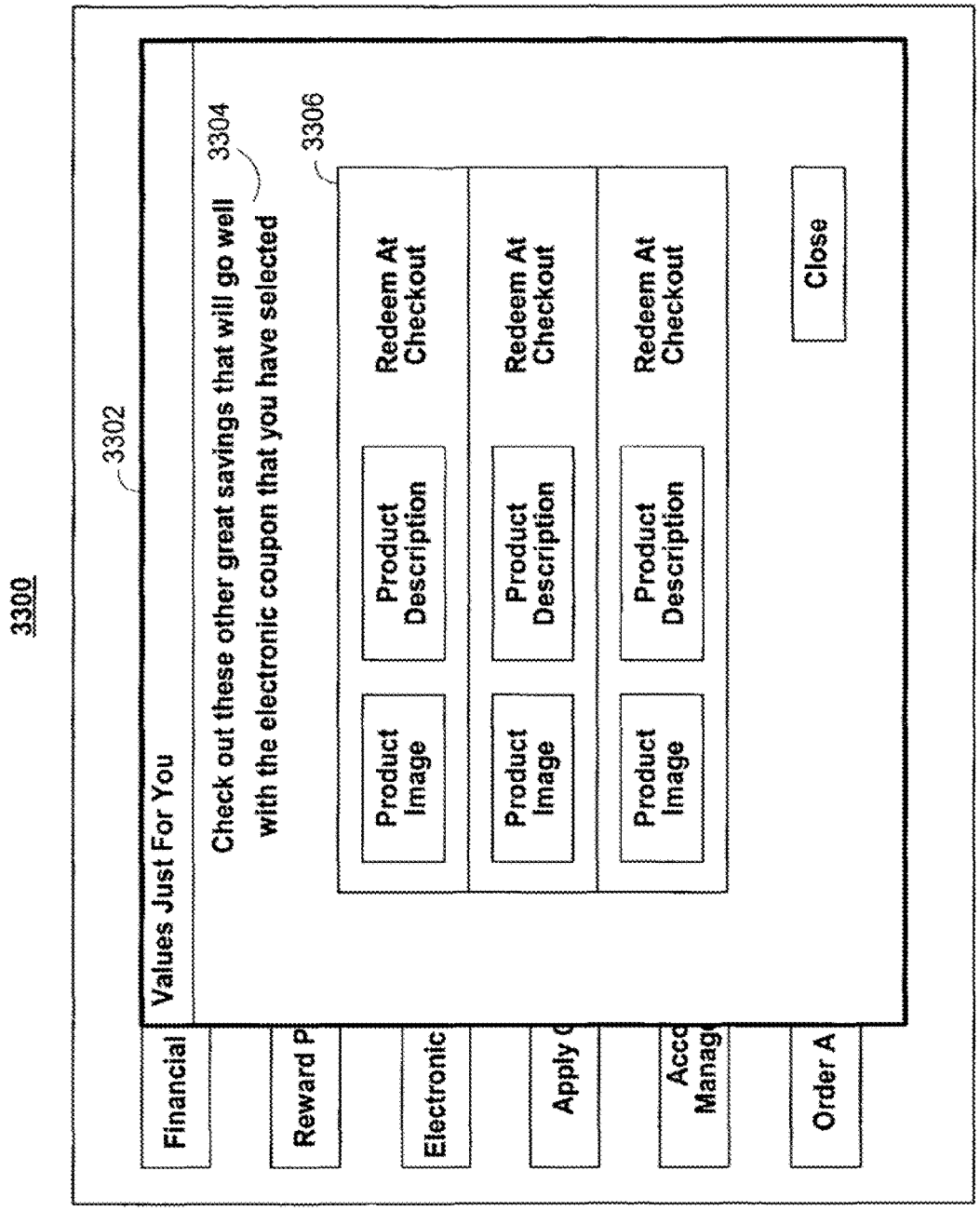
FIG. 33 shows illustrative display screen including a pop-up window that presents the user with a promotional offer that is dynamically linked to an electronic coupon or loyalty program on the user's smart card in accordance with one embodiment of the present invention.

FIG. 33 shows illustrative display screen 3300 including a pop-up window 3302 that presents the user with a promotional offer that is dynamically linked to an electronic coupon or loyalty program on the user's smart card in accordance with one embodiment of the present invention. The loyalty system may display pop-up window 3302 on screen 3300, for example, in response to detecting that one or more of the user's saved electronic coupons or other loyalty programs are associated with special offers.

Pop-up window 3302 may include, for example, a message 3304 to inform the user that the special offers presented are linked to one or more electronic coupons or other loyalty programs that are currently saved on the user's smart card. Pop-up window 3302 may also include, for example, one or more lists 3306, each containing special promotional offers that are linked to a particular electronic coupon or other loyalty program that is currently saved on the user's smart card. The loyalty system may display in list 3306 the product image and description associated with each special offer and the loyalty system may also, for example, inform the user that the offer may be redeemed at checkout or any other suitable purchasing points.

These special offers may be automatically placed on the user's smart card. Alternatively, the offers listed in window 3302 may include a save button to allow the user to choose whether or not the offer is saved to the smart card. Additionally, the loyalty system may inform the user of special offers that aren't actually downloaded to the user's smart card until the user's next time checking out at a POS.

Screen 3300 is merely illustrative of such a display screen. Any other suitable arrangement may be used. For example, an e-mail message could be sent to the user with the ability to click on a link in the message in order to add the electronic coupon to the user's smart card.

Figure 34:
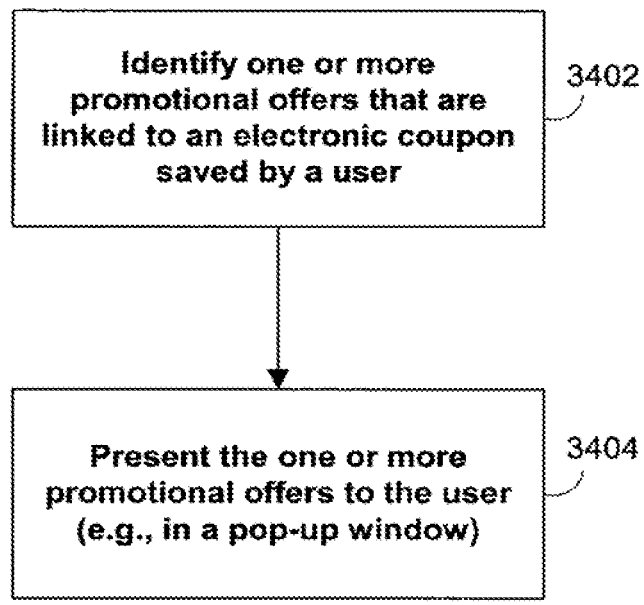
FIG. 34 shows a flowchart of illustrative steps involved in presenting the user with a promotional offer that is dynamically linked to an electronic coupon or loyalty program on the user's smart chip in accordance with one embodiment of the present invention.

FIG. 34 shows a flowchart of illustrative steps involved in presenting the user with a promotional offer that is dynamically linked to an electronic coupon or loyalty program on the user's smart chip in accordance with one embodiment of the present invention. At step 3402, the loyalty system may identify one or more promotional offers that are linked to an electronic coupon saved by the user. The loyalty system may make such an identification, for example, by comparing the listing of electronic coupons and loyalty programs saved on the user's smart card to a predefined list associated with special promotional offers when the user signs in with the loyalty system, when the user adds a product corresponding to a saved electronic coupon to his online cart, when the user purchases a product, or in response to any other suitable event.

At step 3404, the loyalty system may present the one or more special promotional offers associated with the one or more electronic coupons or other loyalty programs currently saved on the user's smart card to the user, for example, in a pop-up window.

In some embodiments of the present invention, the loyalty system may present kiosk-only offers to encourage use of the in-store kiosks. In other words, specific offers may be displayed to users of the kiosk, but not to home users. Additionally, various electronic-coupons and loyalty programs may be used as a means of advertising the in-store kiosks. For example, a buy one product, get 20% off of another product coupon may be promoted to users as only being available for download at an in-store kiosk. Furthermore, promotions could be made such as "insert your smart card at an in-store kiosk and a coupon for 5% off your next purchase will be downloaded to your smart card at the POS." Any other suitable approach to promoting the use of in-store kiosks could also be used. In some embodiments of the present invention, select coupons may be available only via the user equipment or in-store kiosks, while other select coupons may only be available via the POS.

Figure 35:
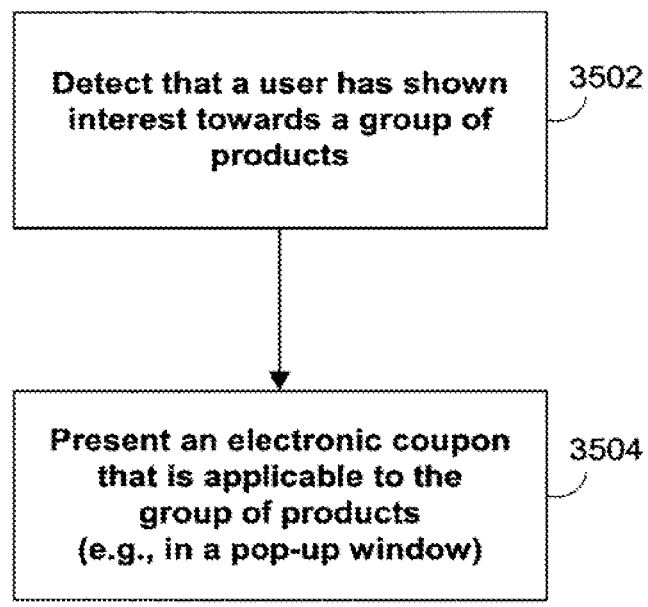
FIG. 35 shows a flowchart of illustrative steps involved in presenting the user with an electronic coupon that is applicable towards any product of a particular group in accordance with one embodiment of the present invention.

FIG. 35 shows a flowchart of illustrative steps involved in presenting the user with a targeted electronic coupon that is applicable towards any product of a particular group in accordance with one embodiment of the present invention. At step 3502, the loyalty system detects that the user has shown interest towards a group of products. For example, the loyalty system may make such a determination by detecting that the user has purchased a product within the product group, by detecting that the user has added a product within the product group to the user's shopping cart, by detecting that the user has browsed through one or more products within the product group, or by using any other suitable approach.

In response to detecting the user's interest in the product group at step 3502, the loyalty system may display an electronic coupon at step 3504 that is applicable to all or a part of the group of products that the user has shown interest towards. The loyalty system may display the electronic coupon, for example, in a pop-up window, or in any other suitable arrangement.

In some embodiments of the present invention, the loyalty system may allow the user to accumulate rewards and redeem electronic coupons using a smart card while at the same time paying for all or part of the purchase using, for example, a gift card, a gift certificate, or any other suitable alternative payment option (e.g., cash, merchant voucher, etc.). For example, the loyalty system may allow a service representative to scan a gift certificate or a gift card into a POS system. Once the loyalty system determines that the gift certificate or gift card is valid, the value of the gift certificate or gift card may be deducted from the calculated total in the same manner that savings from an electronic coupon may be deducted. Some embodiments of the present invention may allow the combination of any suitable form of payment to be applied with the smart card to complete the transaction.

Figure 36:
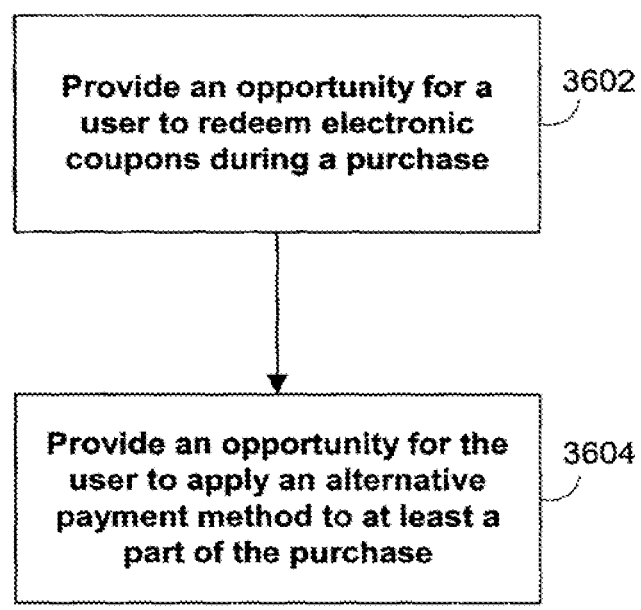
FIG. 36 shows a flowchart of illustrative steps involved in applying alternative payment methods to the purchases made with the user's smart card in accordance with one embodiment of the present invention.

FIG. 36 shows a flowchart of illustrative steps involved in applying alternative payment methods to the purchases made with the user's smart card in accordance with one embodiment of the present invention. At step 3602, the loyalty system may provide an opportunity for the user to accumulate rewards (e.g., rewards points) and redeem electronic coupons, for example, while making a purchase at the checkout lane of a retail store, while making a purchase online, or at any other suitable smart card location. At step 3604, the loyalty system may provide an opportunity for the user to apply alternative payment methods (e.g., gift cards, etc.) to all or part of the purchase. For example, in response to a service representative inputting a gift certificate corresponding to a user's purchase using a smart card, the loyalty system may deduct the gift certificate value from the calculated purchase total. As another example, the loyalty system may allow the user to use a gift card the same way that the user may use a credit or debit card to pay for all or part of the purchase.

Alternatively, alternative payment methods may be redeemed before any rewards calculations are performed. If the alternative payment method is not redeemable during the current transaction, the loyalty and rewards system may inform the cashier, the user, or both that the alternative payment method will have to be used at another time.

In some embodiments of the present invention, the loyalty system may allow an authorized person, such as a user service representative to deliver specific offers to a particular user. For example, in the event that a mistake has been detected on the user's previous purchase or an error occurred in the downloading to/redeeming from of offers on the smart card, the user service representative may make a corrective offer that may be delivered to the user, for example, via email or a personalized offer presented to the user the next time the user interacts with the loyalty system. The loyalty system may allow the user to save the offer from the email to the smart chip for use during the next purchase or the email may link to the loyalty system's website for sign-in and download of the offer.

In another suitable approach, the loyalty system may allow the user representative to save the offer to a dedicated special offers list or database that may be centrally maintained by the loyalty system. The loyalty system may uniquely identify each special offer in the list or database, for example, by associating the smart chip ID of the user's smart chip. The loyalty system may then automatically dispense the special offer to the user's smart chip the next time the user's smart card is in communication with the loyalty system.

In yet another suitable approach, the loyalty system may additionally allow the user service representative to save the special offer to the user's wishlist, which the user may download to his smart chip at a later time.

User service representatives may have access to multiple sets of data. For instance, the representative may have access to information about cardholders stored at loyalty program host 112 (FIG. 1) or merchant processing facility 104 (FIG. 1). Additionally, however, there may be banks or other financial processing institutions beyond loyalty program host 112 that store cardholder information that is also available to the user service representative. Having access to these multiple sources of data may improve the representatives ability to correct processing errors or make personalized offers to particular users.

Figure 37:
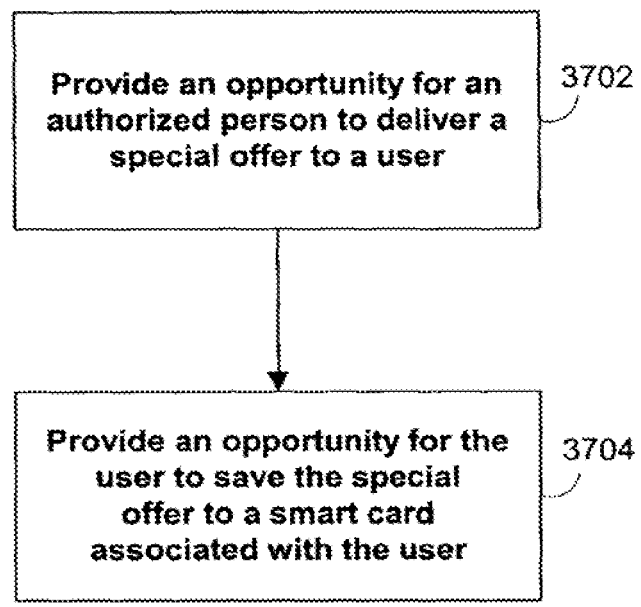
FIG. 37 shows a flowchart of illustrative steps involved in allowing a user service representative to deliver special offers to the user in accordance with one embodiment of the present invention.

FIG. 37 shows a flowchart of illustrative steps involved in allowing a user service representative to deliver special offers to the user in accordance with one embodiment of the present invention. At step 3702, the loyalty system may provide an opportunity for an authorized person to deliver a special offer that is applicable towards a specific user. The loyalty system may create such a special offer, for example, by providing an authorized person (e.g., a user service representative) with an offer form, which may be filled out with offer information such as the user's smart card ID, offer value, product information, single or multiple use, etc., to create a complete special offer.

At step 3704, the loyalty system may provide an opportunity for the user to save the special offer created at step 3702 to the user's smart card. For example, the loyalty system may allow an authorized person (e.g., user service representative) to email the special offer to the user, who may then download the offer to his smart card. As another example, the loyalty system may save the special offer to a special offers database, which the loyalty system may search, for example, each time the user signs in to download the appropriate special offers to the user's smart card. As yet another example, the loyalty system may automatically save the special offer to the user's wishlist, which may include electronic coupons and other loyalty programs that the user intends to download to his smart card at a later time.

In some embodiments of the present invention, the loyalty system may allow various sponsors to reserve open "buckets" (memory fields) in the memory of the smart chips. In one suitable approach, the loyalty system may carve out memory slots for a sponsor and assign a unique sponsor code to those memory slots. When the user uses the smart card to initiate communication with the loyalty system, the loyalty system may, for example, place electronic coupons, other loyalty programs, and any other suitable special offers that are associated with the sponsor into the memory slots associated with the unique sponsor code.

For example, the loyalty system may create such a memory bucket in the smart chips of smart cards that are issued in a particular region to benefit a regional sponsor that consistently makes offers to the general users in that region. As another example, the loyalty system may create such a memory bucket in the smart chips associated with users that have requested to receive offers from a particular sponsor. Alternatively, the management of sponsor buckets may be handled by one of the loyalty and rewards system central computers (e.g., rewards database 610, loyalty system 124, etc.), rather than involving any physical distinction on a user's smart chip.

By implementing such open buckets in the memory of the smart chips, the loyalty system may restrict aggressive sponsors from taking up too much memory space on the user's smart chip. Additionally, such an implementation may prevent the user from using all of the memory space, and therefore allow certain sponsors to always have space available on a user's smart card for their offers.

Figure 38:
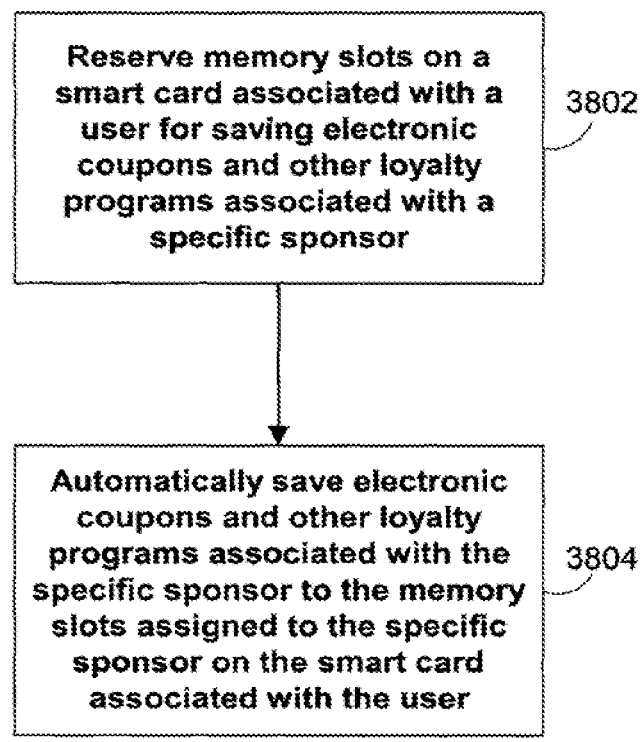
FIG. 38 shows a flowchart of illustrative steps involved in reserving open buckets for saving special offers from sponsors on the user's smart chip in accordance with one embodiment of the present invention.

FIG. 38 shows a flowchart of illustrative steps involved in reserving open buckets for saving special offers from sponsors on the user's smart chip in accordance with one embodiment of the present invention. At step 3802, the loyalty system may reserve memory slots on the user's smart card for storing electronic coupons and other loyalty programs that are associated with a specific sponsor. The loyalty system may reserve the memory slots, for example, by assigning a unique sponsor code that is specific to the particular sponsor to those memory slots.

At step 3804, the loyalty system may automatically save electronic coupons and other loyalty programs that are associated with the specific sponsor to the memory slots reserved for that sponsor on the user's smart card. For example, the loyalty system may identify the reserved memory slots by its associated sponsor code and may save electronic coupons and other loyalty programs associated with the same sponsor code to those memory slots.

In some embodiments of the present invention, the loyalty system may support merchant alliance-based incentive programs. In such embodiments, the loyalty system may recognize certain merchants as preferred alliance members and may in response render preferential treatments towards the incentive programs offered by such alliance members.

For example, in response to the user requesting to view electronic coupons, the loyalty system may display electronic coupons offered by an alliance member in a more prominent position on the screen (e.g., at the top of the screen). As another example, in response to a search conducted by the user, the loyalty system may, for example, recommend alliance member products and present electronic coupons and other loyalty programs offered by the alliance members. As yet another example, the loyalty system may reserve memory space on the user's smart card for storing electronic coupons and other loyalty programs offered by the alliance members. Additionally, the alliance program may include a data exchange technique to allow funds transfers between the loyalty program host and alliance members (e.g., alliance members may pay the loyalty program host a transaction fee for each electronic coupon or loyalty program redeemed).

In some embodiments of the present invention, the loyalty system may allow two or more merchant partners to specify different ways in which accumulated reward points may be recognized at their corresponding retail stores or online store sections. The loyalty system may also allow two or more merchant partners to specify different ways in which electronic coupons and other loyalty programs may be redeemed. For example, the loyalty system may allow one merchant to assign the savings associated with a transactional-level coupon to be ten dollars off the entire purchase. The loyalty system may allow another merchant, which retails merchandise at a lower mark-up, to specify the same transaction-level coupon to redeem for a saving of five dollars on the entire purchase.

Figure 39:
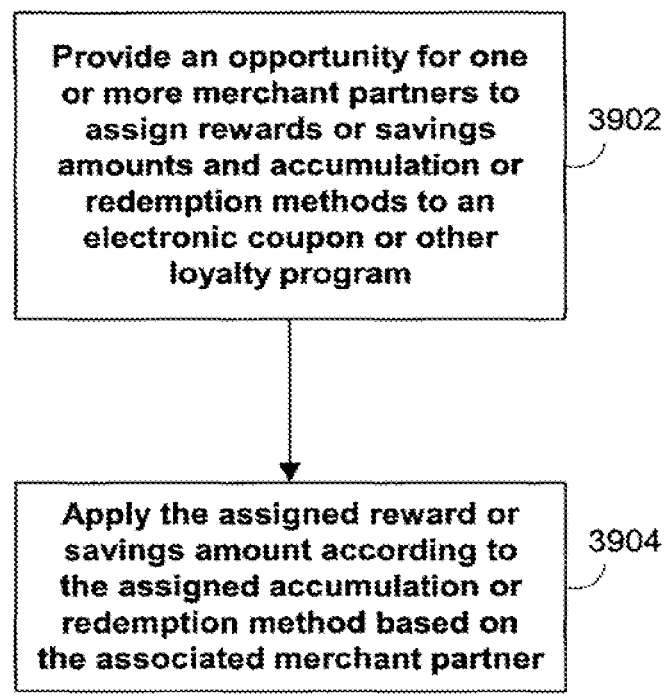
FIG. 39 shows a flowchart of illustrative steps involved in allowing two or more merchant partners to specify ways in which to recognize accumulated reward points and to redeem electronic coupons and other loyalty programs in accordance with one embodiment of the present invention.

FIG. 39 shows a flowchart of illustrative steps involved in allowing two or more merchant partners to specify ways in which to recognize accumulated reward points and to redeem electronic coupons and other loyalty programs in accordance with one embodiment of the present invention. At step 3902, the loyalty system provides an opportunity for one or more merchant partners to assign reward or savings amounts and reward accumulation and coupon redemption methods to an electronic coupon or other loyalty program. The loyalty system may allow two or more merchant partners to assign different reward or savings amounts and different reward accumulation and coupon redemption methods to the same electronic coupon or other loyalty program.

At step 3904, the loyalty system may apply the appropriate reward or savings amount and the appropriate reward accumulation or coupon redemption method to the electronic coupon or other loyalty program based on which merchant partner is responsible for the user's transaction.

In some embodiments of the present invention, the loyalty system may allow the user to perform all the above-described and any other suitable smart card-related activities, for example, using suitable equipment having a touch screen. One of such suitable touch screen equipment is the in-store kiosk, which has been described above. Other suitable touch screen equipment may include, for example, an automatic teller machine having a touch screen, a POS interface, an in-home computer having a touch screen, or any other suitable equipment that include a touch screen and has similar capabilities as the in-store kiosk. The touch screen, in conjunction with a smart card reader like smart card reader 302 of FIG. 3, may provide a user-friendly environment from which to download electronic coupons and loyalty programs and otherwise interact with a loyalty and rewards system like that disclosed herein.

Figure 40:
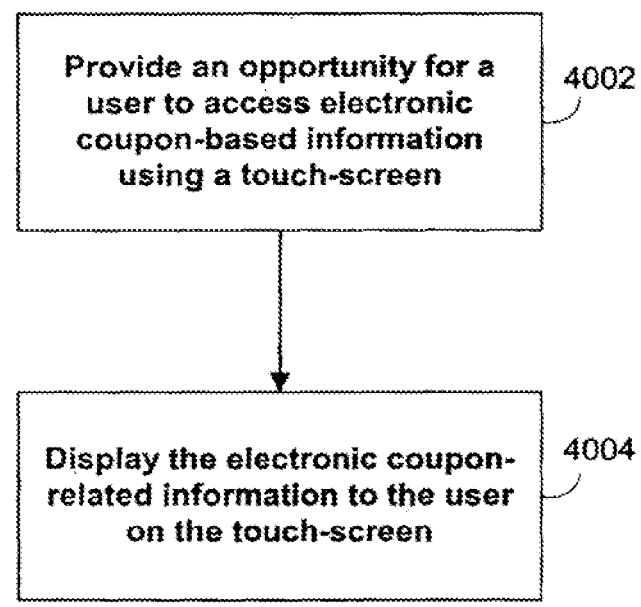
FIG. 40 shows a flowchart of illustrative steps involved in allowing a user to access electronic coupon-related information using a touch screen in accordance with one embodiment of the present invention. detailed description of the invention.

FIG. 40 shows a flowchart of illustrative steps involved in allowing a user to access electronic coupon-related information using a touch screen in accordance with one embodiment of the present invention. At step 4002, the loyalty system may provide an opportunity for the user to access electronic coupon-related information using a touch screen. For example, the loyalty system may allow the user to browse electronic coupons on an in-store kiosk, which supports user interaction with the loyalty system using a touch screen.

As another example, the loyalty system may provide a link such as an Internet link on an in-store or external automatic teller machine {"ATM"), through which the user may access electronic coupon-related information. As yet another example, the loyalty system may provide suitable access links on a sponsor or alliance member's proprietary equipment, which may use a touch screen to support user interaction. These examples are merely illustrative of the types of equipment and applications associated with a touch screen that may be used by the loyalty system to provide electronic coupon-related information to the user.

At step 4004, the loyalty system, for example, in response to receiving a request from the user for electronic coupon-related information, displays the requested electronic coupon-related information to the user on the touch screen. If no specific electronic coupon-related information is requested by the user (e.g., the user simply initiates communication, for example, with a smart card provider's web site), the loyalty system may display general electronic coupon-related information such as any featured electronic coupons to the user at step 5004.

Thus, systems and methods for providing a loyalty and reward system that uses smart card technology to support a user incentive program are provided. One skilled in the art will appreciate that the present invention can be practiced by other than the described embodiments, which are presented for purposes of illustration and not of limitation, and the present invention is limited only by the claims which follow.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method for providing a loyalty and rewards system that implements a user incentive program using circuit chip technology, the method comprising:
    storing transactional information associated with the user;
    identifying a special offer for a user based on activity by the user including at least the transactional information;
    automatically dispensing the special offer to the user by downloading the special offer to a circuit chip associated with the user;
    a POS terminal processing items for purchase selected by the user;
    enabling an operator of the POS terminal to actively signal the POS terminal that the step of processing items for purchase has been completed by pressing a key on the POS terminal; and
    after actively signaling the POS terminal, the POS terminal activating local loyalty software to complete a check-out transaction, the local loyalty software designating the special offer for automatic application during the user's next transaction, wherein the step of identifying the special offer is practiced at a time other than at a time of the check-out transaction,
    the automatically dispensing step further comprising the POS terminal accessing the circuit chip, and the local loyalty software automatically applying the special offer at the user's next transaction,
    once activated, the local loyalty software:
        actuating a card acceptance device to detect the user's circuit chip,
        requesting the card acceptance device to retrieve electronic coupons and other loyalty program information from the user's circuit chip including the special offer downloaded to the circuit chip,
        retrieving from the POS terminal product information of the items for purchase,
        comparing the items for purchase to items associated with the electronic coupons and other loyalty program information retrieved by the card acceptance device from the user's circuit chip including the special offer downloaded to the circuit chip, and
        when applicable based on the comparing step, automatically applying the special offer.

2. The method of claim 1, wherein the step of identifying the special offer is practiced by analyzing current basket information and past shopping history information during a user transaction.

3. The method of claim 1, wherein automatically dispensing the special offer to the user comprises:
    determining that the special offer is for future use; and
    automatically saving the special offer to the circuit chip associated with the user.

4. The method of claim 3, further comprising informing the user that the special offer has been saved to the circuit chip associated with the user.

5. The method of claim 1, wherein the identifying step is practiced based on a product type purchased by the user.

6. The method of claim 1, wherein the identifying step is practiced based on a dollar amount of a current transaction, wherein if the dollar amount exceeds a predefined dollar amount, the special offer is identified for the user.

7. The method of claim 1, wherein the circuit chip includes a memory storing user identification and incentive program information, the method further comprising apportioning the memory into a plurality of memory slots and designating at least one of the memory slots for the special offer.

8. A method for providing a loyalty and rewards system that implements a user incentive program using circuit chip technology, the method comprising:
    storing transactional information associated with the user;
    identifying a special offer for a user based on activity by the user including at least the transactional information;
    automatically dispensing the special offer to the user by downloading the special offer to a circuit chip associated with the user;
    a POS terminal processing items for purchase selected by the user;
    enabling an operator of the POS terminal to actively signal the POS terminal that the step of processing items for purchase has been completed by pressing a key on the POS terminal; and
    after actively signaling the POS terminal, the POS terminal activating local loyalty software to complete the transaction, the local loyalty software designating the special offer for automatic application during the user's next transaction, wherein the step of identifying the special offer is practiced at a time other than at a time of the transaction,
    the automatically dispensing step further comprising the POS terminal accessing the circuit chip, and the local loyalty software automatically applying the special offer at the user's next transaction,
    once activated, the local loyalty software:
        actuating a card acceptance device to detect the user's circuit chip,
        requesting the card acceptance device to retrieve electronic coupons and other loyalty program information from the user's circuit chip including the special offer downloaded to the circuit chip,
        obtaining product information of the items for purchase from the POS terminal,
        comparing the items for purchase to items associated with the electronic coupons and other loyalty program information retrieved by the card acceptance device from the user's circuit chip including the special offer downloaded to the circuit chip, and
        when applicable based on the comparing step, automatically applying the special offer, the method further comprising:
assigning special group serial numbers to a plurality of circuit chips associated with a plurality of users within a user cluster, wherein the identifying step is practiced by identifying the special offer based on shared interest characteristics of the user cluster, and
presenting the special offer to the plurality of circuit chips in the user cluster.

9. The method of claim 8, further comprising presenting a featured electronic coupon to the user cluster, wherein the featured electronic coupon is predetermined to be of special interest to the user cluster.

10. The method of claim 1, wherein the identifying step is practiced by identifying the special offer based on a user-identified event, the method further comprising comparing the user-identified event to a list of predefined events with pre-associated special offers.

\* \* \* \* \*